US009191831B2

(12) United States Patent
Giannakis et al.

(10) Patent No.: US 9,191,831 B2
(45) Date of Patent: *Nov. 17, 2015

(54) NON-PARAMETRIC POWER SPECTRAL DENSITY (PSD) MAP CONSTRUCTION

(71) Applicant: Regents of the University of Minnesota, St. Paul, MN (US)

(72) Inventors: Georgios B. Giannakis, Minnetonka, MN (US); Juan Andres Bazerque, Minneapolis, MN (US); Gonzalo Mateos, Minneapolis, MN (US)

(73) Assignees: Regents of the University of Minnesota, Minneapolis, MN (US); NATIONAL SCIENCE FOUNDATION, Arlington, VA (US)

( * ) Notice: Subject to any disclaimer, the term of this patent is extended or adjusted under 35 U.S.C. 154(b) by 120 days.

This patent is subject to a terminal disclaimer.

(21) Appl. No.: 13/899,374

(22) Filed: May 21, 2013

(65) Prior Publication Data

US 2013/0310093 A1 Nov. 21, 2013

Related U.S. Application Data

(60) Provisional application No. 61/649,793, filed on May 21, 2012.

(51) Int. Cl.
*H04M 1/00* (2006.01)
*H04W 24/02* (2009.01)
*H04W 16/14* (2009.01)
*H04W 16/18* (2009.01)
*H04W 16/22* (2009.01)

(52) U.S. Cl.
CPC ............. *H04W 24/02* (2013.01); *H04W 16/14* (2013.01); *H04W 16/18* (2013.01); *H04W 16/22* (2013.01)

(58) Field of Classification Search
CPC ............................ H04W 24/00; H04W 16/22
See application file for complete search history.

(56) References Cited

U.S. PATENT DOCUMENTS

| 8,150,344 | B1* | 4/2012 | Goyal | H04W 24/02 455/130 |
|---|---|---|---|---|
| 2003/0050098 | A1* | 3/2003 | D'Agati | H04W 88/08 455/561 |
| 2008/0004028 | A1* | 1/2008 | Vincent | H04W 16/00 455/446 |
| 2010/0091745 | A1* | 4/2010 | Bevan | H04W 24/02 370/338 |
| 2011/0130135 | A1* | 6/2011 | Trigui | H04W 24/08 455/423 |
| 2013/0176872 | A1* | 7/2013 | Stanczak et al. | 370/252 |

OTHER PUBLICATIONS

"IEEE Standard for Information Technology—Telecommunications and Information Exchange Between Systems—Local and Metropolitan Area Networks—Specific Requirements; Part II: Wireless LAN Medium Access Control (MAC) and Physical Layer (PHY) Specifications; Amendment 6 Wireless Access in Vehicular Environments," IEEE Standard 802.11, IEEE Computer Society, Jun. 12, 2007, 51 pp.

(Continued)

*Primary Examiner* — Edward Urban
*Assistant Examiner* — Mohammed Rachedine
(74) *Attorney, Agent, or Firm* — Shumaker & Sieffert, P.A.

(57) ABSTRACT

This disclosure describes techniques for constructing power spectral density (PSD) maps representative of the distribution of radio frequency (RF) power as a function of both frequency and space (geographic location). For example, the disclosure describes techniques for construction PSD maps using non-parametric basis pursuit form of signal expansion.

24 Claims, 16 Drawing Sheets

(56) References Cited

OTHER PUBLICATIONS

Agrawal et al., "Correlated link shadow fading in multihop wireless networks," IEEE Trans. Wireless Communication, vol. 8(8), Aug. 2009 pp. 4024-4036.
Aharon et al., "K-SVD: An Algorithm for Designing Overcomplete Dictionaries for Sparse Representation," IEEE Transactions on Signal Processing, vol. 54(11), Nov. 2006, pp. 4311-4322.
Alay-Feki et al., "Informed Spectrum Usage in Cognitive Radio Networks: Interference Cartography," In Proc. of the PIMRC Conf., 1-5, Cannes, France, Sep. 2008, 5 pp.
Angelosante et al., "Group Lassoing change-points in Piecewise-Stationary AR Signals," presented in the 17th Int. conf. DSP. Corfu Island, Greece, Jul. 2011, 8 pp.
Angelosante et al., "Online Adaptive Estimation of Sparse Signals: Where RLS Meets the 1_1-norm," IEEE Trans. Signal Process., vol. 58(7), Jul. 2010, pp. 3436-3447.
Bakin, "Adaptive Regression and Model Selection in Data Mining Problems," Ph.D. Dissertation, Australian national Univ., Canberra, May 1999, 168 pp.
Bazerque et al., "Distributed Spectrum Sensing for Cognitive Radio Networks by Exploiting Sparsity," IEEE Trans. Signal Process., vol. 58(3), Mar. 2010, pp. 1847-1862.
Bazerque et al., "Group-Lasso on Splines for Spectrum Cartography," IEEE Trans. Signal Process., vol. 59(10), Oct. 2011, pp. 4648-4663.
Beck et al., "A fast Iterative Shrinkage-Thresholding Algorithm for Linear Inverse Problems," SIAM J. Imag. Sci., vol. 2(1), Jan. 2009, pp. 183-202.
Bertsekas et al., "Partial Solutions Manual Parallel and Distributed Computation: Numerical Methods," Massachusetts Institute of Technology, Athena Scientific, 1989, 8 pp. (Note: Applicant points out in accordance with MPEP 609.04(a) that the 1989 year of publication is sufficiently earlier than the effective U.S. filing date and any foreign priority date of May 21, 2013 so that the particular month of publication is not in issue.).
Bertsekas, "Nonlinear Programming," 2nd Ed. Athena Scientific, 1999, 3 pp. (Note: Applicant points out in accordance with MPEP 609.04(a) that the 1999 year of publication is sufficiently earlier than the effective U.S. filing date and any foreign priority date of May 21, 2013 so that the particular month of publication is not in issue.).
Boyd et al., "Convex Optimization," Stanford University, Cambridge University Press, Mar. 2004, 730 pp.
Breiman, "Better subset regression using the nonnegative garrote," Technometrics, vol. 37(4), Nov. 1995, pp. 373-384.
Candes et al., "Enhancing Sparsity by Reweighted l1 Minimization," J. Fourier Anal. Appl., vol. 14(5), Oct. 2008, pp. 877-905.
Chen et al., "Atomic Decomposition by Basis Pursuit," SIAM Review, vol. 43(1), Feb. 2001, pp. 129-159.
Chui et al., "A New Algorithm for Non-rigid Point Matching," in Proc. Conf. Comput. Vis. Pattern Recongnit., Hilton Head, SC, Jun. 2000, pp. 44-51.
Dall'Anese et al., "Channel Gain Map Tracking Via Distributed Kriging," IEEE Trans Veh. Technol., vol. 60(3), Mar. 2011, pp. 1205-1211.
Dall'Anese et al., "Power Allocation for Cognitive Radio Networks Under Channel Uncertainty," in Proc. of the Intl. Conf. on Communications, Kyoto, Japan, Jun. 2011, 6 pp.
Duchon, "Splines Minimizing Rotation-Invariant Semi-norms in Sobolev Spaces," New York: Springer-Verlag, 1977, 16 pp. (Note: Applicant points out in accordance with MPEP 609.04(a) that the 1977 year of publication is sufficiently earlier than the effective U.S. filing date and any foreign priority date of May 21, 2013 so that the particular month of publication is not in issue.).
Efron et al., "Least Angle Regression," Statistics Department, Stanford University, Jan. 9, 2003, 44 pp.
Elad et al, "Image Denoising via Sparse and Redundant Representations Over Learned Dictionaires," IEEE Trans. Image Proc., vol. 15(12), Dec. 2006, pp. 3736-3745.
Friedman et al., "A Note on the Group Lasso and a Sparse Group Lasso," preprint, downloadable from http:www-stat.stanford.edu/~tibs, Feb. 11, 2010, 8 pp.
Fuchs, "A New Aproach to Robust Linear Regression," In Proc. of 14th IFAC World Congress, Beijing, 1999, 6 pp. (Note: Applicant points out in accordance with MPEP 609.04(a) that the 1999 year of publication is sufficiently earlier than the effective U.S. filing date and any foreign priority date of May 21, 2013 so that the particular month of publication is not in issue.).
Ganesan et al., "Spatiotemporal Sensing in Cognitive Radio Networks," IEEE Journal Sel. Areas Commun., vol. 26(1), Jan. 2008, pp. 5-12.
Goldsmith, "Wireless Communications," Cambridge, U.D., Campbridge Univ. Press, 2006, 7 pp. (Note: Applicant points out in accordance with MPEP 609.04(a) that the 2006 year of publication is sufficiently earlier than the effective U.S. filing date and any foreign priority date of May 21, 2013 so that the particular month of publication is not in issue.).
Goldstein et al., "The Split Bregman Method for L1 Regularized Problems," SIAM J. Imag. Sci,. vol. 2, Apr. 2009, pp. 323-343.
Hastie et al., "Generalized Additive Models," London, U.K., Chapman & Hall, 1990, 5 pp. (Note: Applicant points out in accordance with MPEP 609.04(a) that the 1990 year of publication is sufficiently earlier than the effective U.S. filing date and any foreign priority date of May 21, 2013 so that the particular month of publication is not in issue.).
Hastie et al., "The Elements of Statistical Learning: Data Mining, Inference, and Prediction," 2nd ed., New York, Springer, 2009, 11 pp. (Note: Applicant points out in accordance with MPEP 609.04(a) that the 2009 year of publication is sufficiently earlier than the effective U.S. filing date and any foreign priority date of May 21, 2013 so that the particular month of publication is not in issue.).
Herman et al., "General Deviants: An Analysis of Perturbations in Compressed Sensing," IEEE Journal of Selected Topics in Signal Processing, vol. 4(2), Apr. 2010, 8pp.
Hong et al., "Secondary Spectrum Access Networks: Recent Developments on the Spatial Models," IEEE Veh. Technol. Magazine, vol. 4(2), Jun. 2009, pp. 36-43.
Huber et al., "Robust Statistics," Wiley, New York, 2006, 9 pp. (Note: Applicatnt points out in accordance with MPEP 609.04(a) that the 2006 year of publication is sufficiently earlier than the effective U.S. filing date and any foreign priority date of May 21, 2013 so that the particular month of publication is not in issue.).
Kim et al., "Cooperative Spectrum Sensing for Cognitive Radios Using Kriged Kalman Filtering," IEEE J. Sel. Topics Sig. Proc., vol. 5(1), Feb. 2011, pp. 24-36.
Kim et al., "Sequential and Cooperative Sensing for Multichannel Cognitive Radios," IEEE Trans. Signal Process., vol. 58(8), Aug. 2010, pp. 4239-4253.
King et al., "CRAWDAD Data Set," Mannheim/Compass (v. 2008-04-11) [online]. Available: http/crawdad.cs.dartmouth.edu/mannheim/compass, Apr. 2008, 2 pp.
Lee et al., "Efficient Sparse Coding Algorithms," Advances in Neural Information Processing Systems 19, B. Scholkopf, J. Platt, and T. Hoffman, Eds. Cambridge, MA, MIT Press, retrieved from online http://www.cs.stanford.edu/people/ang//papers/nips06-sparsecoding.pdf, Jan. 2007, pp. 801-808.
Lin et al., "Component Selection and Smoothing in Multivariate Nonparametric Regression, "Ann. Stat., vol. 34(5), May 2006, 30 pp.
Liu et al, "Multi-Task Feature Learning via Efficient l 2.1-norm Minimization," presented at the 25th conf. Uncertainty Artificial Intelligence, Montreal, QC, Canada, Jun. 2009, 10 pp.
Ma et al., "Soft Combination and Detection for Cooperative Spectrum Sensing in Cognitive Radio Networks," IEEE Trans. Wireless Commun., vol. 7(11), Nov. 2007, 5 pp.
Mairal et al, "Online Learning for Matrix Factorization and Sparse Coding," J. Machine Learning Res., vol. 11, Mar. 2010, pp. 19-60.
Mark et al., "Estimation of Maximum Interference-Free Power Level for Opportunistic Spectrum Access," IEEE Trans. Wireless Commun., vol. 8(5), May 2009, pp. 2505-2513.
Mateos et al., "Distributed Sparse Linear Regression," IEEE Trans. Sig. Proc., vol. 58(10), Oct. 2010, pp. 5262-5276.

(56) References Cited

OTHER PUBLICATIONS

Mateos et al., "Spline-based spectrum cartography for cognitive radios," in Proc. 43rd Asilomar conf. Signals, Syst., Comput., Nov. 2009, pp. 1025-1029.
Matheron, "The Intrinsic Random Functions and their Application," Advances in Applied Probability, vol. 5, Dec. 1973, pp. 439-468.
Meier et al., "The group Lasso for logistic regression," J. Roy. Stat. Soc. B, vol. 70(1), Feb. 2008, pp. 53-71.
Micchelli et al., "On learning vector-valued functions," Neural comput., vol. 17(1), Jan. 2005, pp. 177-204.
Minka, "Old and new matrix algebra useful for statistics," retrieved from http://research.microsoft.com/en-us/um/people/minka/papers/matrix/, Dec. 2000, 19 pp.
Mishra et al., "Cooperative sensing among cognitive radios," in Proc. 42nd Int. Conf. commun., Istanbul, Turkey, Jun. 2006, 7 pp.
Nesterov, "Gradient Methods for Minimizing Composite Objective Function," Center for Operations Research and Econometrics (CORE), Sep. 2007, 32 pp.
Nishimori et al., "Spatial Opportunity for Cognitive Radio Systems with Heterogeneous Path Loss Conditions," IEEE, in Proc. 65th Vehicular Technology Conference, Apr. 2007, pp. 2631-2635.
Oestges et al., "Experimental Characterization and Modeling of Outdoor-to-Indoor and Indoor-to-Indoor Distributed Channels," IEEE Trans. Veh. Technol., vol. 59(5), Jun. 2010, pp. 2253-2265.
Olshausen et al., "Sparse Coding with an Covercomplete Basis Set: A Strategy Employed by V1?" Vision Research, vol. 37(23), Dec. 1997, pp. 3311-3325.
Pauca et al., "Nonnegative Matrix Factorization for Spectral Data Analysis," Linear Algebra and its Appl., vol. 416(1), Jul. 2006, 26 pp.
Perrin et al., "Scalp Current Density Mapping: Value and Estimation from Potential Data," IEEE Trans. Biomed. Eng., vol. 34(4), Apr. 1987, pp. 283-288.
Puig et al., "A multidimensional shrinkage-thresholding operator," IEEE, 15th workshop on statistical signal processing, Sep. 2009, pp. 113-116.
Quan et al., "Collaborative Wideband Sensing for Cognitive Radios," IEEE Signal Process. Mag., vol. 25(6), Nov. 2008, pp. 60-73.
Raina et al, "Self-Taught Learning: Transfer Learning from Unlabeled Data," Proc. of the 24th Intl. Conf. on machine Learning, Corvallis, OR, Jun. 2007, pp. 759-766.
Rappaport, "Wireless Communications: Principles & Practice," Prentice Hall, 1996, 9 pp. (Note: Applicant points out in accordance with MPEP 609.04(a) that the 1996 year of publication is sufficiently earlier than the effective U.S. filling date and any foreign priority date of May 21, 2013 so that the paticular month of publication is not in issue.)
Ravikumar et al., "Sparse additive models," J. Roy. Stat. Soc. B., vol. 71(5), Feb. 2009, pp. 1009-1030.
Ruszczynski, "Nonlinear Optimization," Princeton Univ. Press, Princeton, NJ, Jan. 22, 2006, 463 pp.
Schizas et al., "Consensus in Ad Hoc WSNs with Noisy Links—Part 1: Distributed Estimation of Deterministic Signals," IEEE Trans. Sig. Proc., vol. 56(1), Jan. 2008, pp. 350-364.
Sprechmann et al., "C-HiLasso: A Collaborative Hierarchical Sparse Modeling Framework," IEEE Transactions on Signal Processing, vol. 59(9), Sep. 2011, pp. 4183-4198.
Stein, "Interpolation of Spatial Data: Some Theory for Kriging," Springer Series in Statistics, Springer, New York, 1999, 15 pp. (Note: Applicant points out in accordance with MPEP 609.04(a) that the 1999 year of publication is sufficiently earlier than the effective U.S. filing date and any foreign priority date of May 21, 2013 so that the particular month of publication is not in issue.).
Tibshirani, "Regression Shrinkage and Selection via the Lasso: A Retrospective," J. Royal Stat. Soc., series B, vol. 73(3), Apr. 2011, 273-282.
Tseng et al, "A Coordinate Gradient Descent Method for Nonsmooth Separable Minimization," Mathematical Programming B, vol. 117(1-2), Mar. 2009, pp. 387-423.
Tseng, "Convergence of Block Coordinate Descent Method for Nondifferentiable Maximation," J. Opt. Theory Appl., vol. 109(3), Jun. 2001, 20 pp.
Unnikrishnan et al., "Cooperative Sensing for Primary Detection in Cognitive Radio," IEEE J. Sel. Topics Sig. Proc., vol. 2(1), Feb. 2008, pp. 18-27.
Unser, "Splines: A Perfect Fit for Signal and Image Processing," IEEE Signal Process. Mag., vol. 16(6), Nov. 1999, pp. 22-38.
Van Huffel et al., "The Total Least-Squares Problem: Computational Aspects and Analysis," Frontiers in Applied Mathematics, SIAM, Philadelphia, 1991, 10 pp. (Note: Applicant points out in accordance with MPEP 609.04(a) that the 1991 year of publication is sufficiently earlier than the effective U.S. filing date and any foreign priority date of May 21, 2013 so that the particular month of publication is not in issue.).
Wahba et al., "Some New Mathematical Methods for Variational Objective Analysis Using Splines and Cross Validation," Month, Weather Rev., vol. 108, Apr. 1980, pp. 1122-1145.
Wahba, "Spline Models for Observational Data," CBMS-NSF Regional Conference Series in Applied Mathematics, SIAM, vol. 59, Philadelphia, PA, 1990, 13 pp. (Note: Applicant points out in accordance with MPEP 609.04(a) that the 1990 year of publication is sufficiently earlier than the effective U.S. filing date and any foreign priority date of May 21, 2013 so that the particular month of publication is not in issue.)
Wright et al., "Sparse Reconstruction by Separable Approximation," IEEE Trans. Signal Process, vol. 57(7), Jul. 2009, pp. 2479-2493.
Yuan et al., "Model Selection and Estimation in Regression with Grouped Variables," Journal of the Royal Statistical Society, vol. 68(1), Feb. 2006, pp. 49-67.
Zhang et al., "Outlier Detection Techniques for Wireless Sensor Networks: A Survey," IEEE Commun. Surveys Tuts., vol. 12(2), second quarter 2010, pp. 159-170 (Note: Applicant points out in accordance with MPEP 609.04(a) that the 2010 year of publication is sufficiently earlier than the effective U.S. filed and any foreign priority date of May 21, 2013 so that the particular month of publication is not in issue.).
Zhao et al., "A Survey of Dynamic Spectrum Access: Signal Processing and Networking Perspectives," IEEE Signal Process Magazine, vol. 24(3), May 2007, 4 pp.
Zhu et al., "Sparsity-Cognizant Total Least-Squares for Perturbed Compressive Sampling," IEEE Trans. Sig. Proc., 59(5), May 2011, 15 pp.
Zou et al., "One-Step Sparse Estimates in Nonconcave Penalized Likelihood Models," The Annals of Statistics, vol. 36(4), Aug. 2008, pp. 1509-1533.
Zou, "The Adaptive Lasso and its Oracle Properties," J. Amer. Stat. Assoc., vol. 101(476), Dec. 2006, pp. 1418-1429.
Dall'Anese et al., "Group sparse Lasso for cognitive network sensing robust to model uncertainties and outliers," Physical Communication, Compressive Sensing in Communications, vol. 5, No. 2, Jun. 2012, 12 pp.

\* cited by examiner (a) Frequency bases detected (b) Power maps

NON-PARAMETRIC POWER SPECTRAL DENSITY (PSD) MAP CONSTRUCTION

This application claims the benefit of U.S. Provisional Application No. 61/649,793, filed May 21, 2012, the entire contents of which are incorporated herein by reference.

STATEMENT REGARDING FEDERALLY SPONSORED RESEARCH OR DEVELOPMENT

This invention was made with government support under ECCS-1002180 awarded by the National Science Foundation. The government has certain rights in the invention.

TECHNICAL FIELD

The invention relates to wireless communication and, more specifically, to spectrum cartography.

BACKGROUND

All wireless transmissions use a portion of the radio frequency spectrum. Cellular phones, broadcast television, satellite, and short-distance wireless networks such as Bluetooth and wireless local area networks (WLAN) utilize different portions of the Wi-Fi, for example, typically use wireless frequency spectrum. Often it is important to coordinate the use of the various technologies and frequency ranges to ensure that the technologies do not interfere with each other or with planned future services.

SUMMARY

This disclosure describes techniques for constructing power spectral density (PSD) maps representative of the distribution of radio frequency (RF) power as a function of both frequency and space (geographic location). For example, the disclosure describes techniques for construction of PSD maps using non-parametric basis pursuit techniques for signal expansion to model the PSD across space and frequency.

For example, a most parsimonious sparse signal expansion using an overcomplete basis set may be used to constructing the PSD maps. Moreover, a non-parametric basis expansion model of the RF power over frequency and location may be computed, and sparse coefficients computed for the basis expansions functions of the model may entail bases weighting functions instead of scalars. Utilizing this model for signal expansion, many of the weighting functions may be zero; however, a few bases can be identified and selected that more accurately represent the transmitted signals.

In one example, a collaborative scheme is utilized in which cognitive radios cooperate to localize active primary transmitters and reconstruct the power spectral density (PSD) maps (one per frequency band) portraying the power distribution across space. The sensing scheme may utilize a parsimonious linear system model that accounts for the narrowband nature of transmit-PSDs compared to the large swath of sensed frequencies, and for the group sparsity emerging when adopting a spatial grid of candidate primary user locations. Combining the merits of Lasso, group Lasso, and total least-squares (TLS), the proposed group sparse (GS) TLS approach yields hierarchically-sparse PSD estimates, and copes with model uncertainty induced by channel randomness and grid mismatch effects. Taking advantage of a novel low-complexity solver for the GS-Lasso, a block coordinate descent scheme is developed to solve the formulated GS-TLS problem.

In some examples, a spline-based approach to field estimation is described as one example of a non-parametric basis expansion model of a field of interest. Other example kernel-based interpolation functions include sinc-based kernels. In some examples, the model entails known bases, weighted by generic functions estimated from the field's noisy samples.

A novel field estimator is also described based on a regularized variational least-squares (LS) criterion that yields finitely-parameterized (function) estimates spanned by thin-plate splines. In this way, an over-complete set of (possibly overlapping) basis functions may be used, while a sparsifying regularizer augmenting the LS cost endows the estimator with the ability to select a few of these bases that "better" explain the data using a parsimonious field representation. The sparsity-aware spline-based examples of this disclosure induce a group-Lasso estimator for the coefficients of the thin-plate spline expansions per basis. A distributed algorithm is also developed to obtain the group-Lasso estimator using a network of wireless sensors, or, using multiple processors to balance the load of a single computational unit.

In this way, a basis expansion approach is described in this disclosure to estimate a multi-dimensional field, whose dependence on a subset of its variables is modeled through selected (and generally overlapping) basis functions weighted by unknown coefficient-functions of the remaining variables. The unknown coefficient functions, referred to herein as bases weighting functions and as kernel-based interpolating functions, operate to interpolate the PSD measurements across space using kernel-based method. In one example, the bases weighting functions can be estimated from the field's noisy samples, e.g., by solving a variational thin-plate smoothing spline cost regularized by a term that performs basis selection. The result yields a parsimonious description of the field by retaining those few members of the basis set that "better" explain the data. This attribute is achieved because the added penalty induces a group-Lasso estimator on the parameters of the radial kernels and polynomials. Notwithstanding, group-Lasso here is introduced to effect sparsity in the space of smooth functions. Moreover, in some example implementations, a plurality of different types of kernel-based interpolation functions are used to interpolate the PSD measurements across space. In such cases, multiple kernel can be incorporated within the non-parametric basis expansion model.

Another contribution is in the context of wireless cognitive radio (CR) network sensing (the overarching practical motivation here), where the estimated field enables cartographing the space-frequency distribution of power generated by active RF sources. Using periodogram samples collected by spatially distributed CRs, the sparsity-aware spline-based estimator yields an atlas of PSD maps (one map per frequency). A provably convergent distributed algorithm is described using AD-MoM iterations, to obtain the required group-Lasso estimator using the network of CRs. As corroborated by simulations and tests on real data, the atlas enables localizing the sources and discerning their transmission parameters, even in the presence of frequency-selective Rayleigh fading and pronounced shadowing effects. Simulated tests also confirmed that the sparsity-promoting regularization is effective in selecting those basis functions that strongly influence the field, when the tuning parameters are cross-validated properly.

The techniques may have many applications of the PSD maps, including the distribution of RF power in space and frequency. For example, PSD maps may be used to reveal spatial locations where idle frequency bands can be reused for transmission, even when fading and shadowing effects are pronounced. This information may be useful to wireless service providers in network planning and maintenance. As other example, the PSD maps may be used be devices, such as cellular phones, base stations or wireless-enabled tablet or computing devices, to sense and utilize opportunities within the spectrum for communication, such as dynamic re-use of otherwise pre-allocated frequency bands.

The model and the resultant (parsimonious) estimates of the PSD maps can be used in more general statistical inference and localization problems, whenever the data admit a basis expansion over a proper subset of its dimensions. Furthermore, results in this disclosure extend to kernels other than radial basis functions, whenever the smoothing penalty is replaced by a norm induced from an RKHS.

In one example implementation, techniques are used for cross fertilizing sparsity-aware signal processing tools with kernel-based learning. The disclosure describes non-parametric basis pursuit as foundation for sparse kernel-based learning (KBL), including blind versions that emerge as non-parametric nuclear norm regularization and dictionary learning.

Moreover, KBL is connected herein with Gaussian processes (GP) analysis, including an example implementation of a Bayesian viewpoint in which kernels convey prior information. Alternatively, KBL can be regarded as an interpolation toolset though its connection with the Nyquist-Shannon Theorem (NST), indicating that the impact of a prior model choice is attenuated when the size of the dataset is large, especially when kernel selection is also incorporated.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
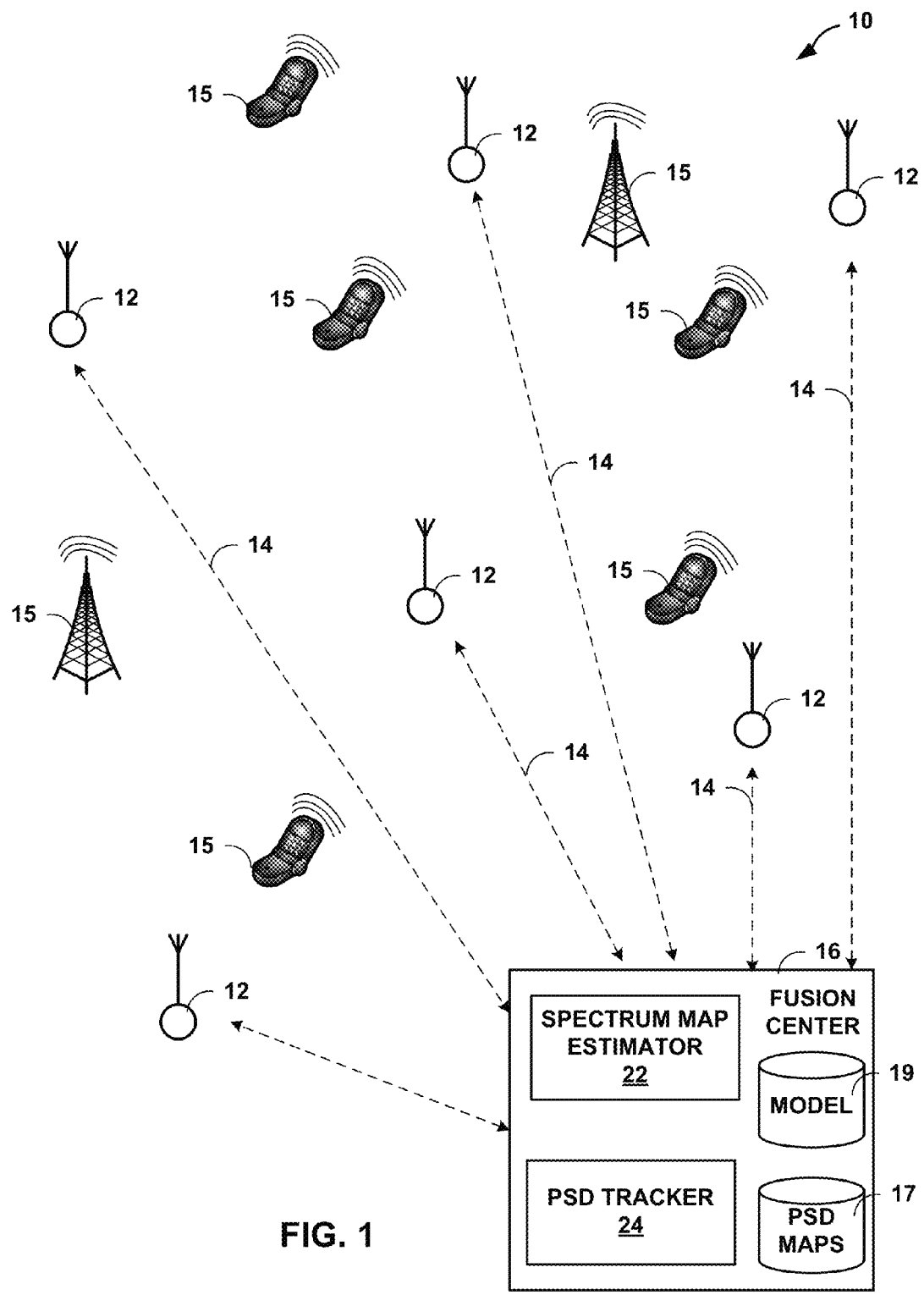
FIG. 1 is a block diagram illustrating a system in which a plurality of sensors and a centralized computing center cooperate to construct PSD maps.

FIG. 1 is a block diagram illustrating a system 10 in which a plurality of sensors 12 (e.g., cognitive radios (CR) in this example) deployed within a spatial region. Each of CRs 12 sense the ambient interference spectrum from other RF-enabled devices 15 within its surrounding region and communicate the sensed observations to one another via messages 14. In the example of FIG. 1, CRs 12 communicate power spectral density (PSD) observations to a computing system (e.g., fusion center 'FC') to construct one or more power spectral density (PSD) maps based on the PSD observations.

In general, the PSD maps representative of the distribution of radio frequency (RF) power as a function of both frequency and spatial location within the geographic region. In the example of FIG. 1, system 10 includes a centralized fusion center (FC) 16 that performs the techniques described herein to compute a non-parametric basis expansion model 19 that models the PSD throughout the geographic region of interest across space and frequency based on the sensed observations relayed to the fusion center via the CRs. In accordance with non-parametric basis expansion model 19, fusion center 16 may compute and output one or more PSD maps 17. In one example of system 10, FC 16 includes and maintains PSD maps 17 and model 19 within a database or other computer-readable storage device along with location data for each of CRs 12. Each location may, for example, be represented as a position vector within the geographic region. A dedicated control channel may be established by which CRs 12 exchange PSD observations via messages 14, which are ultimately related to FC 16 by those CRs in communication with the FC. As described below, such as shown in the example system of FIG. 2, the techniques may readily be used in a distributed fashion for in-network spectrum cartography without a fusion center.

With respect to FIG. 1, in general, FC 16 applies the techniques described herein to compute one or more PSD maps for the geographic region. In one example, FC 16 applies non-parametric basis pursuit as a form of signal expansion for constructing model 19 and PSD maps 17 based on the observations. That is, FC 16 may apply the techniques described herein to construct a non-parametric basis expansion model 19 representative of the power spectral density for RF power distribution throughout the geographic region of interest. In general, a basis expansion model consists of a superposition of shifted and scaled versions of reference basis functions. In one example, the non-parametric basis expansion model described herein comprises a set of reference basis functions and a set of kernel-based interpolating functions as coefficient functions to the reference basis functions, i.e., basis weighting functions. The reference basis functions represent the frequency distribution of the RF power, i.e., RF power present at different frequency slots. The kernel-based interpolating functions represent the physical distribution of the RF power throughout the geographic region for the frequency slots and operate to interpolate the PSD measurements across space using one or more kernel-based methods. The kernel-based interpolating functions that represent the physical distribution of the RF power may, for example, belong to a reproducing kernel Hilbert space (RKHS).

As described herein, FC 16 computes sparse coefficients for the basis expansions as bases weighting functions, i.e., the kernel-based interpolating functions used to interpolate across space, instead of scalars to more accurately represent the signals transmitted from RF-enabled devices 15. As used herein, a nonparamentric basis expansion model refers to a basis expansion model where scaling coefficients of the reference basis functions are computed as basis weighting functions that belong to a function space instead of scalars, as used in a parametric basis expansion model. As such, in accordance with the techniques described herein, kernel-based interpolating functions that interpolate the PSD across space are computed as coefficients to the reference basis functions. In this way, the kernel-based interpolating functions operate as bases weighting functions in the non-parametric basis expansion model. Moreover, as described in further detail below, in some example, a number of different types of kernels may be used to accurately model the physical (i.e., geographic) distribution of RF power over the region so as to enhance the ability of the model to accurately reflect fading and multi-path characteristics of the environment. In this way, multiple different types of kernel-based interpolating functions may be incorporate to interpolate the PSD measurements and used as basis weighting functions within the model.

In some example, FC 16 may perform a most parsimonious sparse signal expansion using an overcomplete basis set to compute the basis expansion model and construct one or more the PSD maps. That is, examples of the expansion model described herein may utilize a sparsest subset of the overcomplete set of bases when computing the model to construct the PSD maps.

In one example, FC 16 includes a computing system of one or more computing devices that employ a novel field estimator based on a regularized variational least-squares (LS) criterion that yields finitely-parameterized (function) estimates spanned by thin-plate splines. An over-complete set of (possibly overlapping) basis functions may be used, while a sparsifying regularizer augmenting the LS cost endows the estimator with the ability to select a few of these bases that "better" explain the data using a parsimonious field representation.

In general, spline-based field estimation involves approximating a deterministic map $g:R^n \to R$ from a finite number of its noisy data samples, by minimizing a variational least-squares (LS) criterion regularized with a smoothness-controlling functional. In the dilemma of trusting a model (parametric) versus trusting the data (non-parameteric), splines favor the latter since only a mild regularity condition is imposed on the derivatives of g, which is otherwise treated as a generic function. While this generality is inherent to the variational formulation, the smoothness penalty renders the estimated map unique and finitely parameterized. With the variational problem solution expressible by polynomials and specific kernels, the aforementioned map approximation task reduces to a parameter estimation problem. Consequently, thin-plate splines operate as a reproducing kernel Hilbert space (RKHS) learning machine in a suitably defined (Sobolev) space.

Although splines emerge as variational LS estimators of deterministic fields, they are also connected to classes of estimators for random fields. The first class assumes that estimators are linearly related to the measured samples, while the second one assumes that fields are Gaussian distributed. The first corresponds to the Kriging method while the second to the Gaussian process model; but in both cases one deals with a best linear unbiased estimator (BLUE). Typically, wide sense stationarity is assumed for the field's spatial correlation needed to form the BLUE. The so-termed generalized covariance model adds a parametric nonstationary term comprising known functions specified a priori. Inspection of the BLUE reveals that if the nonstationary part is selected to comprise polynomials, and the spatial correlation is chosen to be the splines kernel, then the Kriging, Gaussian process, and spline-based estimators coincide.

Bearing in mind this unifying treatment of deterministic and random fields, one example technique described in this disclosure is spline-based estimation, and the practically motivated sparse (and thus parsimonious) description of the wanted RF field for the spatial region of interest. Toward these goals, the following basis expansion model (BEM) is adopted for the computing PSD maps 17:

$$\Phi(x, f) = \sum_{v=1}^{N_b} g_v(x) b_v(f) \quad (1)$$

with $x \in R^2$, $f \in R$, and the $L_2$-norms $\{\|b_v(f)\|_{L_2} = 1\}_{v=1}^{N_b}$ normalized to unity.

The bases $\{b_v(f)\}_{v=1}^{N_b}$ are preselected, and the functions $g_v(x)$ are to be estimated based on noisy samples of $\Phi$. This way, the model-versus-data balance is calibrated by introducing a priori knowledge on the dependence of the map $\Phi$ with respect to variable f, or more generally a group of variables, while trusting the data to dictate the functions $g_v(x)$ of the remaining variables x.

Consider selecting $N_b$ basis functions using the basis pursuit approach, which entails an extensive set of bases thus rendering $N_b$ overly large and the model overcomplete. This motivates augmenting the variational LS problem with a suitable sparsity-encouraging penalty, which endows the map estimator with the ability to discard factors $g_v(x) b_v(f)$, only keeping a few bases that "better" explain the samples acquired by CRs 12. This attribute is inherited because the novel sparsity-aware spline-based method of this disclosure induces a group-Lasso estimator for the coefficients of the optimal finitely-parameterized $g_v$. Group-Lasso estimators set groups of weak coefficients to zero (here the $N_b$ groups associated with coefficients per $g_v$), and outperform the sparsity-agnostic LS estimator by capitalizing on the sparsity present.

In one example, the novel estimator of FC 16 applies an iterative group-Lasso algorithm that yields closed-form estimates per iteration. In another example, CRs 12 or any other plurality of processing centers implement a distributed version of this algorithm, described herein, for the samples collected by the CRs. This provides for computational load-balancing of multi-device or multiprocessor architectures.

In one example, FC 16 implements the basis expansion model described herein for spectrum cartography for wireless cognitive radio (CR) networks. CR technology may be used to address bandwidth under-utilization versus spectrum scarcity, which has rendered fixed-access communication networks inefficient. CRs 12 sense the ambient interference spectrum to enable spatial frequency reuse and allow for dynamic spectrum allocation in accordance with the PSD maps 17 computed by FC 16. Collaboration among CRs 12 can markedly improve the sensing performance and reveal opportunities for spatial frequency reuse. Unlike existing approaches that have mostly relied on detecting spectrum occupancy per radio, the techniqeus described herein account for spatial changes in the radio frequency (RF) ambiance, especially at intended receiver(s) which may reside several hops away from the sensed area.

The novel field estimation techniques applied in system 10 is a collaborative sensing scheme whereby receiving CRs 12 and FC 16 cooperate to estimate the distribution of power in space x and frequency f, namely the power spectrum density (PSD) map $\Phi(x,f)$, from local periodogram measurements. In examples, the estimator is precise enough to identify spectrum holes, which justifies adopting the known bases to capture the PSD frequency dependence. As far as the spatial dependence is concerned, the techniques account for path loss, fading, mobility, and shadowing effects, all of which vary with the propagation medium. For this reason, the collected PSD observations 14 data is used dictate the spatial component. Determination of the PSD at any location may allow remote CRs 12 to reuse dynamically idle bands. It also enables CRs 12 to adapt their transmit-power so as to minimally interfere with licensed transmitters. The spline-based PSD map here provides an alternative to conventional techniques, where known bases are used both in space and frequency. In one example, the field estimator here does not presume a spatial covariance model or pathloss channel model. Moreover, it captures general propagation characteristics including both shadowing and fading.

In this disclosure, operators $\otimes$, $(\cdot)'$, $\text{tr}(\cdot)$, $\text{rank}(\cdot)$, $\text{bdiag}(\cdot)$, $E[\cdot]$ will denote Kronecker product, transposition, matrix trace, rank, block diagonal matrix and expectation, respectively; $|\cdot|$ will be used for the cardinality of a set, and the magnitude of a scalar. The $L_2$ norm of function $b:R \to R$ is $$\|b\|_{L_2}^2 := \int_{-\infty}^{\infty} b^2(f) df,$$

while the $\ell_p$ norm of vector $x \in R^p$ is $$|x|_p := \left(\sum_{i=1}^{p} |x_i|^p\right)^{1/p}$$

for $p \geq 1$; and $|M|_F := \sqrt{\text{tr}(MM')}$ is the matrix Frobenius norm. Positive definite matrices will be denoted by $>0$. The $p \times p$ identity matrix will be represented by $I_p$, while $0_p$ will denote the $p \times 1$ vector of all zeros, and $0_{p \times q} := 0_p 0'_q$. The i-th vector in the canonical basis for $R^p$ will be denoted by $e_{p,i}$, $i=1, \ldots, p$.

Basis Expanion Model for Spectrum Cartography

Figure 3:
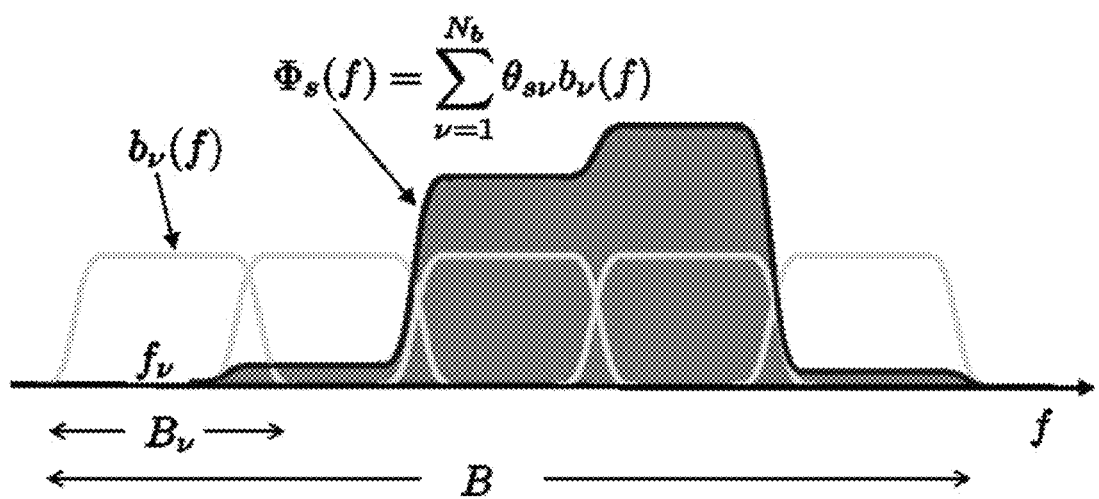
FIG. 3 is a graph showing expansion with overlapping raised cosine pulses.

Consider a set of $N_s$ sources transmitting signals $\{u_s(t)\}_{s=1}^{N_s}$ using portions of the overall bandwidth B. The objective of revealing which of these portions (sub-bands) are available for new systems to transmit, motivates modeling the transmit-PSD of each $u_s(t)$ as $$\Phi_s(f) = \sum_{v=1}^{N_b} \Theta_{sv} b_v(f), s = 1, \ldots, N_s \quad (2)$$

where the basis $b_v(f)$ is centered at frequency $f_v$, $v=1, \ldots, N_b$. The example depicted in FIG. 3 involves (generally overlapping) raised cosine bases with support $B_v = [f_v - (1+\varrho)/2T_s, f_v + (1+\varrho)/2T_s]$, where $T_s$ is the symbol period, and $\varrho$ stands for the roll-off factor. Such bases can model transmit-spectra of e.g., multicarrier systems. In other situations, power spectral masks may dictate sharp transitions between contiguous sub-bands, cases in which non-overlapping rectangular bases may be more appropriate. All in all, the set of bases should be selected to accommodate a priori knowledge about the PSD.

The power transmitted by a source s (e.g., any of RF-enabled devices 15) will propagate to the location $x \in R^2$ according to a generally unknown spatial loss function $l_s(x)$: $R^2 \to R$. Specifically, $l_s$ takes the form $l_s(x) := E[|H_{sx}(f)|^2]$, where $H_{sx}$ stands for the frequency response of the channel from source s to the receiver positioned at x. The propagation model $l_s(x)$ not only captures frequency-flat deterministic pathloss, but also stationary, block-fading and even frequency-selective Rayleigh channel effects, since their statistical moments do not depend on the frequency variable. In this case, the following vanishing memory assumption is required on the transmitted signals for the spatial receive-PSD $\Phi(x,f)$ to be factorizable as $l_s(x)\Phi_s(f)$.

Sources 15 represented as $\{u_s(t)\}_{s=1}^{N_s}$ are stationary, mutually uncorrelated, independent of the channels, and have vanishing correlation per coherence interval; i.e., $r_{ss}(\tau) := E[u_s(t+\tau)u_s(t)] = 0$, $\forall: |\tau| > T_c - L$, where $T_c$ and L represent the coherence interval and delay spread of the channels, respectively.

As such, the contribution of source s to the PSD at point x is $$l_s(x) \sum_{v=1}^{N_b} \Theta_{sv} b_v(f);$$

and the PSD due to all sources received at x will be given by $$\Phi(x, f) = \sum_{s=1}^{N_s} l_s(x) \sum_{v=1}^{N_b} \Theta_{sv} b_v(f).$$

Note that $\Phi(x,f)$ is not time dependent, but takes into account the randomness of the channels. Such spatial PSD model can be simplified by defining the function $$g_v(x) := \sum_{s=1}^{N_s} \Theta_{sv} l_s(x).$$

With this definition and upon exchanging the order of summation, the spatial PSD model takes form, where functions $\{g_v(x)\}_{v=1}^{N_b}$ are to be estimated. They represent the aggregate distribution of power across space corresponding to the frequencies spanned by the bases $\{b_v\}$. Observe that the sources are not explicitly present in (eq. 1). Even if this model could have been postulated directly for the cartography task at hand, the previous discussion justifies the factorization of the $\Phi(x,f)$ map per band in factors depending on each of the variables x and f.

In one example, FC 16 and CRs 12 applies cooperative Spline-Based PSD Field Estimation to compute PSDs 17. In this example, the sensing strategy relies on the periodogram estimate $\phi_{rn}(\tau)$ at a set of receiving (sampling) locations $X:=\{x_r\}_{r=1}^{N_r}\in R^2$, frequencies $F:=\{f_n\}_{n=1}^{N}\in B$, and time-slots $\{\tau\}_{\tau=1}^{T}$. In order to reduce the periodogram variance and mitigate fading effects, $\phi_{rn}(\tau)$ is averaged across a window of T time-slots to obtain:

$$\phi_m := \frac{1}{T}\sum_{\tau=1}^{T}\varphi_m(\tau). \quad (3)$$

Hence, the envisioned setup consists of $N_r$ receiving CRs, which collaborate to construct the PSD map based on PSD observations $\{\Phi_{rn}\}$. The bulk of processing is performed centrally at a fusion center (FC), which is assumed to know the position vectors X of all CRs, and the sensed tones in F. The FC receives over a dedicated control channel, the vector of samples $\Phi_r:=[\Phi_{r1},\ldots,\Phi_{rN}]'\in R^N$ taken by node r for all $r=1,\ldots,N_r$.

While a BEM could be introduced for the spatial loss function $l_s(x)$ as well, the uncertainty on the source locations and obstructions in the propagation medium may render such a model imprecise. This will happen, e.g., when shadowing is present. Instead, the techniques described here utilize estimation of the functions $g_v(x)$ based on the data $\{\Phi_{rn}\}$. To capture the smooth portions of $\Phi(x,f)$, the criterion for selecting $g_v(x)$ will be regularized using a so termed thin-plate penalty. This penalty extends to $R^2$ the one-dimensional roughness regularization used in smoothing spline models. Accordingly, functions $\{g_v\}_{v=1}^{N_b}$ are estimated as:

$$\{\hat{g}_v\}_{v=1}^{N_b} := \mathrm{argmin}_{\{g_v\in S\}} \frac{1}{N_r N}\sum_{r=1}^{N_r}\sum_{n=1}^{N}\left(\phi_m - \sum_{v=1}^{N_b} g_v(x_r)b_v(f_n)\right)^2 + \lambda\sum_{v=1}^{N_b}\int_{R^2} \|\nabla^2 g_v(x)\|_F^2 dx \quad (4)$$

where $\|\nabla^2 g_v\|_F$ denotes the Frobenius norm of the Hessian of $g_v$.

The optimization is over S, the space of Sobolev functions. The parameter $\lambda \geq 0$ controls the degree of smoothing. Specifically, for $\lambda=0$ the estimates in (eq. 4) correspond to rough functions interpolating the data; while as $\lambda \to \infty$ the estimates yield linear functions (cf. $\nabla^2 \hat{g}_v(x) \equiv 0_{2\times 2}$). A smoothing parameter in between these limiting values will be selected using a leave-one-out cross-validation (CV) approach, as discussed later.

The thin-plate splines solution is now described. The optimization problem (eq. 4) is variational in nature, and in principle requires searching over the infinite-dimensional functional space S. It turns out that (eq. 4) admits closed-form, finite dimensional minimizers $\hat{g}_v(x)$, as presented in the following proposition.

Proposition 1: The estimates $\{\hat{g}_v\}_{v=1}^{N_b}$ in (4) are thin-plate splines expressible in closed form as $$\hat{g}_v(x) = \sum_{r=1}^{N_r}\beta_{vr}K(\|x-x_r\|_2) + \alpha'_{v1}x + \alpha_{v0} \quad (5)$$

where $K(\rho):=\rho^2 \log(\rho)$, and $\beta_v:=[\beta_{v1},\ldots,\beta_{vN_r}]'$ is constrained to the linear subspace $\mathcal{B}:=\{\beta\in\mathbb{R}^{N_r}:\sum_{r=1}^{N_r}\beta_r=0, \sum_{r=1}^{N_r}\beta_r x_r=0_2, :x_r\in X\}$ for $v=1,\ldots,N_b$.

If the basis functions have finite supports which do not overlap, then (eq. 4) decouples per $g_v$. One novelty of Proposition 1 is that the basis functions with spatial spline coefficients in (eq. 1) are allowed to be overlapping. The implication of Proposition 1 is a finite parametrization of the PSD map [cf. (eq. 5)]. This is particularly important for non-FDMA based CR networks. In the forthcoming description, an overcomplete set is adopted in (eq. 1), and overlapping bases naturally arise therein.

What is left to determine are the parameters $$\alpha := [\alpha_{10}, \alpha'_{11}, \ldots, \alpha_{N_b 0}, \alpha'_{N_b 1}]' \in R^{3N_b},$$
$$\text{and } \beta := [\beta'_1, \ldots, \beta'_{N_b}]' \in R^{N_r N_b}$$

in (eq. 5). To this end, define the vector $$\phi := [\phi_{11},\ldots,\phi_{1N},\ldots,\phi_{N_r 1},\ldots,\phi_{N_r N}]' \in R^{N_r N}$$

containing the network-wide data obtained at all frequencies in F. Three matrices are also introduced collecting the regression inputs: i) $T\in R^{N_r\times 3}$ with rth row $t'_r:=[1:x'_r]$ for $r=1,\ldots,N_r$ and $x_r\in X$; ii) $B\in R^{N\times N_b}$ with nth row $b'_n:=[b_1(f_n),\ldots,b_{N_b}(f_n)]$ for $n=1,\ldots,N$; and iii) $K\in R^{N_r\times N_r}$ with ij-th entry $[K]_{ij}:=K(\|x_i-x_j\|)$ for $x_i,x_j\in X$. Consider also the QR decompositions of $T=[Q_1:Q_2][R'\ 0]'$ and $B=[\Omega_1:\Omega_2][\Gamma'\ 0]'$.

Upon plugging (eq. 5) into (eq. 4), the optimal $\{\alpha,\beta\}$ satisfy the following system of equations:

$$(B\otimes Q'_2)\phi = [(B'B\otimes Q'_2KQ_2) + N_r N\lambda I_{N_b(N_r-3)}]\hat{\gamma} \quad (6)$$

$$[\Gamma\otimes R]\hat{\alpha} = (\Omega'_1\otimes Q'_1)\phi - (\Gamma\otimes Q'_1KQ_2)\hat{\gamma} \quad (7)$$

$$\hat{\beta} = (I_{N_b}\otimes Q_2)\hat{\gamma}. \quad (8)$$

Matrix $Q'_2 K Q_2$ is positive definite, and rank$(\Gamma\otimes R)$=rank$(\Gamma)$rank$(R)$. It thus follows that (eq 6)-(eq. 7) admit a unique solution if and only if $\Gamma$ and R are invertible (correspondingly, B and T have full column rank). These conditions place practical constraints that should be taken into account at the system design stage. Specifically, T has full column rank if and only if the points in X, i.e., the CR locations, are not aligned. Furthermore, B will have linearly independent columns provided the basis functions $\{b_v(f)\}_{v=1}^{N_b}$ comprise a linearly independent and complete set, i.e., $\mathcal{B}\subset\cap_v\mathcal{B}_v$. Note that completeness precludes all frequencies $\{f_n\}_{n=1}^{N}$ from falling outside the aggregate support of the basis set, hence preventing undesired all-zero columns in B.

The condition on X does not introduce an actual limitation as it can be easily satisfied in practice, especially when CRs 12 are randomly deployed. Likewise, the basis set is part of the system design, and can be chosen to satisfy the conditions on B.

Therefore, in one example, FC 16 may execute program to perform the following method constituting the spline-based spectrum cartography algorithm, which amounts to estimating $\Phi(x,f)$:

Step 1: Given $\Phi$, solve (eq. 6)-(eq. 8) for $\hat{\alpha}$, $\hat{\beta}$, after selecting $\lambda$ as detailed herein.

Step 2: Substitute $\hat{\alpha}$ and $\hat{\beta}$ into (eq. 5) to obtain $\{\hat{g}_v(x)\}_{v=1}^{N_b}$.

Step 3: Use $\{\hat{g}_v(x)\}_{v=1}^{N_b}$ in (eq. 1) to estimate $\Phi(x,f)$.

In one embodiment, FC 16 includes PSD tracker 24 that adapts to time-varying PSDs. The real-time requirements on the sensing radios and the convenience of an estimator that adapts to changes in the spectrum map are the motivating reasons behind the PSD tracker introduced in this section. The spectrum map estimator will be henceforth denoted by $\Phi(x,f,\tau)$, to make its time dependence explicit.

PSD tracker 24 defines the vector $\phi_n(\tau):=[\phi_{1n}(\tau), \ldots, \phi_{N_rn}(\tau)]'$ of periodogram samples taken at frequency $f_n$ by all CRs, and forms the supervector $$\varphi(\tau) := [\varphi_1'(\tau), \ldots, \varphi_N'(\tau)]' \in R^{N_rN}.$$

Per time-slot $\tau=1,2,\ldots$, the periodogram $\phi(\tau)$ is averaged using the following adaptive counterpart of (eq. 3):

$$\phi(\tau) := \sum_{\tau'=1}^{\tau} \delta^{\tau-\tau'} \varphi(\tau') = \delta\phi(\tau-1) + \varphi(\tau) \quad (9)$$

which implements an exponentially weighted moving average operation with forgetting factor $\delta \in (0,1)$. For every $\tau$, the online estimator $\Phi(x,f,\tau)$ is obtained by plugging in (eq. 1) the solution $\{\hat{g}_v(x,\tau)\}_{v=1}^{N_b}$ of (eq. 4), after replacing $\Phi_{rn}$ with $\Phi_{rn}(\tau)$ [cf. the entries of the vector in (eq. 9)]. In addition to mitigating fading effects, this adaptive approach can track slowly time-varying PSDs because the averaging in (eq. 9) exponentially discards past data.

Suppose that per time-slot $\tau$, FC 16 receives raw periodogram samples $\phi(\tau)$ from the CRs in order to update $\Phi(x,f,\tau)$. The techniques described herein apply for every $\tau$, meaning that $\{\hat{g}_v(x,\tau)\}_{v=1}^{N_b}$ are given by (eq. 5), while the optimum coefficients $\{\hat{\alpha}(\tau),\hat{\beta}(\tau)\}$ are found after solving (eq. 6)-(eq. 8). Capitalizing on (eq. 9), straightforward manipulations of (eq. 6)-(eq. 8) show that $\{\hat{\alpha}(\tau),\hat{\beta}(\tau)\}$ are recursively given for all $\tau \geq 1$ by:

$$\hat{\beta}(\tau)=\delta\hat{\beta}(\tau-1)+(I_{N_b} \otimes Q_2)G_1\phi(\tau) \quad (10)$$

$$\hat{\alpha}(\tau)=\delta\hat{\alpha}(\tau-1)+G_2\phi(\tau) \quad (11)$$

where the time-invariant matrices $G_1$ and $G_2$ are $$G_1 := [(B'B \otimes Q_2'KQ_2) + N_rN\lambda I_{N_b(N_r-3)}]^{-1}(B \otimes Q_2')$$

$$G_2 := [\Gamma \otimes R]^{-1}[(\Omega_1' \otimes Q_1') - (\Gamma \otimes Q_1'KQ_2)G_1].$$

Recursions (eq. 10)-(eq. 11) provide a means to update $\Phi(x,f,\tau)$ sequentially in time, by incorporating the newly acquired data from the CRs in $\phi(\tau)$. There is no need to separately update $\Phi(\tau)$ as in (eq. 9), yet the desired averaging takes place. Furthermore, matrices $G_1$ and $G_2$ need to be computed only once, during the startup phase of the network.

In one example, FC 16 utilizes Group-Lasso on Splines as an improved spline-based PSD estimator to fit the unknown spatial functions $\{g_v\}_{v=1}^{N_b}$ in the model $$\Phi(x,f) = \sum_{v=1}^{N_b} g_v(x)b_v(f),$$

with a large ($N_b \gg N_rN$), and a possibly overcomplete set of known basis functions $\{b_v\}_{v=1}^{N_b}$. These models are particularly attractive when there is an inherent uncertainty on the transmitters' parameters, such as central frequency and bandwidth of the pulse shapers; or, e.g., the roll-off factor when raised-cosine pulses are employed. In particular, adaptive communication schemes may rely on frequently adjusting these parameters. A sizeable collection of bases to effectively accommodate most of the possible cases provides the desirable robustness. Still, prior knowledge available on the incumbent communication technologies being sensed may be exploited to choose the most descriptive classes of basis functions; e.g., a large set of raised-cosine pulses. Known bases may be selected to describe frequency characteristics of the PSD map, while a variational approach may be used to capture spatial dependencies.

In this context, the envisioned estimation method should provide the CRs with the capability of selecting a few bases that "better explain" the actual transmitted signals. As a result, most functions $g_v$ are expected to be identically zero; hence, there is an inherent form of sparsity present that can be exploited to improve estimation. The rationale behind the proposed approach can be rooted in the basis pursuit principle, a technique for finding the most parsimonious sparse signal expansion using an overcomplete basis set. A major differentiating aspect however, is that the sparse coefficients in the basis expansions are not treated as scalars but instead model (eq. 1) implemented by FC 16 entails bases weighted by functions $g_v$.

The proposed approach to sparsity-aware spline-based field estimation from the space-frequency power spectrum measurements $\Phi_{rn}$ [cf. (eq. 3)], is to obtain $\{\hat{g}_v\}_{v=1}^{N_b}$ as $$\{\hat{g}_v\}_{v=1}^{N_b} := \text{argmin}_{\{g_v \in S\}} \frac{1}{N_rN}\sum_{r=1}^{N_r}\sum_{n=1}^{N}\left(\phi_{rn} - \sum_{v=1}^{N_b} g_v(x_r)b_v(f_n)\right)^2 + \quad (12)$$

$$\lambda\sum_{v=1}^{N_b}\int_{R^2}\|\nabla^2 g_v(x)\|_F^2 dx + \mu\sum_{v=1}^{N_b}\|[g_v(x_1),\ldots,g_v(x_{N_r})]_2'\|$$

Relative to (eq. 4), the cost here is augmented with an additional regularization term weighted by a tuning parameter $\mu \geq 0$. If $\mu=0$ then (eq. 12) boils down to (eq. 4). To appreciate the role of the new penalty term, note that the minimization of $$\|[g_v(x_1),\ldots,g_v(x_{N_r})]_2'\|$$

intuitively shrinks all pointwise functional values $\{g_v(X_1),\ldots,g_v(X_{N_r})\}$ to zero for sufficiently large $\mu$. Interestingly, it will be shown in the ensuing section that this is enough to guarantee that $\hat{g}_v(x)\equiv 0$ $\forall x$, for $\mu$ large enough.

Estimation using the group-Lasso technique is described. Consider linear regression, where a vector $y \in R^n$ of observations is available, along with a matrix $X \in R^{n \times p}$ of inputs. The group Lasso estimate for the vector of features $\zeta := [\zeta'_1, \ldots, \zeta'_{N_b}]' \in \mathbb{R}^p$, is defined as the solution to $$\min_\zeta \frac{1}{2} |y - X\zeta|_2^2 + \mu \sum_{v=1}^{N_b} |\zeta_v|_2. \quad (13)$$

This criterion achieves model selection by retaining relevant factors $\zeta_v \in \mathbb{R}^{p/N_b}$ in which the features are grouped. In other words, group-Lasso encourages sparsity at the factor level, either by shrinking to zero all variables within a factor, or by retaining them altogether depending on the value of the tuning parameter $\mu \geq 0$. As $\mu$ is increased, more sub-vector estimates $\zeta_v$ become zero, and the corresponding factors drop out of the model. It can be shown from the Karush-Kuhn-Tucker optimality conditions that only for $\mu \geq \mu_{max} := \max_i |X'_i y|_2$ it holds that $\zeta_1 = \ldots = \zeta_{N_b} = 0_{p/N_b}$, so that the values of interest are $\mu \in [0, \mu_{max}]$.

The connection between (eq. 13) and the spline-based field estimator (eq. 12) builds on Proposition 1, which still holds in this context. That is, even though criteria (eq. 4) and (eq. 12) purposely differ, their respective solutions $\hat{g}_v(x)$ have the same form in (eq. 5). The essential difference manifested by this penalty is revealed when estimating the parameters $\alpha$ and $\beta$ in (eq. 5), as presented in the following proposition:

Proposition 2: The spline-based field estimator (12) is equivalent to group-Lasso (13), under the identities $$X := \frac{\begin{bmatrix} B \otimes I_{N_r} \\ I_{N_r} \otimes \left\{ bdiag\left( (N_r N \lambda Q'_2 K Q_2)^{\frac{1}{2}}, 0 \right) [KQ_2 T]^{-1} \right\} \end{bmatrix}}{\sqrt{N_r N}} \quad (14)$$

$$y := \frac{1}{\sqrt{N_r N}} [\varphi', 0]'$$

with their respective solutions related by $$\hat{g}_v(x) = \sum_{r=1}^{N_r} \beta_{vr} K(\|x - x_r\|_2) + \alpha'_{v1} x + \alpha_{v0} \quad (15)$$

$$[\beta'_v, \alpha'_v]' = bdiag(Q_2, I_3)[KQ_2 T]^{-1} \hat{\zeta}_v \quad (16)$$

where $\beta_v := [\beta_{v1}, \ldots, \beta_{vN_r}]'$ and $\alpha_v := [\alpha_{v0}, \alpha'_{v1}]'$.

The factors $\{\zeta_v\}_{v=1}^{N_b}$ in (eq. 13) are in one-to-one correspondence with the vectors $\{[\beta'_v, \alpha'_v]'\}_{v=1}^{N_b}$ through the linear mapping (eq. 16). This implies that whenever a factor $\zeta_v$ is dropped from the linear regression model obtained after solving (eq. 13), then $\hat{g}_v(x) = 0$, and the term corresponding to $b_v(f)$ does not contribute to (eq. 1). Hence, by appropriately selecting the value of $\mu$, criterion (eq. 12) has the potential of retaining only the most significant terms in $$\Phi(x, f) = \sum_{v=1}^{N_b} g_v(x) b_v(f),$$

and thus yields parsimonious PSD map estimates. All in all, the motivation behind the variational problem (eq. 12) is now unravelled. The additional penalty term not present in (eq. 4) renders (eq. 12) equivalent to a group-Lasso problem. This enforces sparsity in the parameters of the splines expansion for $\Phi(x,f)$ at a factor level, which potentially nulls the less descriptive functions $g_v$.

The group-Lassoed splines-based approach to spectrum cartography applied by one example of FC 16 can be summarized in the following method to estimate the global PSD map $\Phi(x,f)$:

Step 1. Given $\Phi$ and utilizing any group Lasso solver, obtain $\hat{\zeta} := [\hat{\zeta}'_1, \ldots, \hat{\zeta}'_{N_b}]'$ by solving (eq. 13).

Step 2. Form the estimates $\hat{\alpha}, \hat{\beta}$ using the change of variables $[\hat{\beta}'_v, \hat{\alpha}'_v]' = bdiag(Q_2, I_3)[KQ_2 :: T]^{-1} \hat{\zeta}_v$ for $v = 1, \ldots, N_b$.

Step 3. Substitute $\hat{\alpha}$ and $\hat{\beta}$ into (eq. 15) to obtain $\{\hat{g}_v(x)\}_{v=1}^{N_b}$.

Step 4. Use $\{\hat{g}_v(x)\}_{v=1}^{N_b}$ in (eq. 1) to estimate $\Phi(x,f)$.

Implementing Steps 1-Stes 4 presumes that CRs 12 communicate their local PSD estimates to a fusion center, which uses their aggregation in $\Phi$ to estimate the field. In certain examples, a designer or system operator of system 10 may forgo FC 16 to avoid an isolated point of failure, or to aims at a network topology which scales well with an increasing number of CRs 12 based on power considerations. For example, CRs located far away from the FC will drain their batteries more to reach the FC. A fully distributed counterpart of system 10 is described next.

Figure 2:
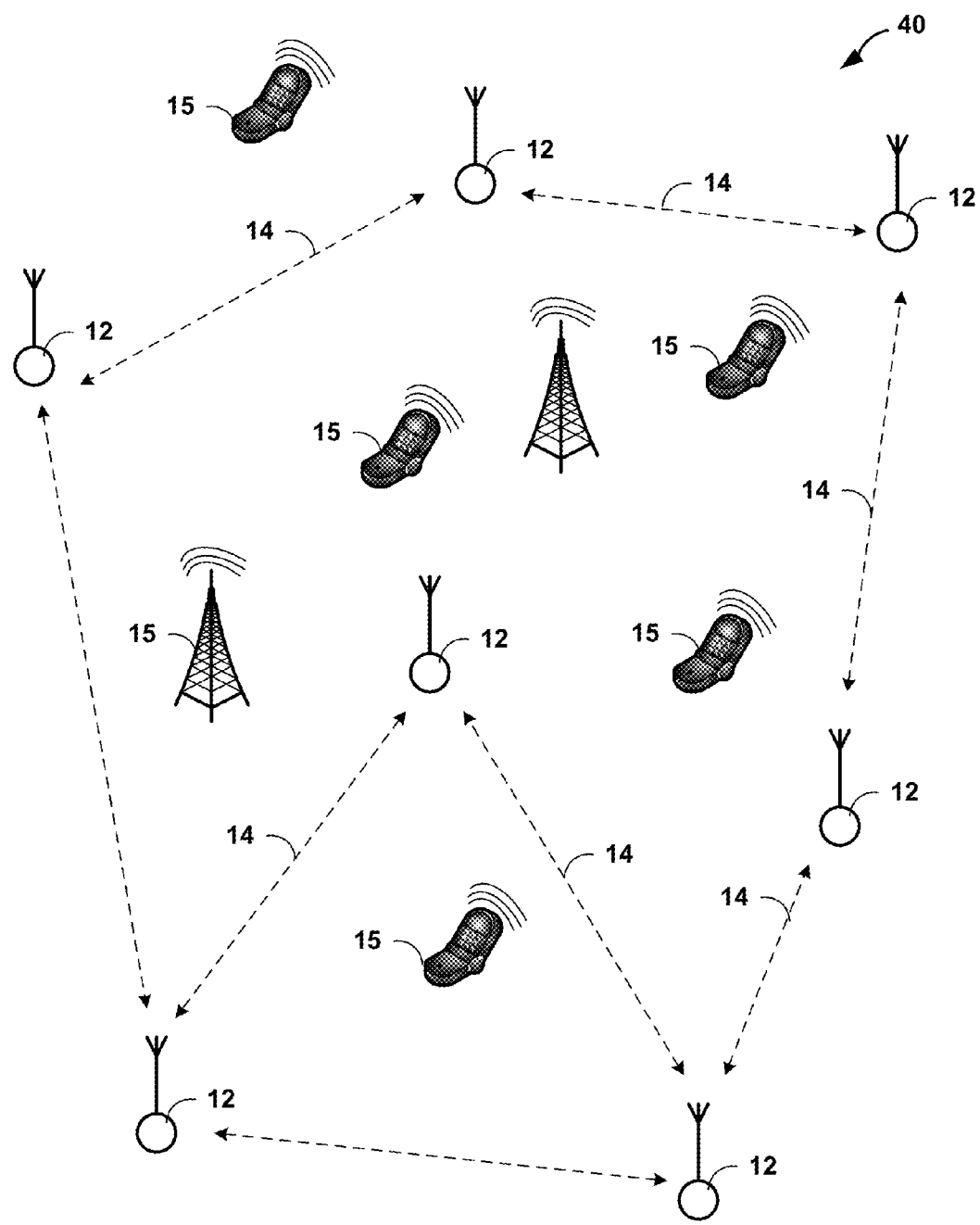
FIG. 2 is a block diagram illustrating a system in which a plurality of sensors executed distributed techniques to construct PSD maps.

FIG. 2 shows an example system 40 that utilizes distributed Group-Lasso for in-network spectrum cartography without a fusion center (e.g., FC 16 of FIG. 1). Consider $N_r$ networked CRs 12 that are capable of sensing the ambient RF spectrum, performing some local computations, as well as exchanging messages 14 among neighbors via dedicated control channels. In lieu of a fusion center, the CR network is naturally modeled as an undirected graph $G(R,E)$, where the vertex set $R := \{1, \ldots, N_r\}$ corresponds to the sensing radios, and the edges in $E$ represent pairs of CRs that can communicate. Radio $r \in R$ communicates with its single-hop neighbors in $N_r$, and the size of the neighborhood is denoted by $|N_r|$. The locations $\{x_r\}_{r=1}^{N_r} := X$ of the sensing radios are assumed known to the CR network. To ensure that the measured data from an arbitrary CR can eventually percolate throughout the entire network, it is assumed that the graph G is connected; i.e., there exists a (possibly) multi-hop communication path connecting any two CRs.

For the purpose of estimating an unknown vector $\zeta := [\zeta'_1, \ldots, \zeta'_{N_b}]' \in \mathbb{R}^p$, each radio $r \in R$ has available a local vector of observations $y_r \in \mathbb{R}^{n_r}$ as well as its own matrix of inputs $X_r \in \mathbb{R}^{n_r \times p}$. Radios collaborate to form the wanted group-Lasso estimator (eq. 13) in a distributed fashion, using $$\hat{\zeta}_{glasso} = \operatorname*{argmin}_{\zeta} \frac{1}{2} \sum_{r=1}^{N_r} \|y_r - X_r \zeta\|_2^2 + \mu \sum_{v=1}^{N_b} \|\zeta_v\|_2 \quad (17)$$

where $y := [y'_1, \ldots, y'_{N_r}]' \in \mathbb{R}^{n \times 1}$ with $n := \sum_{r=1}^{N_r} n_r$, and $X := [X'_1, \ldots, X'_{N_r}]' \in \mathbb{R}^{n \times p}$. The motivation behind developing a distributed solver of (17) is to tackle (12) based on in-network processing of the local observations $\phi_r := [\phi_{r1}, \ldots, \phi_{rN}]'$ available per radio [cf. (3)]. Indeed, it readily follows that (17) can be used instead of (13) in Proposition 2 when $$y_r := \frac{1}{\sqrt{N_r N}} \begin{bmatrix} \varphi_r \\ 0 \end{bmatrix}$$

-continued $$X_r := \frac{\begin{bmatrix} B \otimes e'_{N_r,r} \\ I_{N_b} \otimes \left[ bdiag\left((N_r N \lambda Q'_2 K Q_2)^{\frac{1}{2}}, 0\right)[K Q_2 T]^{-1} \right] \end{bmatrix}}{\sqrt{N_r N}}$$

corresponding to the identifications $n_r = N$ $\forall r \in \mathcal{R}$. $p = N_b N_r$. Note that because the locations $\{x_r\}$ are assumed known to the entire network, CR r can form matrices T, K, and thus, the local regression matrix $X_r$.

In one example, CRs 12 use consensus-based reformulation of the group-Lasso. To distribute the cost in (eq. 17), replace the global variable $\zeta$ which couples the per-agent summands with local variables $\{\zeta_r\}_{r=1}^{N_r}$ representing candidate estimates of $\zeta$ per sensing radio. It is now possible to reformulate (eq. 17) as a convex constrained minimization problem $$\{\hat{\zeta}_r\}_{r=1}^{N_r} = \arg\min_{\{\zeta_r\}} \frac{1}{2} \sum_{r=1}^{N_r} \left[ \|y_r - X_r \zeta_r\|_2^2 + \frac{2\mu}{N_r} \sum_{v=1}^{N_b} \|\zeta_{rv}\|_2 \right] \quad (18)$$

$$s. \text{ to } \zeta_r = \zeta_{r'}, r \in \mathcal{R}, r' \in N_r, \zeta_r := [\zeta'_{r1}, \ldots, \zeta'_{rN_b}]'.$$

The equality constraints directly effect local agreement across each CR's neighborhood. Since the communication graph G is assumed connected, these constraints also ensure global consensus a fortiori, meaning that $\zeta_r = \zeta'_r$, $\forall r, r' \in R$. Indeed, let $P(r,r'): r, r_1, r_2, \ldots, r_n, r'$ denote a path on G that joins an arbitrary pair of CRs (r,r'). Because contiguous radios in the path are neighbors by definition, the corresponding chain of equalities $\zeta_r = \zeta_{r_1} = \zeta_{r_2} = \ldots = \zeta_{r_n} = \zeta'_{r'}$ imply $\zeta_r = \zeta'_{r'}$, as desired. Thus, the constraints can be eliminated by replacing all the $\{\zeta_r\}$ with a common $\zeta$, in which case the cost in (eq. 18) reduces to the one in (eq. 17). This argument establishes the following result.

Lemma 1: If $\mathcal{G}$ is a connected graph, (17) and (18) are equivalent optimization problems, in the sense that $\hat{\zeta}_{glasso} = \hat{\zeta}_r$, $\forall r \in \mathcal{R}$.

To reduce the computational complexity of the resulting algorithm, for a given $a \in R^p$ consider the problem:

$$\min_\zeta \frac{1}{2} \|\zeta\|_2^2 - a'\zeta + \mu \sum_{v=1}^{N_b} |\zeta_v|_2, \zeta := [\zeta'_1, \ldots, \zeta'_{N_b}]' \quad (19)$$

and notice that it is separable in the $N_b$ subproblems $$\min_{\zeta_v} \frac{1}{2} \|\zeta_v\|_2^2 - a'_v \zeta_v + \mu |\zeta_v|_2, a := [a'_1, \ldots, a'_{N_b}]'. \quad (20)$$

Interestingly, each of these subproblems admits a closed-form solution as given in the following lemma.

Lemma 2: The minimizer $\zeta^*_v$ of (20) is obtained via the vector soft-thresholding operator $T_\mu(\bullet)$ defined by $$\zeta^*_v = T_\mu(a_v) := \frac{a_v}{\|a_v\|_2} (\|a_v\|_2 - \mu)_+ \quad (21)$$

where $(\bullet)_+ := \max\{\bullet, 0\}$.

Problem (eq. 19) is an instance of the group-Lasso (eq. 13) when $X'X = I_p$, and $a := X'$.

In order to take advantage of Lemma 2, auxiliary variables $\gamma_r$, $r = 1, \ldots, N_r$ are introduced as copies of $\zeta_r$. Upon introducing appropriate constraints $\gamma_r = \zeta_r$ that guarantee the equivalence of the formulations along the lines of Lemma 1, problem (eq. 18) can be recast as $$\min_{\{\zeta_r, \gamma_r, \gamma_r^{r'}\}} \frac{1}{2} \sum_{r=1}^{N_r} \left[ \|y_r - X_r \gamma_r\|_2^2 + \frac{2\mu}{N_r} \sum_{v=1}^{N_b} \|\zeta_{rv}\|_2 \right] \quad (22)$$

$$s. \text{ to } \zeta_r = \gamma_r^{r'} = \zeta_{r'}, r \in \mathcal{R}, r' \in N_r$$

$$\gamma_r = \zeta_r, r \in \mathcal{R}.$$

The dummy variables $\gamma_r^{r'}$ are inserted for technical reasons that will become apparent in the ensuing section, and will be eventually eliminated.

In one example, the distributed group-Lasso algorithm is constructed by optimizing (eq. 22) using an alternating direction method of multipliers (AD-MoM). In this direction, associate Lagrange multipliers $v_r$, $\bar{v}_r^{r'}$ and $\tilde{v}_r^{r'}$ with the constraints $\gamma_r = \zeta_r$, $\zeta_r' = \gamma_r^{r'}$ and $\zeta_r = \gamma_r^{r'}$, respectively, and consider the augmented Lagrangian with parameter $c > 0$ $$\mathcal{L}_c[\{\zeta_r\}, \gamma, v] = \quad (23)$$

$$\frac{1}{2} \sum_{r=1}^{N_r} \left[ \|y_r - X_r \gamma_r\|_2^2 + \frac{2\mu}{N_r} \sum_{v=1}^{N_b} \|\zeta_{rv}\|_2 \right] + \sum_{r=1}^{N_r} v'_r (\zeta_r - \gamma_r) +$$

$$\frac{c}{2} \sum_{r=1}^{N_r} \|\zeta_r - \gamma_r\|_2^2 + \sum_{r=1}^{N_r} \sum_{r' \in N_r} \left[ (\bar{v}_r^{r'})'(\zeta_r - \gamma_r^{r'}) + (\tilde{v}_r^{r'})'(\zeta_{r'} - \gamma_r^{r'}) \right] +$$

$$\frac{c}{2} \sum_{r=1}^{N_r} \sum_{r' \in N_r} [\|\zeta_r - \gamma_r^{r'}\|_2^2 + \|\zeta_{r'} - \gamma_r^{r'}\|_2^2]$$

where for notational convenience we group the variables $\gamma := \{\gamma_r, \{\gamma_r^{r'}\}_{r' \in N_r}\}_{r \in R}$, and multipliers $v := \{v_r, \{\bar{v}_r^{r'}\}_{r' \in N_r}, \{\tilde{v}_r^{r'}\}_{r' \in N_r}\}_{r \in R}$.

Application of the AD-MoM to the problem at hand consists of a cycle of $\mathcal{L}_c$ minimizations in a block-coordinate fashion w.r.t. $\{\zeta_r\}$ firstly, and $\gamma$ secondly, together with an update of the multipliers per iteration $k = 0, 1, 2, \ldots$. The four main properties of this procedure with respect to the resulting algorithm can be highlighted as follows.

Thanks to the introduction of the local copies $\zeta_r$ and the dummy variables $\gamma_r^{r'}$, the minimization of $L_c$ w.r.t. both $\{\zeta_r\}$ and $\gamma$ decouple per CR r, thus enabling distribution of the algorithm. Moreover, the contraints in (22) involve variables of neighboring CR's only, which allows the required communication to be local within each CR's neighborhood.

Introduction of the variable $\gamma_r$ separates the quadratic cost $\|\zeta_r - \gamma_r\|_2^2$ from the group-Lasso penalty $\Sigma_{v=1}^{N_b} \|\eta_{rv}\|_2$. As a result, minimization of (23) w.r.t $\zeta_r$ takes the form of (19), which admits a closed-form solution via the vector soft-thresholding operator $T_\mu(\bullet)$ in Lemma 2.

Minimization of (23) w.r.t. $\gamma$ consists of an unconstrained quadratic problem, which can also be solved in closed form. In particular, the optimal $\gamma_r^{r'}$ at iteration k takes the value $$\gamma_r'(k) = \frac{(\zeta_r(k) + \zeta_{r'}(k))}{2},$$

and thus can be eliminated.

It turns out that it is not necessary to carry out updates of the Lagrange multipliers $\{\tilde{v}_r^{r'}, \bar{v}_r^{r'}\}_{r' \in N_r}$ separately, but only of their sums which are henceforth denoted by $P_r := \Sigma_{r' \in N_r}(\tilde{v}_r^{r'} + \bar{v}_r^{r'})$. Hence, there is one price $P_r$ per CR=1, . . . , $N_r$, which can be updated locally.

Building on these four features, the proposed AD-MoM scheme may utlize four parallel recursions run locally per each CR 12 of FIG. 2:

Recursions (24)-(27) comprise the novel DGL algorithm, tabulate as Algorithm 1.

---
Algorithm 1: DGLasso
---

All radios $r \in R$ initialize $\{\zeta_r(0), \gamma_r(0), p_r(-1), v_r(-1)\}$ to zero, and locally run:
for k = 0, 1, . . . do
    Transmit $\zeta_r(k)$ to neighbors in $N_r$.
    Update $p_r(k) = p_r(k-1) + c \Sigma_{r' \in N_r} [\zeta_r(k) - \zeta_{r'}(k)]$.
    Update $v_r(k) = v_r(k-1) + c[\zeta_r(k) - \gamma_r(k)]$.
    Update $\zeta_r(k+1)$ using (26).
    Update $\gamma_r(k+1)$ using (27).
end for

---

$$p_r(k) = p_r(k-1) + c \sum_{r' \in N_r} [\zeta_r(k) - \zeta_{r'}(k)] \quad (24)$$

$$v_r(k) = v_r(k-1) + c[\zeta_r(k) - \gamma_r(k)] \quad (25)$$

$$\zeta_{rv}(k+1) = \quad (26)$$

$$\frac{T_p\left(N_r\left(c\gamma_{rv}(k) + c\sum_{r' \in N_r}[\zeta_{rv}(k) - \zeta_{r'v}(k)] - p_{rv}(k) - v_{rv}(k)\right)\right)}{cN_r(2N_r|+1)},$$

$$v = 1, \ldots, N_b$$

$$\gamma_r(k+1) = [cI_p + X_r'X_r]^{-1}(X_r'y_r + c\zeta_r(k+1) + v_r(k)). \quad (27)$$

The algorithm entails the following steps. During iteration k+1, CR r receives the local estimates $\{\zeta'_r(k)\}_{r' \in N_r}$ from the neighboring CRs and plugs them into (eq. 24) to evaluate the dual price vector $_r(k)$. The new multiplier $_r(k)$ is then obtained using the locally available vectors $\{\gamma_r(k), \zeta_r(k)\}$. Subsequently, vectors $\{_r(k), _r(k)\}$ are jointly used along with $\{\zeta_{r'}(k)\}_{r' \in N_r}$ to obtain $\zeta_r(k+1)$ via $N_b$ parallel vector soft-thresholding operations $T_\mu(\cdot)$ as in (eq. 21). Finally, the updated $\gamma_r(k+1)$ is obtained from (eq. 27), and requires the previously updated quantities along with the vector of local observations $_r$ and regression matrix $X_r$. The (k+1)st iteration is concluded after CR r broadcasts $\zeta_r(k+1)$ to its neighbors. Even if an arbitrary initialization is allowed, the sparse nature of the estimator sought suggests the all-zero vectors as a natural choice.

Distributed Lasso Algorithm as a Special Case: When $N_b$=p, and there are as many groups as entries of $\zeta$, then the sum $\Sigma_{v=1}^{N_b} \|\zeta_v\|$ becomes the $l_1$-norm of $\zeta$, and group-Lasso reduces to Lasso. In this case, DGLasso offers a distributed algorithm to solve Lasso.

For $N_r$=1, the network consists of a single CR. In this case, DGLasso yields an AD-MoM-based algorithm for the centralized group-Lasso estimator (eq. 17), which is specified as Algorithm 2 (below). Notice that the thresholding operator $T_p$ in GLasso sets the entire subvector $\zeta_v(k+1)$ to zero whenever $(c\gamma_v(k) - v_v(k)\|_2$ does not exceed $\mu$, in par with the group-sparsifying property of group-Lasso. An attractive feature of proximal algorithms relative to GLasso, is that they come with convergence rate guarantees. GLasso can handle a general (not orthonormal) regression matrix X. GLasso does not require an inner Newton-Raphson recursion per iteration. GLasso yields the Lasso estimator.

---
Algorithm 2: GLasso
---

Initialize $\{\zeta(0), \gamma(0), v(-1)\}$ to zero, and run:
for k = 0, 1, . . . do
    Update $v(k) = v(k-1) + c[\zeta(k) - \gamma(k)]$ Update $\zeta_v(k+1) = \left(\frac{1}{c}\right)T_\mu(c\gamma_v(k) - v_\mu(k)), v = 1, \ldots, N_b$.

Update $\gamma(k+1) = [cI_p + X'X]^{-1}(X'y + c\zeta(k+1) + v(k))$.
end for

---

In one example, CRs 12 computational load balancing the operations. For example, processing associated with updating (eq. 27) involves inversion of the p×p matrix $cI_p + X'_rX_r$, that may be computationally demanding for sufficiently large p. Fortunately, this operation can be carried out offline before running the algorithm. More importantly, the matrix inversion lemma can be invoked to obtain $[cI_p+X'X]^{-1}=c^{-1}[I_p-X'_r(cI_{p_r}+X_rX'_r)^{-1}X_r]$. In this new form, the dimensionality of the matrix to invert becomes $n_r \times n_r$, where $n_r$ is the number of locally acquired data. For highly underdetermined cases ($n_r \ll p$) (D)GLasso provides considerable computational savings through the aforementioned matrix inversion identity. The distributed operation parallelizes the numerical computation across CRs 12: if GLasso is run at a central unit (FC 16) with all network-wide data available centrally, then the matrix to invert has dimension=$\Sigma_{r \in R}N_r$, which increases linearly with the network size $N_r$. Beyond a networked scenario, DGLasso provides an alternative for computational load balancing in contemporary multi-processor architectures.

Convergence of Algorithm 1, and thus of Algorithm 2 as well, is ensured by the convergence of the AD-MoM.

Proposition 3: Let be a connected graph, and consider recursions (24)-(27) that comprise the DGLasso algorithm. Then, for any value of the step-size c>0, the iterates $\zeta_r(k)$ converge the group-Lasso solution [cf.(17)] as k-∞, for example:

$$\lim_{k \to \infty} \zeta_r(k) = \hat{\zeta}_{glasso}, \forall_r \in \mathcal{R}. \quad (28)$$

In words, all local estimates $\zeta_r(k)$ achieve consensus asymptotically, converging to a common vector that coincides with the desired estimator $\hat{\zeta}_{glasso}$. Formally, if the number of parameters p exceeds the number of data n, then a unique solution of (eq. 13) is not guaranteed for a general design matrix X. Proposition 3 remains valid however, if the right-hand side of (eq. 28) is replaced by the set of minima; that is, $$\lim_{k \to \infty} \zeta_r(k) \in \arg\min_{\zeta} \frac{1}{N_r} \sum_{r=1}^{N_r} \|y_r - X_r\zeta\|_2^2 + \mu \sum_{v=1}^{N_b} \|\zeta_v\|_2.$$

Experimental Test

Three numerical tests were performed, starting from a simulated spectrum cartography example where five frequency bases are identified from an overcomplete set of $N_b$=90 candidates. The signal propagation is affected by path-loss and Rayleigh fading. This setup is also considered to exemplify the use of cross-validation in selecting the parameters $\lambda$ and $\mu$ in (eq. 12). The second example introduces shadowing effects, and transmit signal parameters adhering to the IEEE 802.11 standard. A third numerical test is run on real RF power measurements taken at different locations in an indoor area, and frequencies in the 2.4 GHz unlicensed band.

Spectrum Cartography Test

Figure 4:
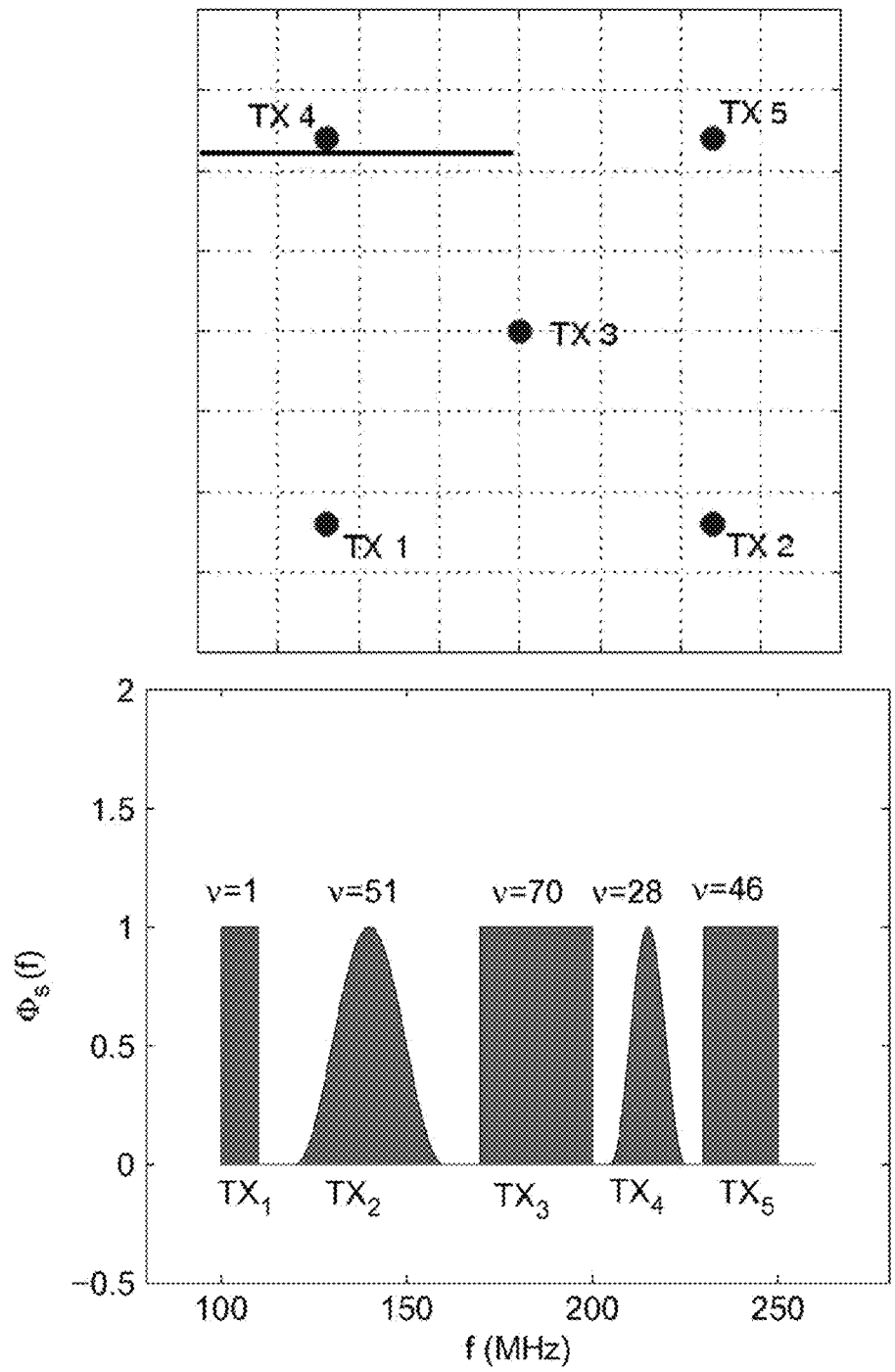
FIG. 4 includes a graph (top) showing positions of sources and obstructing wall and a graph (bottom) showing an example PSD generated by the active transmitters.

Consider a set of $N_r$=100 CRs uniformly distributed in an area of 1 Km$^2$, cooperating to estimate the PSD map generated by $N_s$=5 licensed users (sources) TX 1-TX 5 located as in FIG. 4 (top). The five transmitted signals are raised cosine pulses with roll-off factors ρ=0 or ρ=1, and bandwidths W∈{10,20,30} MHz. They share the frequency band B=[100,260] MHz with spectra centered at frequencies $f_c$=105, 140, 185, 215, and 240 MHz, and 240 MHz, respectively. FIG. 4 (bottom) depicts the PSD generated by the active transmitters TX 1-TX 5.

The PSD generated by source s experiences fading and shadowing effects in its propagation from $x_s$ to any location x, where it can be measured in the presence of white Gaussian noise with variance σ$^2$. A 6-tap Rayleigh model was adopted for the multipath channel $H_{sx}(f)$ between $x_s$ and x, whose expected gain adheres to the path-loss law $E(|H_{sx}(f)|^2)$=exp$(-\|x_s-x\|_2^2/\Delta^2)$, with Δ=800 m. A deterministic shadowing effect generated by a 18 m-high and 500 m-wide wall is represented by the black segment in FIG. 4 (top). It produces a knife-edge effect on the power emitted by the antennas at a height of 20 m. The simulated tests presented here accounted for the shadowing at ground level.

When designing the bases functions in (eq. 1), it is known a priori that the transmitted signals are indeed normalized raised cosine pulses with roll-off factors ρ∈{0,1}, and bandwidths W∈{10,20,30} MHz. However, the actual combination of bandwidths and roll-off factors used can be unknown, which justifies why an overcomplete set of bases becomes handy. Transmitted signals with bandwidth W=10 MHz are searched over a grid of 16 evenly spaced center frequencies $f_c$ in B. Likewise, for W=20 and 30 MHz, 15 and 14 center frequencies are considered, respectively. This amounts to 2×(16+15+14)=90 possible combinations for ρ, W, and $f_c$; thus, $N_b$=90 raised-cosine bases were adopted with corresponding values of ρ, $f_v$ and $B_v$ to match the aforementioned signal specifications; see also FIG. 4 (bottom).

Each CR computes periodogram samples $\hat{\phi}_{rn}(\tau)$ at N=64 frequencies $f_n$=(101.25+2.5(n−1)) MHz, n=1, . . . , 64 with $$SNR := 10\log_{10}\left(\frac{1}{NN_r}\sum_{r=1}^{N_r}\sum_{n=1}^{N}\frac{\Phi(x_r, f_n)}{\sigma^2}\right) = -5 \text{ dB}.$$

Figure 5:
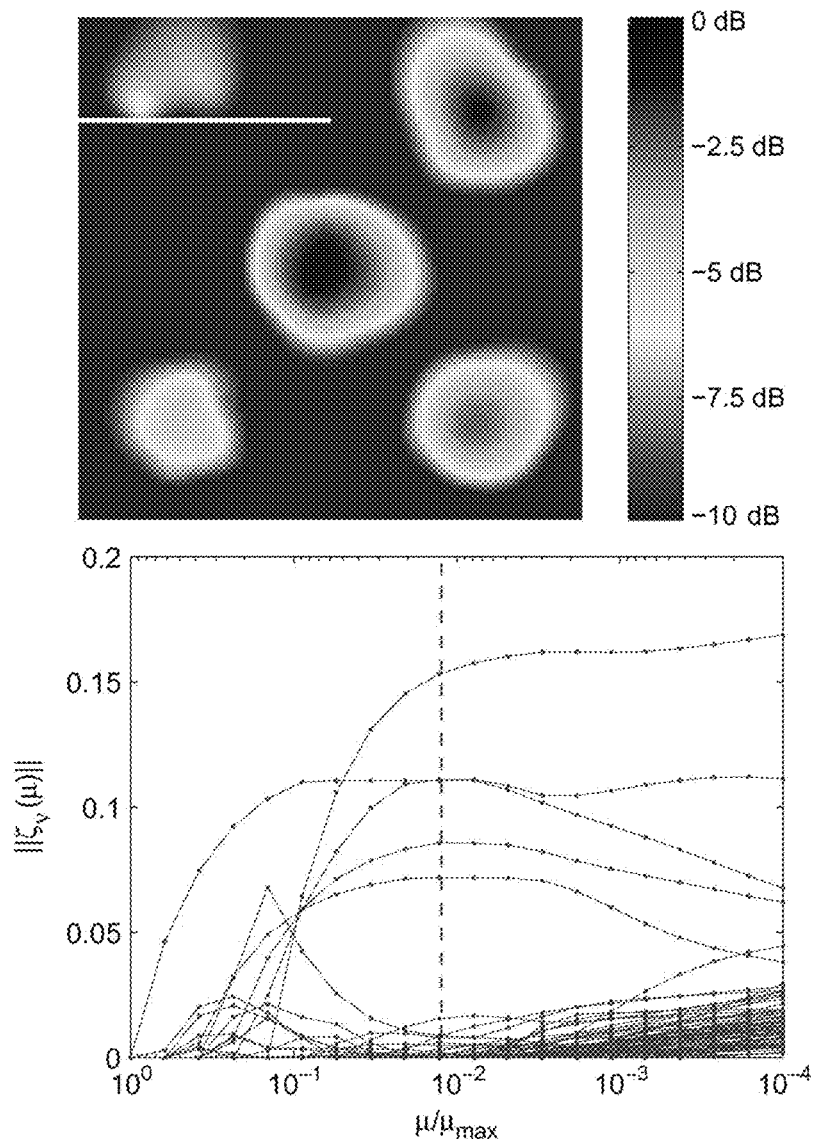
FIG. 5: includes a graph (top) representing an aggregate map estimate in dB and a graph (bottom) showing group-Lasso path of solutions $|\zeta v|2$ as $\mu$ varies.
Figure 6:
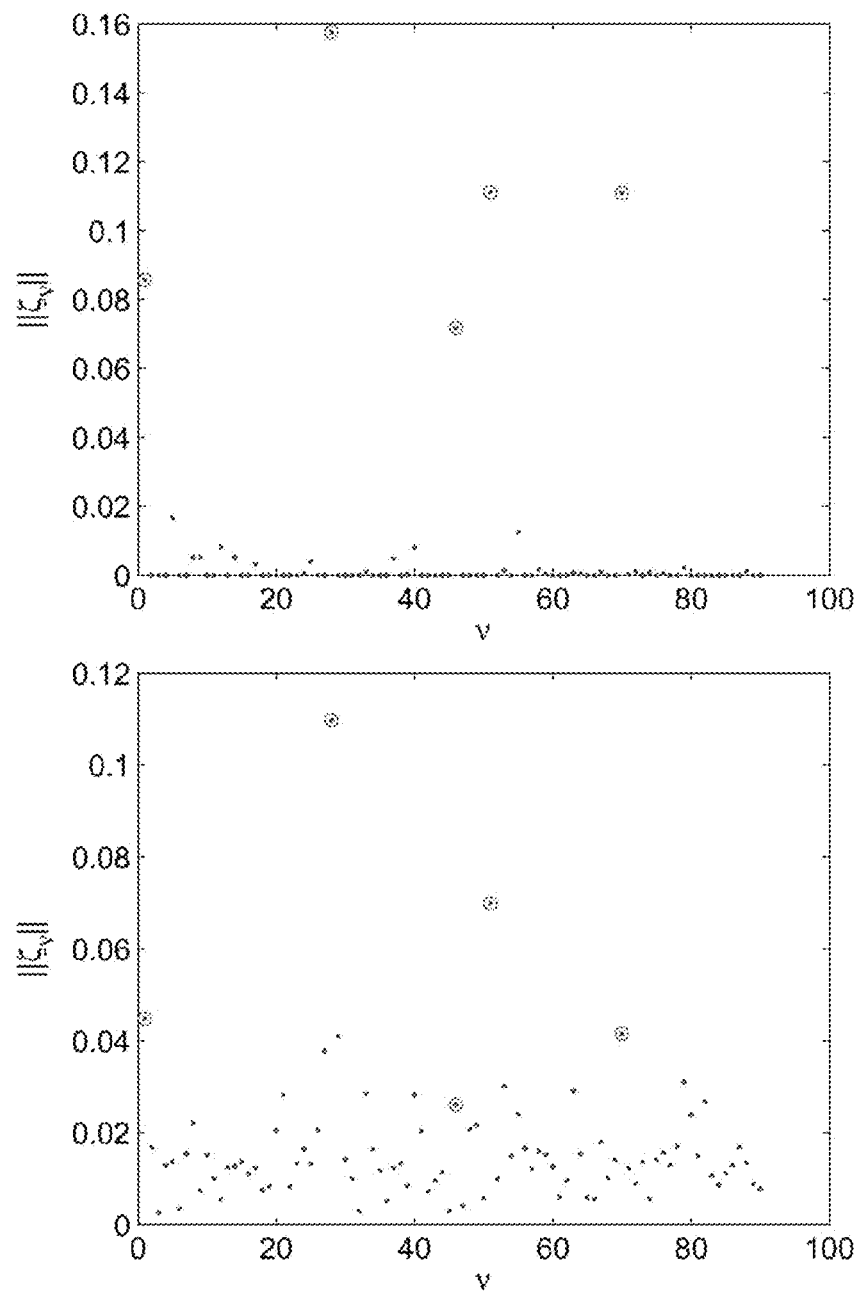
FIG. 6: includes a graph (top) illustrating frequency bases selected by the group-Lassoed spline-based estimator and a graph (bottom) showing frequency bases selected by ridge regression.

Then, these periodogram samples are averaged across T=100 time-slots to form $\Phi_{rn}$:n=1, . . . , 64. These network-wide observations at T=100 were collected in Φ, and following steps S1-S4, the spline-based estimator (eq. 12), and thus the PSD map $\hat{\Phi}(x,f)$ was formed. This map was summed across frequencies, and the result is shown in FIG. 5 (top) which depicts the positions of transmitting CRs, as well as the radially-decaying spectra of four of them (those not affected by the obstacle). It also identifies the effect of the wall by "flattening" the spectrum emitted by the fifth source at the top-left corner. Inspection of the estimate $\hat{\Phi}(x,f)$ across frequency confirmed that group-Lasso succeeded in selecting the candidate bases. FIG. 6 (top) shows points representing $|\hat{\zeta}_v|_2$, v=1, . . . , $N_b$, where $\hat{\zeta}_v$ is the sub-vector in the solution of the group-Lasso estimator (eq. 13) associated with $g_v(x)$ and $b_v(f)$. They peak at indexes v=1, 28, 46, 51, and 70, which correspond to the "ground-truth" model, since bases $b_1$, $b_{28}$, $b_{46}$, $b_{51}$, and $b_{70}$ match the spectra of the transmitted signals. Even though approximately 75% of the variables drop out of the model, some spurious coefficients are retained and their norms are markedly smaller than those of the "ground-truth" bases. Nevertheless, the effectiveness of group-Lasso in revealing the transmitted bases is apparent when compared to other regularization alternatives. FIG. 6 (bottom) depicts the counterpart of FIG. 6 (top) when using a sparsity-agnostic ridge regression scheme instead of (eq. 13). In this case, no basis selection takes place, and the spurious factors are magnified up to a level comparable to three of the "true" basis function $b_v(f)$.

In summary, this test case demonstrated that the spline-based estimator can reveal which frequency bands are (un)occupied at each point in space, thus allowing for spatial reuse of the idle bands. For instance, transmitter $TX_5$ at the top-right corner is associated with the basis function $b_{46}(f)$, the only one of the transmitted five that occupies the 230-260 MHz sub-band. Therefore, this sub-band can be reused at locations x away from the transmission range of $TX_5$, which is revealed in FIG. 5 (top).

Results in FIGS. 5 (top) and 6 depend on the judicious selection of parameters $\lambda$ and $\mu$ in (eq. 12). Parameter $\lambda$ affects smoothness, which translates to congruence among PSD samples, allowing the CRs to recover the radial aspect of the transmit-power. Parameter $\mu$ controls the sparsity in the solution, which dictates the number of bases, and thus transmission schemes that the estimator considers active.

Figure 7:
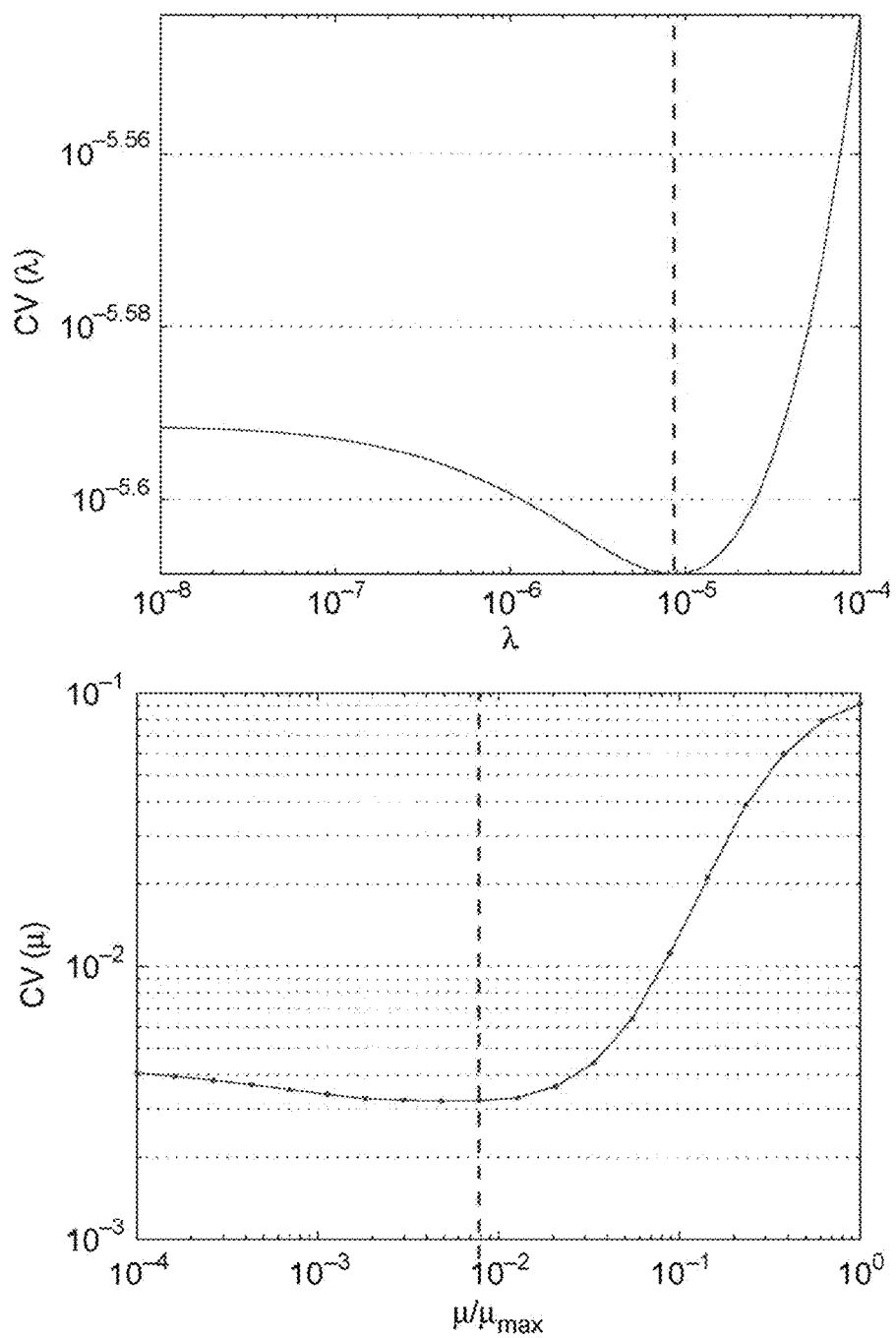
FIG. 7 includes a graph (top) illustrating minimization of the CV error over $\lambda$ and a graph (bottom) illustrating minimization of the CV error over $\mu$.

To select $\lambda$ and $\mu$ jointly so that both smoothness and sparsity are properly accounted for, one could consider a two-dimensional grid of candidate pairs, and minimize the CV error over this grid. However, this is computationally demanding. A three-step alternative is followed here. First, estimator (eq. 12) is obtained using an arbitrarily small value of $\lambda$=1×10$^{-6}$, and selecting $\mu$=0.1 $\mu_{max}$, where $\mu_{max}$ is given above. In the second step, only the surviving bases are kept, and the sparsifying penalty is no longer considered, thus reducing the estimator. If the reduced matrix B, built from the surviving bases, is full rank (otherwise repeat the first step with a larger value of $\mu$), the procedure in described herein is followed to adjust the value of $\lambda$ via leave-one-out CV. The result of this step is illustrated in FIG. 7 (top), where the minimizer $\lambda_{CV}$=7.9433×10$^{-6}$ of the OCV cost is selected. The final step consists of reconsidering the sparsity enforcing penalty in (eq. 12), and selecting $\mu$ using 5-fold CV. The minimizer of the CV error $\mu_{CV}$=0.0078 $\mu_{max}$ corresponding to this step is depicted in FIG. 7 (bottom). Using the $\lambda_{CV}$ and $\mu_{CV}$ so obtained, the PSD map plotted in FIG. 5 (top) was constructed. The rationale behind this approach is that it corresponds to a single step of a coordinate descent algorithm for minimizing the CV error CV($\lambda$,$\mu$). Function CV($\lambda$,$\mu$) is typically unimodal, with much higher sensitivity on $\mu$ than on $\lambda$, a geometric feature leading the first coordinate descent update to be close to the optimum.

The importance of an appropriate µ value becomes evident when inspecting how many bases are retained by the estimator as µ decreases from $\mu_{max}$ to $1\times10^{-4}\,\mu_{max}$. The $N_b$ lines in FIG. 5 (bottom) link points representing $|\hat{\zeta}_v(\mu)|_2$, as µ takes on 20 evenly spaced values on a logarithmic scale, comprising the so-termed group-Lasso path of solutions. When $\mu=\mu_{max}$ is selected, by definition the estimator forces all $\hat{\zeta}_v$ to zero, thus discarding all bases. As µ tends to zero all bases become relevant and eventually enter the model, which confirms the premise that LS estimators suffer from overfitting when the underlying model is overcomplete. The cross-validated value $\mu_{CV}$ is indicated with a dashed vertical line that crosses the path of solutions at the values of $|\hat{\zeta}_v|_2$. At this point, five sub-vectors corresponding to the factors v=1, 28, 46, 51, and 70 are considerably far away from zero hence showing strong effects, in par with the results depicted in FIG. 6 (top).

Bias reduction and Improved Support Selection: The penalty term in (eq. 13) introduces bias in the estimator. As µ decreases the bias decreases, reducing the prediction error. There is a tradeoff however, as increasing µ gives rise to fewer nonzero entries approaching the true support, thus reducing the prediction error as well. The aforementioned CV technique yields an intermediate value of µ balancing these two effects, and thus it tends to overestimate the support. These insights suggest that reducing bias of the estimator improves subset selection and prediction error. Different approaches are available for reducing the bias of (group-) Lasso estimators, using e.g., weighted-norm penalties. Larger weights are given to terms that are most likely to be zero, while smaller weights are assigned to those that are most likely to be nonzero. Another simpler approach is to retain only the support in the minimizer of (13), and re-estimate the amplitudes via, e.g., LS.

Figure 8:
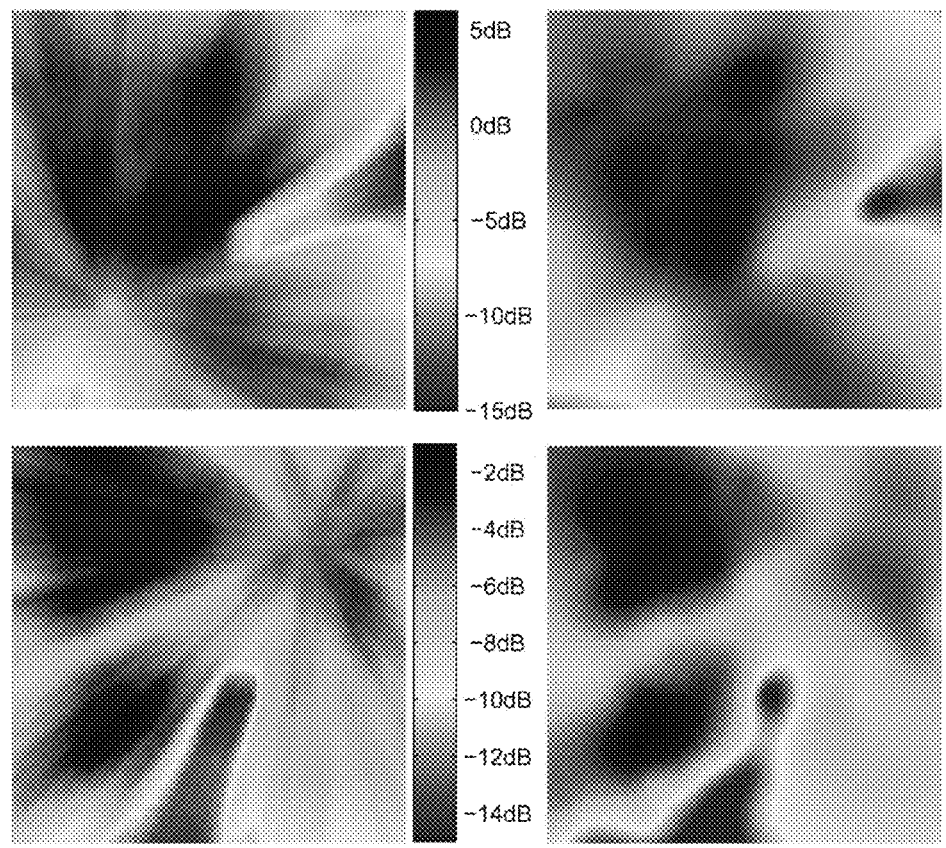
FIG. 8 includes four graphs: (Top) Power distribution across space g6(x) in the band of 2437 MHz; (top-left) actual distribution; (top-right) estimated PSD map. (bottom) Power distribution across space g11(x) in the band of 2462 MHz; (bottom-left) actual distribution; (bottom-right) estimated map.

IEEE 802.11 signal parameters and shadowing effects— The $N_b=14$ overlapping frequency bands (channels) specified in the IEEE 802.11 wireless LAN standard, were considered for this second simulated scenario. The frequency bases adopted correspond to Hann-windowed Nyquist pulses, and the center frequencies are $f_v=(2412+5(v-1))$ MHz for v=1, . . . , 13 and $f_{14}=2484$ MHz. The PSD map to be estimated is generated by two sources located at coordinates $x_{s_1}=[75,25]$ m and $x_{s_2}=[25,75]$ m. They transmit through channels v=6 and v=11, at carrier frequencies 2437 MHz and 2462 MHz, respectively. Thus, the "ground truth" PSD is generated by bases $b_6(f)$ and $b_{11}(f)$. These bases are to be identified by a set of $N_r=100$ CRs randomly deployed in an area of $100\times100$ m$^2$. A 6-tap Rayleigh model was used to generate the multipath channel $H_{sx}(f)$, whose expected gain adheres to the path-loss law $E(|H_{sx}(f)|^2)=\min\{1,(\Delta/|x_s-x|^3)\}$, with $\Delta=60$ m. Shadowing effects are simulated with σ=5 dB and δ=25 m. FIGS. 8 (top-left) and (bottom-left) depict the "true" PSD maps generated due to the transmissions of the active sources $s_1$ and $s_2$, respectively. Periodogram samples are acquired per CR at SNR=20 dB, on N=64 frequencies uniformly spaced between 2400 MHz and 2496 MHz, and during T=100 time-slots to average out fast-fading effects.

Figure 9:
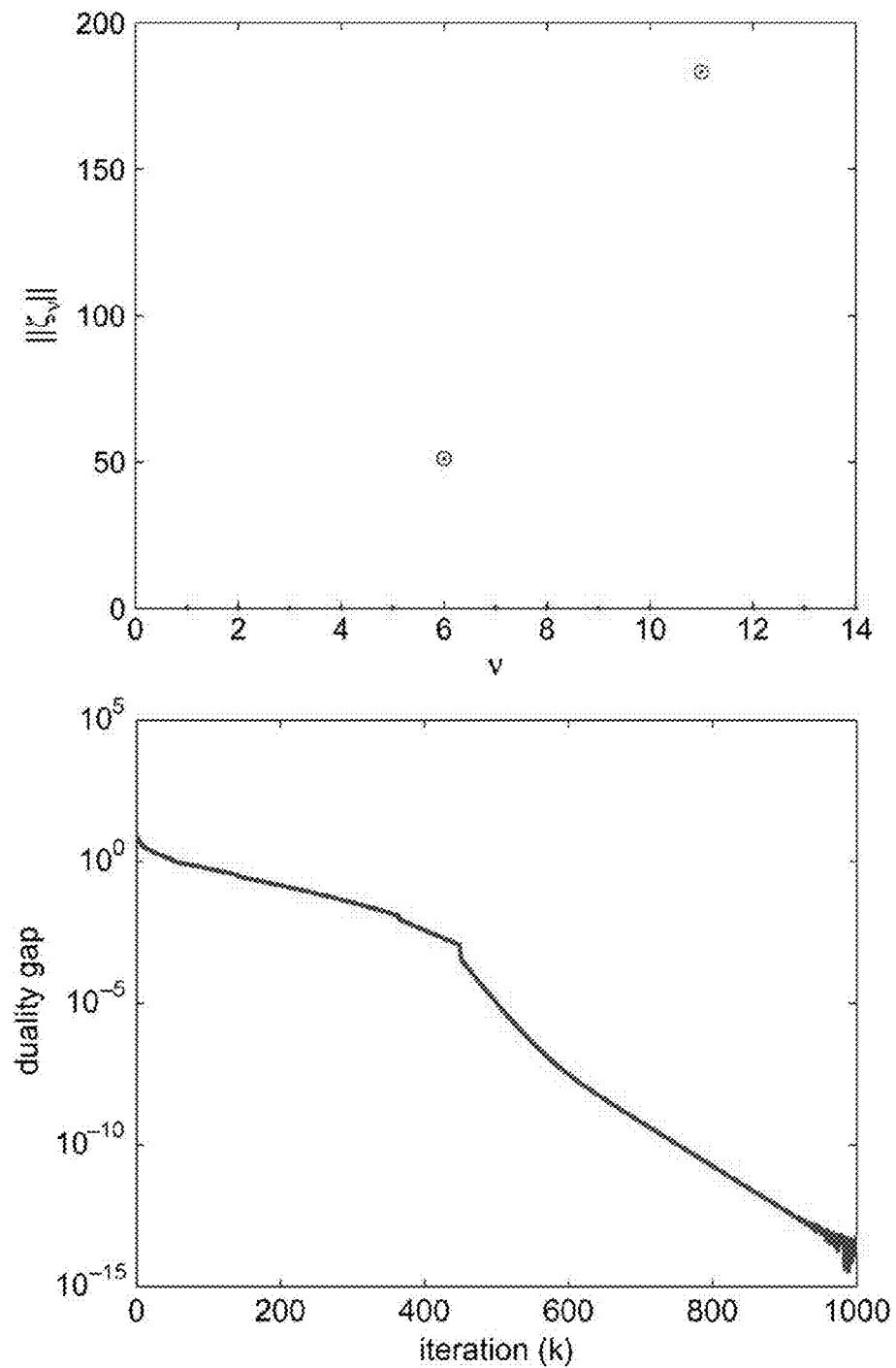
FIG. 9 includes two graphs: (Top) Bases supported in the estimate generated by GLasso; (bottom) evolution of the duality gap for GLasso.

Estimator (eq. 12) applied to the simulated data is successful in identifying the actual transmission bands, as can be deduced from FIG. 9 (top). In the surviving bands v=6 and v=11, the power is distributed across space as given by $g_6(x)$ and $g_{11}(x)$, respectively. FIG. 8 represents these functions and compare the "ground truth" distributions with the estimated $\hat{g}_6(x)$ and $\hat{g}_{11}(x)$. As in the previous example, these figures reveal small zones of no coverage, represented in blue, where bands v=6 and v=11 could be reused without affecting the existing communication system.

FIG. 9 (bottom) corroborates the convergence of GLasso by showing the evolution of the duality gap $$\text{gap}\ [\zeta(k),\gamma(k),\nu(k)] = \frac{1}{2}\|y - X\gamma(k)\|^2 + \mu\sum_{v=1}^{N_b}\|\zeta_v(k)\|_2 - \frac{1}{2}\|y - X\gamma^*(\nu(k))\|^2 + \nu^T(k)\gamma^*(\nu(k)) \quad (29)$$

with $\gamma^*(\nu):=(X^TX)^{-1}(X^Ty+\nu)$, and the iterates $\zeta(k)$, $\gamma(k)$, $\nu(k)$ are generated as in Algorithm 2.

Real data test case—A dataset is formatted into triplets $(x,f_c,p)$ of positions, carrier frequencies, and aggregate RF power levels of the signals transmitted over carrier frequency $f_c$ and measured at position x. These measurements were modeled as acquired by $N_r=166$ sensing radios located in an indoor area A of $14\times34$ m, which is represented by the rectangles in FIG. 10. These radios were modeled as being deployed on a regular grid over the subarea $A_r$ depicted by sectors in the first column of the same figure.

Figure 10:
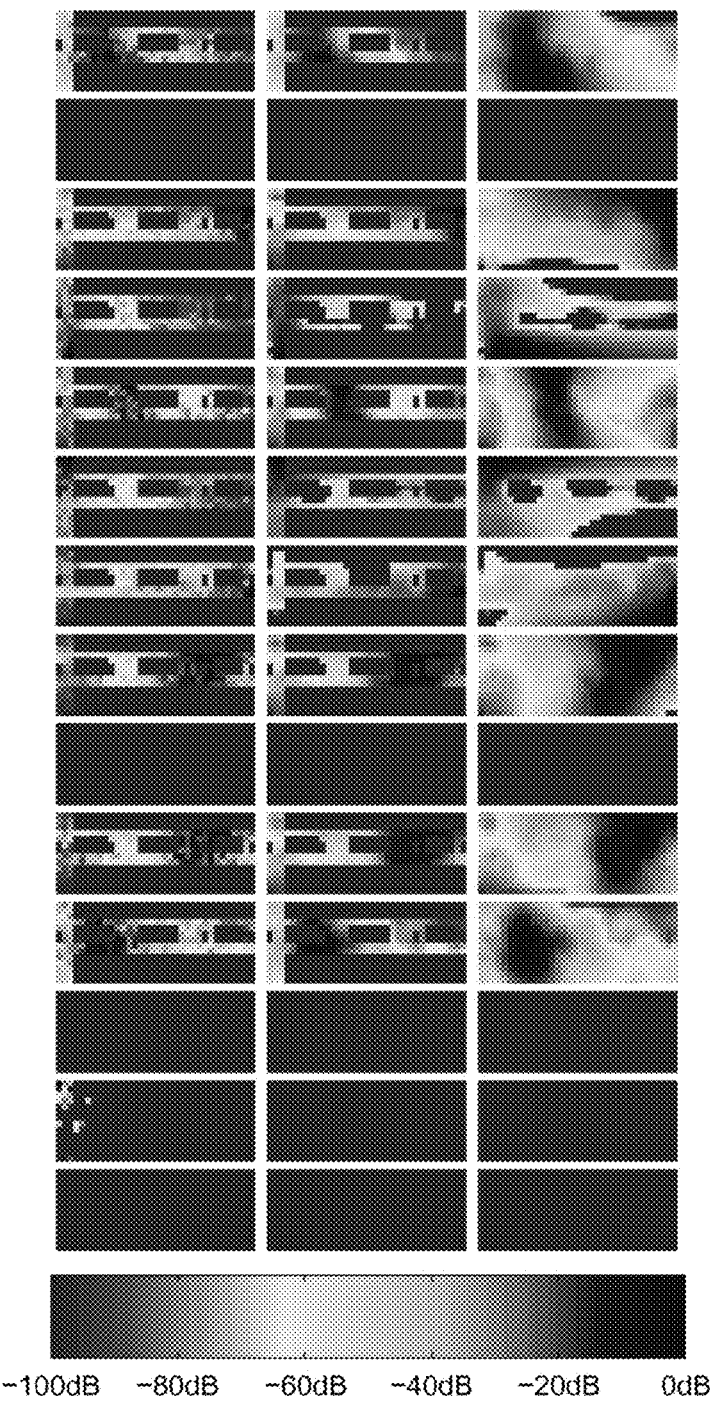
FIG. 10 includes three graphs: GLasso estimator on the dataset; (left) Original data with shaded pixels indicating the position of the radios; (center) estimated maps over the surveyed area; (right) extrapolated maps. The Nb=14 rows correspond to the frequency bands spanned by each of the bases.
Figure 11:
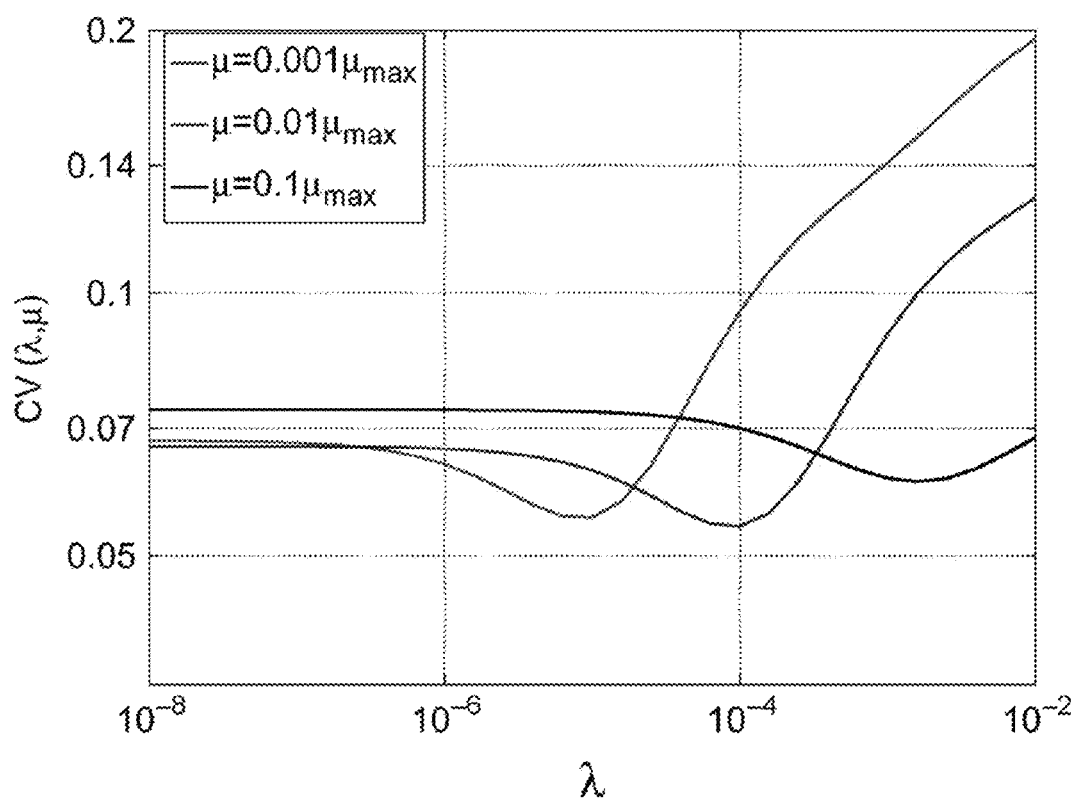
FIG. 11 is a graph illustrating normalized mean-square prediction error on the dataset estimated via two-fold cross validation.

A set of $N_b=14$ nonoverlapping rectangular bases centered at these frequencies are adopted, and the nonparametric estimator (eq. 12) is run again to obtain the distribution of power across A. Parameters λ and µ are selected via two-fold cross validation, searching over a grid of 30 candidate pairs. A minimum normalized error of 0.0541 is attained for $\mu_{CV}=0.01\,\mu_{max}$ and $\lambda_{CV}=10^{-4}$, as shown in FIG. 11. Results are further presented in the third column in FIG. 10, representing the estimated power maps $\hat{g}_1(x)$ to $\hat{g}_{14}(x)$. The second column in the same figure—included for visual comparison—corresponds to the results in the third column masked to the subarea $A_r$, where the data were acquired.

The proposed estimator is capable of recovering the center frequencies that are being utilized for transmission, eliminating the noise affecting the 13th basis. It also recovers the power levels in the surveyed area $A_r$, with a smooth extrapolation to zones where there are no measurements, and suggests possible locations for the transmitters.

Proof of (eq. 6)-(eq. 8): Upon substituting (eq. 5) into (eq. 4), the optimal coefficients $\{\alpha,\beta\}$ specifying $\{\hat{g}_v(x)\}_{v=1}^{N_b}$ are obtained as solutions to the following constrained, regularized LS problem $$\min_{\alpha,\beta} \frac{1}{N_rN}|\phi - (B\otimes K)\beta - (B\otimes T)\alpha|_2^2 + \lambda\beta'(I_{N_b}\otimes K)\beta \quad (30)$$

$$\text{s.t.}\ (I_{N_b}\otimes T')\beta = 0_{3N_b}.$$

Observe first that the constraints $\beta_v\in B$ in Proposition 1 can be expressed as $T'\beta_v=0_3$ for each v=1, . . . , $N_b$, or jointly as $(I_{N_b}\otimes T')\beta=0_{3N_b}$. Note that $\hat{g}_v(x_r)=k'_r\beta_v+t'_r\alpha_v$, where $k'_r$ and $t'_r$ are the rth rows of K and T, respectively. The first term in the cost can be expressed (up to a factor $(N_rN)^{-1}$) as:

$$\sum_{n=1}^{N}\sum_{r=1}^{N_r} = \left(\phi_m - \sum_{v=1}^{N_b}b_v(f_n)[k'_r\beta_v + t'_r\alpha_v]\right)^2$$

$$= \sum_{n=1}^{N}\sum_{r=1}^{N_r}(\phi_m - (b_n\otimes k_r)'\beta - (b_n\otimes t_r)'\alpha)^2$$

$$= \sum_{n=1}^{N}|\phi_n - (b'_n\otimes K)\beta - (b'_n\otimes T)\alpha|_2^2$$

-continued $$= |\phi - (B \otimes K)\beta - (B \otimes T)\alpha|_2^2.$$

Consider next the penalty term in the cost of (eq. 4). Substituting into (eq. 5), it follows that $\int \|\nabla^2 \hat{g}_v(x)\|_F^2 dx = \beta_v' K \beta_v$. It thus holds that $$\lambda \sum_{v=1}^{N_b} \int_{R^2} \|\nabla^2 \hat{g}_v(x)\|_F^2 dx = \lambda \sum_{v=1}^{N_b} \beta_v' K \beta_v = \lambda \beta'(I_{N_b} \otimes K)\beta$$

from which (eq. 30) follows readily.

Now that the equivalence between (eq. 4) and (eq. 30) has been established, the latter must be solved for $\alpha$ and $\beta$. Even though K (hence $I_{N_b} \otimes K$) is not positive definite, it is still possible to show that $\beta'(I_{N_b} \otimes K)\beta > 0$ for any $\beta$ such that $$(I_{N_b} \otimes T')\beta = 0_{3N_b},$$

implying that (eq. 30) is convex. Note first that the constraint $$(I_{N_b} \otimes T')\beta = 0_{3N_b}$$

implies the existence of a vector $\gamma \in R^{N_b(N_r-3)}$ satisfying (eq. 8). After this change of variables, this is transformed into an unconstrained quadratic program, which can be solved in closed form for $\{\alpha, \gamma\}$. Hence, setting both gradients w.r.t. $\alpha$ and $\gamma\}$ to zero yields (eq. 6) and (eq. 7).

Proof of Proposition 2: After substituting (eq. 15) into (eq. 12), one finds the optimal $\{\alpha, \beta\}$ specifying $\{\hat{g}_v(x)\}_{v=1}^{N_b}$ in (eq. 15), as solutions to the following constrained, regularized LS problem $$\min_{\alpha,\beta} \frac{1}{N_r N} |\phi - (B \otimes K)\beta - (B \otimes T)\alpha|_2^2 + \quad (31)$$

$$\lambda \beta'(I_{N_b} \otimes K)\beta + \mu \sum_{v=1}^{N_b} |K\beta_v + T\alpha_v|_2$$

s.t. $(I_{N_b} \otimes T')\beta = 0_{3N_b}.$

With reference to (eq. 31), consider grouping and reordering the variables $\{\alpha, \beta\}$ in the vector $u := [u'_1, \ldots, u'_{N_b}]'$, where $u_v := [\beta'_v :: \alpha'_v]'$. The constraints $T'\beta_v = 0$ can be eliminated through the change of variables $u_v = \mathrm{bdiag}(Q_2, I_3) v_v$ for $v = 1, \ldots, N_b$; or compactly as $u = (I_{N_b} \otimes \mathrm{bdiag}(Q_2, I_3)) v$. The next step is to express the three summands in the cost of (eq. 31) in terms of the new vector optimization variable v. Noting that $k'_r \beta_v + t'_r \alpha_v = [k'_r :: t'_r] u_v$, the first summand is $$\frac{1}{N_r N} \|\varphi - (B \otimes K)\beta - (B \otimes T)\alpha\|_2^2 = \quad (32)$$

$$\frac{1}{N_r N} \|\varphi - (B \otimes [K\ T])u\|_2^2 = \frac{1}{N_r N} \|\varphi - (B \otimes [KQ_2\ T])v\|_2^2.$$

The second summand due to the thin-plate penalty can be expressed as $$\lambda \sum_{v=1}^{N_b} \beta'_v K \beta_v = \gamma \sum_{v=1}^{N_b} u'_v \mathrm{bdiag}(K, 0) u_v \quad (33)$$

$$= \lambda \sum_{v=1}^{N_b} v'_v \mathrm{bdiag}(Q'_2 K Q_2, 0) v_v$$

$$= \lambda v'(I_{N_b} \otimes \mathrm{bdiag}(Q'_2 K Q_2, 0)) v$$

while the last term is $\mu \Sigma_{v=1}^{N_b} \|K\beta_v + T\alpha_v\|_2 = \mu \Sigma_{v=1}^{N_b} \|[K\ T]u_v\|_2 = \mu \Sigma_{v=1}^{N_b} \|[KQ_2\ T]v_v\|_2$. Combining (32) with (33) by completing the squares, problem (31) is equivalent to $$\min_v \left\{ \left\| \begin{bmatrix} \varphi \\ 0 \end{bmatrix} - \begin{bmatrix} B \otimes [KQ_2\ T] \\ I_{N_b} \otimes \mathrm{bdiag}((N_r N \lambda Q'_2 K Q_2)^{1/2}, 0) \end{bmatrix} v \right\|_2^2 + \quad (34) \right.$$

$$\left. \mu N_r N \sum_{v=1}^{N_b} \|[KQ_2\ T]v_v\|_2 \right\}$$

and becomes (13) under the identities (14), and after the change of variables $\zeta := [\zeta'_1, \ldots, \zeta'_{N_b}]' = (I_{N_b} \otimes [KQ_2 T])v$. By definition of u, v, and $\zeta$, the original variables can be recovered through the transformation in (16).

Selection of the smoothing parameter in (eq. 4): The method to be developed builds on the so-termed leave-one-out CV, which proceeds as follows. Consider removing a single data point $\Phi_m$ from the collection of $N_r N$ measurements available to the sensing radios. For a given $\lambda k$, let $\hat{\Phi}_\lambda^{(-m)}(x,f)$ denote the leave-one-out estimated PSD map, following steps S1-S3, using the $N_r N - 1$ remaining data points. The aforementioned estimation procedure is repeated $N_r N$ times by leaving out each of the data points $\Phi_m$, $r = 1, \ldots, N_r$ and $n = 1, \ldots, N$, one at a time. The leave-one-out or ordinary CV (OCV) for the problem at hand is given by $$OCV(\lambda) = \frac{1}{N_r N} \sum_{r=1}^{N_r} \sum_{n=1}^{N} (\phi_m - \hat{\Phi}_\lambda^{(-m)}(x_r, f_n))^2 \quad (35)$$

while the optimum $\lambda$ is selected as the minimizer of $OCV(\lambda)$, over a grid of values $\lambda \in [0, \lambda_{max}]$. Function (eq. 35) constitutes an average of the squared prediction errors over all data points; hence, its minimization offers a natural criterion. The method is quite computationally demanding though, since the system of linear equations (eq. 6)-(eq. 8) has to be solved $N_r N$ times for each value of $\lambda$ on the grid. Fortunately, this computational burden can be significantly reduced for the spline-based PSD map estimator considered here.

Recall the vector $\Phi$ collecting all data points measured at locations X and frequencies F. Define next a similar vector $\hat{\Phi}$ containing the respective predicted values at the given locations and frequencies, which is obtained after solving (eq. 4) with all the data in $\Phi$ and a given value of $\lambda$. The following lemma establishes that the PSD map estimator is a linear smoother, which means that the predicted values are linearly related to the measurements, i.e., $\hat{}= S_\lambda \Phi$ for a $\lambda$-dependent matrix $S_\lambda$ to be determined. Common examples of linear smoothers are ridge regressors and smoothing splines. For linear smoothers, by virtue of the leave-one-out lemma it is possible to rewrite (eq. 35) as $$OCV(\lambda) = \frac{1}{N_r N} \sum_{r=1}^{N_r} \sum_{n=1}^{N} \left( \frac{\phi_m - \hat{\Phi}_\lambda(x_r, f_n)}{1 - [S_\lambda]_{ii}} \right)^2 \quad (36)$$

where $\hat{\Phi}_\lambda(x,f)$ stands for the estimated PSD map when all data in $\Phi$ are utilized in (eq. 4). The beauty of the leave-one-out lemma stems from the fact that given $\lambda$ and the main diagonal of matrix $S_\lambda$, the right-hand side of (eq. 36) indicates that fitting a single model (rather than $N_r N$ of them) suffices to evaluate $OCV(\lambda)$. The promised lemma stated next specifies the value of $S_\lambda$ necessary to evaluate (eq. 36).

Lemma 3: The PSD map estimator in (4) is a linear smoother, with smoothing matrix given by $$S_\lambda = (B(x)\{KQ_2 - TR^{-1}Q'_1 KQ_2\})[(B'B(x) Q_2'KQ_2) + N_r N\lambda I]^{-1} (B'(x) Q'_2) + (B\Gamma^{-1}\Omega_1^{-1}(x) TR^{-1}Q'_1). \quad (37)$$

Proof: Reproduce the structure of $\phi$ in Section III-A to form the supervector $\hat{\phi} := [\hat{\phi}'_1, \ldots, \hat{\phi}'_{N_T}]' \in \mathbb{R}^{N_T N}$, by stacking each vector $\hat{\phi} := [\hat{\Phi}_\lambda(X_1, f_n), \ldots, \hat{\Phi}_\lambda(X_{N_r}, f_n)]'$ corresponding to the special PSD predictions at frequency $f_n \in F$. From (5), it follows that $\hat{\Phi}_\lambda(X_r, f_n) = (b_n(x)k_r)'\hat{\beta} - (b_n(x)T_r)'\hat{\alpha}$, where $b'_n$, $k'_r$ and $t'_r$ are the nth and rth rows of B, K and T, respectively. By stacking the PSD map estimates, it follows the $\hat{\phi}_n = (b'_n(x)K)\hat{\beta} - (b'_n(x)T)\hat{\alpha}$, which readily yields $$\hat{\phi} = (B(x)K)\hat{\beta} - (B(x)T)\hat{\alpha}. \quad (38)$$

Because the estimates $\{\hat{\alpha}, \hat{\beta}\}$ are linearly related to the measurements $\phi$ [cf. (6)-(8)], so is $\hat{\phi}$ as per (38), establishing that the PSD map estimator in (4) is indeed a linear smoother. Next, solve explicitly for $\{\hat{\alpha}, \hat{\beta}\}$ in (6)-(8) and substitute the results in (38), to unveil the structure of the smoothing matrix $S_\lambda$ such that $\hat{\phi} = S_\lambda \phi$. Simple algebraic manipulations lead to the expression (37).

The effectiveness of the leave-one-out CV approach is corroborated via simulations in $$\lim_{k \to \infty} \zeta_r(k) \in \operatorname{argmin}_\zeta \frac{1}{N_r} \sum_{r=1}^{N_r} \|y_r - X_r \zeta\|_2^2 + \mu \sum_{v=1}^{N_b} \|\zeta_v\|_2.$$

Section

Proof of (eq. 24)-(eq. 27): Recall the augmented Lagrangian function in (eq. 23), and let $\zeta := \{\zeta_r\}_{r \in R}$ for notational brevity. When used to solve (eq. 22), the three steps in the AD-MoM are given by:

[S1] Local estimate updates:

$$\zeta(k+1) = \operatorname{argmin}_\zeta \mathcal{L}_c[\zeta, \gamma(k), \nu(k)]. \quad (39)$$

[S2] Auxiliary variable updates:

$$\gamma(k+1) = \operatorname{argmin}_\gamma \mathcal{L}_c[\zeta(k+1), \gamma, \nu(k)]. \quad (40)$$

[S3] Multipliet updates:

$$V_r(k+1) = V_r(k) + c[\zeta_r(k+1) - \gamma_r(k+1)] \quad (41)$$

$$\check{V}_r^n(k+1) = \check{V}_r^n(k) + c[\zeta_r(k+1) - \gamma_r^n(k+1).] \quad (42)$$

$$\overline{V}_r^n(k+1) = \overline{V}_r^n(k) + c[\zeta_r(k+1) - \gamma_r^n(k+1)]. \quad (43)$$

Focusing first on [S2], observe that (23) is separable across the collection of variables $\{\gamma_j\}$ and $\{65_r^n\}$ that comprise $\gamma$. The minimization w.r.t. the latter group reduces to $$\gamma_r^{r'}(k+1) = \operatorname{argmin}_{\gamma_r^{r'}} \left\{ c\|\gamma_r^{r'}\|^2 - \left(\overline{v}_r^{r'}(k) + \check{v}_r^{r'}(k)\right)\gamma_r^{r'} - c(\zeta_r(k+1) + \zeta_{r'}(k+1))\gamma_r^{r'} \right\} \quad (44)$$

$$= \frac{1}{2}(\zeta_r(k+1) + \zeta_{r'}(k+1)) + \frac{1}{2c}\left(\overline{v}_r^{r'}(k) + \check{v}_r^{r'}(k)\right)$$

$$= \frac{1}{2}(\zeta_r(k+1) + \zeta_{r'}(k+1)).$$

The result in (44) assumes that $\overline{v}_r^n(k) + \check{v}_r^n(k) = 0$, $\forall k$. A simple inductive argument over (42), (43) and (44) shows that this is indeed true if the multipliers are initialized such that $\overline{v}_r^n(0) + \check{v}_r^n(0) = 0$.

The remaining minimization in (40) with respect to $\{\gamma_r\}$ de-couples into $N_r$ quadratic subproblems [cf. (23)], that is $$\gamma_r(k+1) = \operatorname{argmin}_{\gamma_r} \frac{1}{2}\|y_r - X_r\gamma_r\|_2^2 - v_r'(k)\gamma_r + \frac{c}{2}\|\zeta_r(k+1) - \gamma_r\|_2^2$$

which admit the closed-form solutions in (27).

Focusing first on [S2], observe that (23) is separable across the collection of variables $\{\gamma_j\}$ and $\{\gamma_r^n\}$ that comprises $\gamma$. The minimization w.r.t. the latter group reduces to $$\gamma_r^{r'}(k+1) = \operatorname{arg\,min}_{\gamma_r^{r'}} \{c\|\gamma_r^n\|^2 = (\overline{V}_r^n(k) + \check{V}_r^n(k))\gamma_r^{r'} - c(\zeta_r(k+1) + \zeta_{r'}(k+1))\gamma_r^{r'}\} = \frac{1}{2}(\zeta_r(k+1) + \zeta_{r'}(k+1) + 1/2c(\overline{V}_r^n(k) + \check{V}_r^n(k)) = \frac{1}{2}(\zeta_r(k+1) + \zeta_{r'}(k+1)). \quad (44)$$

The results in (44) assumes that $\overline{\nabla}_r^n(k) + \check{V}_r^n(k) = 0$, $\forall k$. A simple inductive argument over (42), (43) and (44) shows that this is indeed true if the multipliers are initialized such that $\overline{\nabla}_r^n(0) + \check{V}_r^n(0) = 0$.

The remaining minimization in (40) with respect to $\{\gamma_r\}$ decouples into $N_r$ quadratic subproblems [cf. (23)], that is $\gamma_r(k+1) = \operatorname{arg\,min}_{\gamma_r} \frac{1}{2}\|\gamma_r - X_r\gamma_r\|^2/2 - V_r'(k)\gamma_r + c/2\|\zeta_r(k+1) - \gamma_r\|^2/2$ which admit the closed-form solutions in (27).

In order to obtain the update (eq. 24) for the prices $_r$, consider their definition together with (eq. 42), (eq. 43) and (eq. 44) to obtain $$r^{(k+1)} = \sum_{r' \in N_r} (\zeta_r'(k+1) + r'_r(k+1))$$

$$= \sum_{r' \in N_r} (\zeta_r'(k) + r'_r(k)) + \sum_{r' \in N_r} c(2\zeta_r(k+1) - \gamma_r'(k) - \gamma_{r'}'(k))$$

$$= r(k) + c\sum_{r' \in N_r}(\zeta_r(k+1) - \zeta_{r'}(k+1))$$

which coincides with (eq. 24).

Towards obtaining the updates for the local variables in $\zeta$, the optimization (eq. 39) in [S1] can be also split into $N_r$ sub-problems, namely $$\zeta_r(k+1) = \operatorname{argmin}_{\zeta_r}\left\{\frac{\mu}{N_r}\sum_{v=1}^{N_b}\|\zeta_{rv}\|_2 + v_r'(k)\zeta_r + \frac{c}{2}\|\zeta_r - \gamma_r(k)\|_2^2 + \right. \quad (45)$$

-continued $$\sum_{r' \in N_r} [\bar{v}_r^{r'}(k) + \bar{v}_{r'}^r(k)]' \zeta_r +$$

$$\frac{c}{2} \sum_{r' \in N_r} [\|\zeta_r - \gamma_r^{r'}(k)\|_2^2 + \|\zeta_r - \gamma_{r'}^r(k)\|_2^2]\Bigg\}$$

$$= \operatorname*{argmin}_{\zeta_r} \Bigg\{ \frac{\mu}{N_r} \sum_{v=1}^{N_b} \|\zeta_{rv}\|_2 + \frac{c}{2}(1 + 2|N_r|)\|\zeta_r\|_2^2 -$$

$$\Bigg(c \sum_{r' \in N_r} (\zeta_r(k) + \zeta_{r'}(k)) + c\gamma_r(k) - p_r(k) - v_r(k)\Bigg)' \zeta_r \Bigg\}.$$

Upon dividing by $c(1+2|N_r|)$ each subproblem becomes identical to problem (19)m and thus by Proposition 2 takes the form of (26).

Non-Parametric Basis Pursuit via Sparse Kernel-based Learning

As described in further detail below, in some example, a number of different types of kernels may be used to accurately model the physical (i.e., geographic) distribution of RF power over the region so as to enhance the ability of the model to accurately reflect fading and multi-path characteristics of the environment.

Reproducing kernel Hilbert spaces (RKHSs) provide an orderly analytical framework for nonparametric regression, with the optimal kernel-based function estimate emerging as the solution of a regularized variational problem. The role of RKHS is further appreciated through its connections to "workhorse" signal processing tasks, such as the Nyquist-Shannon sampling and reconstruction result that involves sinc kernels. Alternatively, spline kernels replace sinc kernels, when smoothness rather than bandlimitedness is to be present in the underlying function space.

Kernel-based function estimation can be also seen from a Bayesian viewpoint. RKHS and linear minimum mean-square error (LMMSE) function estimators coincide when the pertinent covariance matrix equals the kernel Gram matrix. This equivalence has been leveraged in the context of field estimation, where spatial LMMSE estimation referred to as Kriging, is tantamount to two-dimensional RKHS interpolation. Finally, RKHS based function estimators can linked with Gaussian processes (GPs) obtained upon defining their covariances via kernels.

The techniques described herein recognize use of matrix completion, where data organized in a matrix can have missing entries due to e.g., limitations in the acquisition process. This disclosure makes use of the assertion that imputing missing entries amounts to interpolation, as in classical sampling theory, but with the low-rank constraint replacing that of bandlimitedness. From this point of view, RKHS interpolation emerges as a framework for matrix completion that allows effective incorporation of a priori information via kernels, including sparsity attributes.

Building blocks of sparse signal processing include the (group) least-absolute shrinkage and selection operator (Lasso) and its weighted versions, compressive sampling, and nuclear norm regularization. The common denominator behind these operators is the sparsity on a signal's support that the $l_1$-norm regularizer induces. Exploiting sparsity for kernel-based learning (KBL) leads to several innovations regarding the selection of multiple kernels, additive modeling, collaborative filtering, matrix and tensor completion via dictionary learning, as well as nonparametric basis selection.

In this context, techniques for nonparametric basis pursuit (NBP) are described that unifying and advance a number of sparse KBL approaches.

In this disclosure, RKHS in connection with GPs, are described. The Representer Theorem and a kernel trick are described, and the Nyquist-Shannon Theorem (NST) is presented as an example of KBL. Sparse KBL is addressed including sparse additive models (SpAMs) and multiple kernel learning (MKL) as examples of additive nonparametric models. NBP is introduced, with a basis expansion model capturing the general framework for sparse KBL. Blind versions of NBP for matrix completion and dictionary learning are developed. Finally, numerical tests using real and simulated data are presented, including RF spectrum measurements, expression levels in yeast, and network traffic loads.

KBL Preliminaries

In the context of reproducing kernel Hilbert spaces (RKHS), nonparametric estimation of a function $f:X \rightarrow R$ defined over a measurable space X is performed via interpolation of N training points $\{(x_1,z_1), \ldots, (x_N,z_N)\}$, where $x_n \in X$, and $z_n = f(x_n) + e_n \in R$. For this purpose, a kernel function $k:X \times X \rightarrow R$ selected to be symmetric and positive definite, specifies a linear space of interpolating functions $f(x)$ given by $$\mathcal{H}_X := \left\{ f(x) = \sum_{n=1}^{\infty} \alpha_n k(x_n, x) : \alpha_n \in R, x_n \in \chi, n \in N \right\}$$

For many choices of $k(\cdot,\cdot)$, $H_X$ is exhaustive with respect to (w.r.t) families of functions obeying certain regularity conditions. The spline kernel for example, generates the Sobolev space of all low-curvature functions. Likewise, the sinc kernel gives rise to the space of bandlimited functions. Space $H_X$ becomes a Hilbert space when equipped with the inner product $$\langle f, f' \rangle_{\mathcal{H}_X} := \sum_{n,n'=1}^{\infty} \alpha_n \alpha'_{n'} k(x_n, x'_{n'}),$$

and the associated norm is $\|f\|_{H_X} := \sqrt{\langle f, f \rangle_{H_X}}$. A key result in this context is the so-termed Representer Theorem, which asserts that based on $\{(x_n, z_n)\}_{n=1}^N$, the optimal interpolator in $H_X$, in the sense of $$\hat{f} = \operatorname*{argmin}_{f \in \mathcal{H}_X} \sum_{n=1}^{N} (z_n - f(x_n))^2 + \mu \|f\|_{\mathcal{H}_X}^2 \quad (1.1)$$

admits the finite-dimensional representation $$\hat{f}(x) = \sum_{n=1}^{N} \alpha_n k(x_n, x). \quad (1.2)$$

This result is nice in its simplicity, since functions in space $H_X$ are compound by a numerable but arbitrarily large number of kernels, while $\hat{f}$ is a combination of just a finite number of kernels around the training points. In addition, the regularizing term $\mu \|f\|_{H_X}^2$ controls smoothness, and thus reduces overfitting. After substituting (1.2) into (1.1), the coefficients $\alpha^T :=$ $[\alpha_1, \ldots, \alpha_N]$ minimizing the regularized least-squares (LS) cost in (1.1) are given by $\alpha = (K+\mu I)^{-1}z$, upon recognizing that $|f|_{H_X}^2 := \alpha^T K \alpha$, and defining $z^T := [z_1, \ldots, z_N]$ as well as the kernel dependent Gram matrix $K \in R^{N \times N}$ with entries $K_{n,n'} := k(x_n, x_{n'})$ ($\bullet^T$ stands for transposition).

Remark 1. The finite-dimensional expansion (1.2) solves (1.1) for more general fitting costs and regularizing terms. In its general form, the Representer Theorem asserts that (1.2) is the solution $$\hat{f} = \mathrm{argmin}_{f \in \mathcal{H}_X} \sum_{n=1}^{N} \ell(z_n, f(x_n)) + \mu \Omega(|f|_{\mathcal{H}_X}) \tag{1.3}$$

where the loss function $l(z_n, f(x_n))$ replacing the LS cost in (1.1) can be selected to serve either robustness (e.g., using the absolute-value instead of the square error); or, application dependent objectives (e.g., the Hinge loss to serve classification applications); or, for accommodating non-Gaussian noise models when viewing (1.3) from a Bayesian angle. On the other hand, the regularization term can be chosen as any increasing function $\Omega$ of the norm $|f|_{H_X}$, which will turn out to be crucial for introducing the notion of sparsity, as described in the ensuing sections.

LMMSE, Kriging, and GPs

Instead of the deterministic treatment of the previous subsection, the unknown $f(x)$ can be considered as a random process. The KBL estimate (1.2) offered by the Representer Theorem has been linked with the LMMSE-based estimator of random fields $f(x)$, under the term Kriging. To predict the value $\zeta = f(x)$ at an exploration point x via Kriging, the predictor $\hat{f}(x)$ is modeled as a linear combination of noisy samples $z_n := f(x_n) + \eta(x_n)$ at measurement points $\{x_n\}_{n=1}^{N}$; that is, $$\hat{f}(x) = \sum_{n=1}^{N} \hat{\beta}_n z_n = z^T \hat{\beta} \tag{1.4}$$

where $\hat{\beta}^T := [\hat{\beta}_1, \ldots, \hat{\beta}_N]$ are the expansion coefficients, and $z^T := [z_1, \ldots, z_N]$ collects the data. The MSE criterion is adopted to find the optimal $\hat{\beta} := \arg \min_{\beta} E[f(x) - z^T \beta]^2$. Solving the latter yields $\hat{\beta} = R_{zz}^{-1} r_{z\zeta}$, where $R_{zz} := E[zz^T]$ and $r_{z\zeta} := E[zf(x)]$. If $\eta(x)$ is zero-mean white noise with power $\sigma_\eta^2$, then $R_{zz}$ and $r_{z\zeta}$ can be expressed in terms of the unobserved $\zeta^T := [f(x_1), \ldots, f(x_N)]$ as $R_{zz} = R_{\zeta\zeta} + \sigma_\eta^2 I$, where $R_{\zeta\zeta} := E[\zeta\zeta^T]$, and $r_{z\zeta} = r_{\zeta\zeta}$, with $r_{\zeta\zeta} := E[\zeta f(x)]$. Hence, the LMMSE estimate in (1.4) takes the form $$\hat{f}(x) = z^T (R_{\zeta\zeta} + \sigma_\eta^2 I)^{-1} r_{\zeta\zeta} = \sum_{n=1}^{N} \alpha_n r(x, x_n) \tag{1.5}$$

where $\alpha^T := z^T (R_{\zeta\zeta} + \sigma_\eta^2 I)^{-1}$, and the n-th entry of $r_{\zeta\zeta}$, denoted by $r(x_n, x) := E[f(x)f(x_n)]$, is indeed a function of the exploration point x, and the measurement point $x_n$.

With the Kriging estimate given by (1.5), the RKHS and LMMSE estimates coincide when the kernel in (1.2) is chosen equal to the covariance function $r(x, x')$ in (1.5).

The linearity assumption in (1.4) is unnecessary when $f(x)$ and $e(x)$ are modeled as zero-mean GPs [25]. GPs are those in which instances of the field at arbitrary points are jointly Gaussian. Zero-mean GPs are specified by $\mathrm{cov}(x, x') := E[f(x) f(x')]$, which determines the covariance matrix of any vector comprising instances of the field, and thus its specific zero-mean Gaussian distribution. In particular, the vector $\zeta^T := [f(x), f(x_1), \ldots, f(x_N)]$ collecting the field at the exploration and measurement points is Gaussian, and so is the vector $z^T := [f(x), f(x_1)+\eta(x_1), \ldots, f(x_N)+\eta(x_N)] = [\zeta, z^T]$. Hence, the MMSE estimator, given by the expectation of $f(x)$ conditioned on z, reduces to [17]

$$\hat{f}(x) = E(f(x)|z) = z^T R_{zz}^{-1} r_{z\zeta}^T = \sum_{n=1}^{N} \alpha_n \mathrm{cov}(x_n, x). \tag{1.6}$$

By comparing (1.6) with (1.5), one deduces that the MMSE estimator of a GP coincides with the LMMSE estimator, hence with the RKHS estimator, when $\mathrm{cov}(x, x') = k(x, x')$.

The Kernel Trick

Analogous to the spectral decomposition of matrices, Mercer's Theorem establishes that if the symmetric positive definite kernel is square-integrable, it admits a possibly infinite eigenfunction decomposition $$k(x, x') = \sum_{i=1}^{\infty} \lambda_i e_i(x) e_i(x'),$$

with $\langle e_i(x), e_{i'}(x) \rangle_{H_X} = \delta_{i-i'}$ where $\delta_i$ stands for Kronecker's delta. Using the weighted eigen functions $\phi_i(x) := \sqrt{\lambda_i} e_i(x)$, $i \in \mathbb{N}$, a point $x \in X$ can be mapped to a vector (sequence) $\phi \in R^\infty$ such that $\phi_i = \phi_i(x)$, $i \in \mathbb{N}$. This mapping interprets a kernel as an inner product in $R^\infty$, since for two points $$x, x' \in X, k(x, x') = \sum_{i=1}^{\infty} \varphi_i(x) \varphi_i(x') := \varphi^T(x) \varphi(x').$$

Such an inner product interpretation forms the basis for the "kernel trick," as used herein.

The kernel trick allows for approaches that depend on inner products of functions (given by infinite kernel expansions) to be recast and implemented using finite dimensional covariance (kernel) matrices. A simple demonstration of this valuable property can be provided through kernel-based ridge regression. Starting from the standard ridge estimator $$\hat{\beta} := \mathrm{argmin}_{\beta \in R^D} \sum_{n=1}^{N} (z_n - \varphi_n^T \beta)^2 + \mu |\beta|^2 \text{ for } \varphi_n \in R^D,$$

and $\Phi := [\varphi_1, \ldots, \varphi_N]$, it is possible to rewrite and solve $\hat{\beta} = \arg \min_{\beta \in R^D} |z - \Phi^T \beta|^2 + \mu |\beta|^2 = (\Phi \Phi^T + \mu I)^{-1} \Phi z$. After $\hat{\beta}$ is obtained in the training phase, it can be used for prediction of an ensuing $\hat{z}_{N+1} = \phi_{N+1}^T \hat{\beta}$ given $\phi_{N+1}$. By using the matrix inversion lemma, $\hat{z}_{N+1}$ can be written as $\hat{z}_{N+1} = (1/\mu) \phi_{N+1}^T \Phi z - (1/\mu) \phi_{N+1}^T \Phi (\mu I + \Phi^T \Phi)^{-1} \Phi^T \Phi z$.

Now, if $\phi_n = \phi(x_n)$ with $D = \infty$ is constructed from $x_n \in X$ using eigenfunctions $\{\phi_i(x_n)\}_{i=1}^{\infty}$, then $\phi_{N+1}^T \Phi = k^T(x_{N+1}) := [k(x_{N+1}, x_1), \ldots, k(x_{N+1}, x_1)]$, and $\Phi^T \Phi = K$, which yields $$\hat{z}_{N+1} = (1/\mu)k^T(x_{N+1})[I - (\mu I + K)^{-1}K]z \quad (1.7)$$
$$= k^T(x_{N+1})(\mu I + K)^{-1}z$$

coinciding with (1.6), (1.5), and with the solution of (1.1)

Expressing a linear predictor in terms of inner products only is instrumental for mapping it into its kernel-based version. Although the mapping entails the eigenfunctions $\{\phi_i(x)\}$, these are not explicitly present in (7), which is given solely in terms of $k(x,x')$. This is crucial since $\phi$ can be infinite dimensional which would render the method computationally intractable, and more importantly the explicit form of $\phi_i(x)$ may not be available. Use of kernel trick was demonstrated in the context of ridge regression. However, the trick can be used in any vectorial regression or classification method whose result can be expressed in terms of inner products only. One such example is offered by support vector machines, which find a kernel-based version of the optimal linear classifier in the sense of minimizing Vapnik's $\epsilon$-insensitive Hinge loss function, and can be shown equivalent to the Lasso.

In a nutshell, the kernel trick provides a means of designing KBL algorithms, both for nonparametric function estimation, as well as for classification.

KBL Vis a Vis Nyquist-Shannon Theorem

Kernels can be clearly viewed as interpolating bases. This viewpoint can be further appreciated if one considers the family of bandlimited functions $B_\pi := \{f \in L^2(X): \int f(x)e^{-i\omega x}dx = 0, \forall |\omega| > \pi\}$, where $L^2$ denotes the class of square-integrable functions defined over $X = R$ (e.g., continuous-time, finite-power signals). The family $B_\pi$ constitutes a linear space. Moreover, any $f \in B_\pi$ can be generated as the linear combination (span) of sinc functions; that is, $$f(x) = \sum_{n \in Z} f(n)\text{sinc}(x - n).$$

This is the cornerstone of signal processing, namely the NST for sampling and reconstruction, but can be viewed also under the lens of RKHS with $k(x,x') = \text{sinc}(x-x')$ as a reproducing kernel. The following properties (which are proved in the Appendix) elaborate further on this connection.

P1. The sinc-kernel Gram matrix $K \in R^{N \times N}$ satisfies $K \succeq 0$.
P2. The sinc kernel decomposes over orthonormal eigenfunctions $\{\phi_n(x) = \text{sinc}(x-n), n \in Z\}$
P3. The RKHS norm is $\|f\|_{H_X}^2 = \int f^2(x)dx$.

P1 states that $\text{sinc}(x-x')$ qualifies as a kernel, while P2 characterizes the eigenfunctions used in the kernel trick, and P3 shows that the RKHS norm is the restriction of the $L^2$ norm to $B_\pi$.

P1-P3 establish that the space of bandlimited functions $B_\pi$ is indeed an RKHS. Any $f \in B_\pi$ can thus be decomposed as a numerable combination of eigenfunctions, where the coefficients and eigenfunctions obey the NST. Consequently, existence of eigenfunctions $\{\phi_n(x)\}$ spanning $B_\pi$ is a direct consequence of $B_\pi$ being a RKHS, and does not require the NST unless an explicit form for $\phi_n(x)$ is desired. Finally, strict adherence to NST requires an infinite number of samples to reconstruct $f \in B_\pi$. Alternatively, the Representer Theorem fits $f \in B_\pi$ to a finite set of (possibly noisy) samples by regularizing the power of f.

Sparse Additive Nonparametric Modeling

The account of sparse KBL methods begins with SpAMs and MKL approaches. Both model the function to be learned as a sparse sum of nonparametric components, and both rely on group Lasso to find it. The additive models considered in this section will naturally lend themselves to the general model for NBP introduced below, and used henceforth.

Sparse Additive Models (SpAMs) for High-Dimensional Models

Additive function models offer a generalization of linear regression to the nonparametric setup, on the premise of dealing with the curse of dimensionality, which is inherent to learning from high dimensional data.

Consider learning a multivariate function $f: X \to R$ defined over the Cartesian product $X := X_1 \otimes \ldots \otimes X_p$ of measurable spaces $X_i$. Let $x^T := [x_1, \ldots, x_p]$ denote a point in X, $k_i$ the kernel defined over $X_i \times X_i$, and $H_i$ its associated RKHS. Although $f(x)$ can be interpolated from data via (1.1) after substituting x for x, the fidelity of (1.2) is severely degraded in high dimensions. Indeed, the accuracy of (1.2) depends on the availability of nearby points $x_n$, where the function is fit to the (possibly noisy) data $z_n$. But proximity of points $x_n$ in high dimensions is challenged by the curse of dimensionality, demanding an excessively large dataset. For instance, consider positioning N datapoints randomly in the hypercube $[0,1]^P$, repeatedly for P growing unbounded and N constant. Then $$P \xrightarrow{\lim} \infty \min_{n \neq n'} E|x_n - x_{n'}| = 1;$$

that is, the expected distance between any two points is equal to the side of the hypercube [16].

To overcome this problem, an additional modeling assumption is well motivated, namely constraining $f(x)$ to the family of separable functions of the form $$f(x) = \sum_{i=1}^{P} c_i(x_i) \quad (1.8)$$

with $c_i \in H_i$ depending only on the i-th entry of x, as in e.g., linear regression models $$f_{linear}(x) := \sum_{i=1}^{P} \beta_i x_i.$$

With $f(x)$ separable as in (1.8), the interpolation task is split into P one-dimensional problems that are not affected by the curse of dimensionality.

The additive form in (1.8) is also amenable to subset selection, which yields a SpAM. As in sparse linear regression, SpAMs involve functions f in (1.8) that can be expressed using only a few entries of x. Those can be learned using a variational version of the Lasso given by [26]

$$\hat{f} = \text{argmin}_{f \in \mathcal{F}_P} \frac{1}{2} \sum_{n=1}^{N} (z_n - f(x_n))^2 + \mu \sum_{i=1}^{P} |c_i|_{\mathcal{H}_i} \quad (1.9)$$

$$\text{where } \mathcal{F}_P := \left\{ f: X \to R: f(x) = \sum_{i=1}^{P} c_i(x_i) \right\}.$$

With $x_{ni}$ the ith entry of $x_n$, the Representer Theorem (1.3) can be applied per component $c_i(x_i)$ in (1.9), yielding kernel expansions $$\hat{c}_i(x_i) = \sum_{n=1}^{N} \gamma_{ni} k_i(x_{ni}, x_i)$$

with scalar coefficients $\{\gamma_{ni}, i=1, \ldots, P, n=1, \ldots, N\}$

The fact that (1.9) yields a SpAM is demonstrated by substituting these expansions back into (1.9) and solving for $\gamma_i^T := [\gamma_{i1}, \ldots, \gamma_{iN}]$, to obtain $$\{\gamma_i\}_{i=1}^{P} = \operatorname{argmin}_{\{\gamma_i\}_{i=1}^{P}} \frac{1}{2} \left| z - \sum_{i=1}^{P} K_i \gamma_i \right|_2^2 + \mu \sum_{i=1}^{P} |\gamma_i|_{K_i} \quad (1.10)$$

where $K_i$ is the Gram matrix associated with kernel $k_i$, and $|\cdot|_{K_i}$ denotes the weighted $l_2$-norm $|\gamma_i|_{K_i} := (\gamma_i^T K_i \gamma_i)^{1/2}$.

Nonparametric Lasso

Problem (1.10) constitutes a weighted version of the group Lasso formulation for sparse linear regression. Its solution can be found either via block coordinate descent (BCD) [26], or by substituting $\gamma'_i = K_i^{1/2} \gamma_i$ and applying the alternating-direction method of multipliers (ADMM) [6], with convergence guaranteed by its convexity and the separable structure of the its non-differentiable term [30]. In any case, group Lasso regularizes sub-vectors $\gamma_i$ separately, effecting group-sparsity in the estimates; that is, some of the vectors $\hat{\gamma}_i$ in (1.10) end up being identically zero. To gain intuition on this, (1.10) can be rewritten using the change of variables $K_i^{1/2} \gamma_i = t_i u_i$, with $t_i \geq 0$ and $|u_i|=1$. It will be argued that if $\mu$ exceeds a threshold, then the optimal $t_i$ and thus $\hat{\gamma}_i$ will be null. Focusing on the minimization of (1.10) w.r.t. a particular sub-vector $\gamma_i$, as in a BCD algorithm, the substitute variables $t_i$ and $u_i$ should minimize $$\frac{1}{2} |z_i - K_i^{1/2} t_i u_i|_2^2 + \mu t_i \quad (1.11)$$

where $$z_i := z - \sum_{j \neq i} K_j \gamma_j.$$

Minimizing (1.11) over $t_i$ is a convex univariate problem whose solution lies either at the border of the constraint, or, at a stationary point; that is, $$t_i = \max\left\{0, \frac{z_i^T K_i^{1/2} u_i - \mu}{u_i^T K_i u_i}\right\}. \quad (1.12)$$

The Cauchy-Schwarz inequality implies that $z_i^T K_i^{1/2} u_i \leq |K_i^{1/2} z_i|$ holds for any $u_i$ with $|u_i|=1$. Hence, it follows from (1.12) that if $\mu \geq |K_i^{1/2} z_i|$, then $t_i=0$, and thus $\gamma_i=0$.

The sparsifying effect of (1.9) on the additive model (1.8) is now revealed. If $\mu$ is selected large enough, some of the optimal sub-vectors $\hat{\gamma}_i$ will be null, and the corresponding functions $$\hat{c}_i(x_i) = \sum_{n=1}^{N} \hat{\gamma}_{ni} k(x_{ni}, x_i)$$

will be identically zero in (1.8). Thus, estimation via (1.9) provides a nonparametric counterpart of Lasso, offering the flexibility of selecting the most informative component-function regressors in the additive model.

The separable structure postulated in (1.8) facilitates subset selection in the nonparametric setup, and mitigates the problem of interpolating scattered data in high dimensions. However, such a model reduction may render (1.8) inaccurate, in which case extra components depending on two or more variables can be added, turning (1.8) into the ANOVA model.

Multi-Kernel Learning

Specifying the kernel that "shapes" $H_X$, and thus judiciously determines $\hat{f}$ in (1.1) is a prerequisite for KBL. Different candidate kernels $k_1, \ldots, k_p$ would produce different function estimates. Convex combinations can be also employed in (1.1), since elements of the convex hull $$\mathcal{K} := \left\{ k = \sum_{i=1}^{P} a_i k_i, a_i \geq 0, \sum_{i=1}^{P} a_i = 1 \right\}$$

conserve the defining properties of kernels.

A data-driven strategy to select "the best" $k \in \mathcal{K}$ is to incorporate the kernel as a variable in (1.3), that is $$\hat{f} = \operatorname{argmin}_{k \in \mathcal{K}, f \in \mathcal{H}_X^k} \sum_{n=1}^{N} (z_n - f(x_n))^2 + \mu |f|_{\mathcal{H}_X^k} \quad (1.13)$$

where the notation $H_X^k$ emphasizes dependence on k.

Then, the following Lemma brings MKL to the ambit of sparse additive nonparametric models.

Lemma 1 (MP05) Let $\{k_1, \ldots, k_p\}$ be a set of kernels and k an element of their convex hull $\mathcal{K}$. Denote by $H_i$ and $H_X^k$ the RKHSs corresponding to $k_i$ and k, respectively, and by $\tilde{H}_X$ the direct sum $\tilde{H}_X := H_1 \oplus \ldots \oplus H_p$. It then holds that:

a) $\mathcal{H}_X^k = \tilde{\mathcal{H}}_X, \quad \forall k \in \mathcal{K};$ and b) $\forall f, \quad \inf\{|f|_{\mathcal{H}_X^k} : k \in \mathcal{K}\} = \min\left\{\sum_{i=1}^{P} |c_i|_{\mathcal{H}_i} : f = \sum_{i=1}^{P} c_i, c_i \in \mathcal{H}_i\right\}.$ According to Lemma 1, $\tilde{H}_X$ can replace $H_X^k$ in (1.13), rendering it equivalent to $$\operatorname{argmin}_{f \in \tilde{\mathcal{H}}_X} \sum_{n=1}^{N} (z_n - f(x_n))^2 + \mu \sum_{i=1}^{P} |c_i|_{\mathcal{H}_i} \quad (1.14)$$

$$s.to \left\{ f = \sum_{i=1}^{P} c_i, c_i \in \mathcal{H}_i, \quad \tilde{\mathcal{H}}_X := \mathcal{H}_1 \oplus \ldots \oplus \mathcal{H}_P \right\}.$$

MKL as in (1.14) resembles (1.9), differing in that components $c_i(x)$ in (1.14) depend on the same variable x. Taking into account this difference, (1.14) is reducible to (1.10) and thus solvable via BCD or ADMoM, after substituting $k_i(x_n,x)$ for $k_i(x_n,x_i)$. On the other hand, in a more general case of MKL, where x is the convex hull of an infinite and possibly uncountable family of kernels.

An example of MKL applied to wireless communications is offered below, where two different kernels are employed for estimating path-loss and shadowing propagation effects in a cognitive radio sensing paradigm.

In the ensuing section, basis functions depending on a second variable y will be incorporated to broaden the scope of the additive models just described.

Nonparametric Basis Pursuit

Consider function $f: X \times Y \to R$ over the Cartesian product of spaces X and Y with associated RKHSs $H_X$ and $H_Y$, respectively. Let f abide to the bilinear expansion form $$f(x, y) = \sum_{i=1}^{P} c_i(x) b_i(y) \tag{1.15}$$

where $b_i: Y \to R$ can be viewed as bases, and $c_i: X \to R$ as expansion coefficient functions. Given a finite number of training data, learning $\{c_i, b_i\}$ under sparsity constraints constitutes the goal of the NBP approaches developed in the following sections.

The first method for sparse KBL of f in (1.15) is related to a nonparametric counterpart of basis pursuit, with the goal of fitting the function f(x,y) to data, where $\{b_i\}$ are prescribed and $\{c_i\}$s are to be learned. The designer's degree of confidence on the modeling assumptions is key to deciding whether $\{b_i\}$s should be prescribed or learned from data. If the prescribed $\{b_i\}$s are unreliable, model (1.15) will be inaccurate and the performance of KBL will suffer. But neglecting the prior knowledge conveyed by $\{b_i\}$s may be also damaging. Parametric basis pursuit [9] hints toward addressing this tradeoff by offering a compromising alternative.

A functional dependence z=f(y)+e between input y and output z is modeled with an overcomplete set of bases $\{b_i(y)\}$ (a.k.a. regressors) as $$z = \sum_{i=1}^{P} c_i b_i(y) + e, \quad e \sim N(0, \sigma^2). \tag{1.16}$$

Certainly, leveraging an overcomplete set of bases $\{b_i(y)\}$ can accommodate uncertainty. Practical merits of basis pursuit however, hinge on its capability to learn the few $\{b_i\}$s that "best" explain the given data.

The crux of NBP on the other hand, is to fit f(x,y) with a basis expansion over the y domain, but learn its dependence on x through nonparametric means. Model (1.15) comes handy for this purpose, when $\{b_i(y)\}_{i=1}^{P}$ is a generally overcomplete collection of prescribed bases.

With $\{b_i(y)\}_{i=1}^{P}$ known, $\{c_i(x)\}_{i=1}^{P}$ need to be estimated, and a kernel-based strategy can be adopted to this end. Accordingly, the optimal function $\hat{f}(x,y)$ is searched over the family $$\mathcal{F}_b := \left\{ f(x, y) = \sum_{i=1}^{P} c_i(x) b_i(y) \right\},$$

which constitutes the feasible set for the NBP-tailored nonparametric Lasso $$\hat{f} = \operatorname{argmin}_{f \in \mathcal{F}_b} \sum_{n=1}^{N} (z_n - f(x_n, y_n))^2 + \mu \sum_{i=1}^{P} |c_i|_{H_X}. \tag{1.17}$$

The Representer Theorem in its general form (0.13) can be applied recursively to minimize (1.17) w.r.t. each $c_i(x)$ at a time, rendering $\hat{f}$ expressible in terms of the kernel expansion as $$\hat{f}(x, y) = \sum_{i=1}^{P} \sum_{n=1}^{N} \gamma_{in} k(x_n, x) b_i(y),$$

where coefficients $\gamma_i^T := [\gamma_{i1}, \ldots, \gamma_{iN}]$ are learned from data $z^T := [z_1, \ldots, z_N]$ via group Lasso $$\min_{\{\gamma_i \in R^N\}_{i=1}^{P}} \left| z - \sum_{i=1}^{P} K_i \gamma_i \right|^2 + \mu \sum_{i=1}^{P} |\gamma_i|_K \tag{1.18}$$

with $K_i := \operatorname{Diag}[b_i(y_1), \ldots, b_i(y_N)] K$.

Group Lasso in (1.18) effects group-sparsity in the subvectors $\{\gamma_i\}_{i=1}^{P}$. This property inherited by (1.17) is the capability of selecting bases in the nonparametric setup. Indeed, by zeroing $\gamma_i$ the corresponding coefficient function $$c_i(x) = \sum_{n=1}^{N} \gamma_{in} k(x_n, x)$$

is driven to zero, and correspondingly $b_i(y)$ drops from the expansion (1.15).

Remark 2. A single kernel $k_X$ and associated RKHS $H_X$ can be used for all components $c_i(x)$ in (1.17), since the summands in (1.15) are differentiated through the bases. Specifically, for a common K, a different $b_i(y)$ per coefficient $c_i(x)$, yields a distinct diagonal matrix $\operatorname{Diag}[b_i(y_1), \ldots, b_i(y_N)]$, defining an individual $K_i$ in (1.18) that renders vector $\gamma_i$ identifiable. This is a particular characteristic of (1.17), in contrast with (1.9) and Lemma 1 which are designed for, and may utilize, multiple kernels.

Remark 3. The different sparse kernel-based approaches presented so far, namely SpAMs, MKL, and NBP, should not be viewed as competing but rather as complementary choices. Multiple kernels can be used in basis pursuit, and a separable model for $c_i(x)$ may be due in high dimensions. An NBP-MKL hybrid applied to spectrum cartography illustrates this point, where bases are utilized for the frequency domain $\gamma$.

Blind NBP for Matrix and Tensor Completion

A kernel-based matrix completion scheme will be developed in this section using a blind version of NBP, in which bases $\{b_i\}$ will not be prescribed, but they will be learned together with coefficient functions $\{c_i\}$. The matrix completion task entails imputation of missing entries of a data matrix $Z \in R^{M \times N}$. Entries of an index matrix $W \in \{0,1\}^{M \times N}$ specify whether datum $z_{mn}$ is available ($w_{mn}=1$), or missing ($w_{mn}=0$). Low rank of Z is a popular attribute that relates missing with available data, thus granting feasibility to the imputation task. Low-rank matrix imputation is achieved by solving $$\hat{Z} = \operatorname{argmin}_{A \in R^{M \times N}} \frac{1}{2} |(Z - A) \odot W|_F^2 \, s.to \, \operatorname{rank}(A) \leq P \quad (1.19)$$

where $\odot$ stands for the Hadamard (element-wise) product. The low-rank constraint corresponds to an upperbound on the number of nonzero singular values of matrix A, as given by its $l_0$-norm. Specifically, if $s^T := [s_1, \ldots, s_{min\{M,N\}}]$ denotes vector of singular values of A, and the cardinality $|\{s_i \neq 0, i=1, \ldots, min\{M,N\}\}| := |s|_0$ defines its $l_0$-norm, then the ball of radius P, namely $|s|_0 \leq P$, can replace $\operatorname{rank}(A) \leq P$ in (1.19). The feasible set $|s|_0 \leq P$ is not convex because $|s|_0$ is not a proper norm (it lacks linearity), and solving (1.19) requires a combinatorial search for the nonzero entries of s. A convex relaxation is thus well motivated. If the $l_0$-norm is surrogated by the $l_1$ norm, the corresponding ball $|s|_1 \leq P$ becomes the convex hull of the original feasible set. As the singular values of A are non-negative by definition, it follows that $$|S|_1 = \min\{M, N\} \sum_{s_i} .$$

Since the sum of singular values equals the dual norm of the $l_2$-norm of A, $|s|_1$ defines a norm over the matrix A itself, namely the nuclear norm of A, denoted by $|A|_*$.

Upon substituting $|A|_*$ for the rank, (1.19) is further transformed to its Lagrangian form by placing the constraint in the objective as a regularization term, i.e., $$\hat{Z} = \operatorname{argmin}_{A \in R^{M \times N}} \frac{1}{2} |(Z - A) \odot W|_F^2 + \mu |A|_*. \quad (1.20)$$

The next step towards kernel-based matrix completion relies on an alternative definition of $|A|_*$. Consider bilinear factorizations of matrix $A = CB^T$ with $B \in R^{N \times P}$ and $C \in R^{M \times P}$, in which the constraint $\operatorname{rank}(A) \leq P$ is implicit. The nuclear norm of A can be redefined as $$|A|_* = \inf_{A = CB^T} \frac{1}{2}(|B|_F^2 + |C|_F^2). \quad (1.21)$$

Result (1.21) states that the infimum is attained by the singular value decomposition of A. Specifically, if $A = U\Sigma V^T$ with U and V unitary and $\Sigma = \operatorname{diag}(s)$, and if B and C are selected as $B = V\Sigma^{1/2}$, and $C = U\Sigma^{1/2}$, then $$\frac{1}{2}(|B|_F^2 + |C|_F^2) = \sum_{i=1}^{P} s_i = |A|_*.$$

Given (1.21), it is possible to rewrite (1.20) as $$\hat{Z} = \operatorname{argmin}_{A = CB^T} \frac{1}{2} |(Z - A) \odot W|_F^2 + \frac{\mu}{2}(|B|_F^2 + |C|_F^2). \quad (1.22)$$

Matrix completion in its factorized form (1.22) can be reformulated in terms of (1.15) and RKHSs. Define spaces $X := \{1, \ldots, M\}$ and $Y := \{1, \ldots, N\}$ with associated kernels $k_X(m,m')$ and $k_Y(n,n')$, respectively. Let $f(m,n)$ represent the (m,n)-th entry of the approximant matrix A in (1.22), and P a prescribed overestimate of its rank. Consider estimating $f: X \times Y \to R$ in (1.15) over the family $$F := \left\{ f(m, n) = \sum_{i=1}^{P} c_i(n) b_i(m), C_i \in H_x, b_i \in H_y \right\} \text{ via} \quad (1.23)$$

$$\hat{f} = \operatorname{argmin}_{f \in F} \frac{1}{2} \sum_{m=1}^{M} \sum_{n=1}^{N} w_{mn}(z_{mn} - f(m, n))^2 + \frac{\mu}{2} \sum_{i=1}^{P} (|c_i|^2 H_x + |b_i|^2 H_y).$$

If both kernels are selected as Kronecker delta functions, then (1.23) coincides with (1.22). This equivalence is stated in the following lemma.

Lemma 2 Consider spaces $X := \{1, \ldots, M\}, Y := \{1, \ldots, N\}$ and kernels $k_X(m,m') := \delta(m-m')$ and $k_Y(n,n') := \delta(n-n')$ over the product spaces $X \times X$ and $Y \times Y$, respectively. Define functions $f: X \times Y \to R$, $c_i: X \to R$, and $b_i: Y \to R$, $i=1, \ldots, P$, and matrices $A \in R^{M \times N}$, $B \in R^{N \times P}$, and $C \in R^{M \times P}$. It holds that:

a) RKHS $H_X(H_Y)$ of functions over X (correspondingly Y), associated with $k_X(k_Y)$ reduce to $H_X = R^M$ ($H_Y = R^N$).

b) Problems (1.23), (1.22), and (1.20) are equivalent upon identifying $f(m,n) = A_{mn}$, $b_i(n) = B_{ni}$, and $c_i(m) = C_{mi}$.

According to Lemma 2, the intricacy of rewriting (1.20) as in (1.23) does not introduce any benefit when the kernel is selected as the Kronecker delta. But as it will be argued next, the equivalence between these two estimators generalizes nicely the matrix completion problem to sparse KBL of missing data with arbitrary kernels.

The separable structure of the regularization term in (1.23) enables a finite dimensional representation of functions $$\hat{c}_i(m) = \sum_{m'=1}^{M} im'^{k_X}(m', m), m = 1, \ldots, M, \quad (1.24)$$

$$\hat{b}_i(n) = \sum_{n'=1}^{N} \beta_{in'} k_Y(n', n), n = 1, \ldots, N$$

Optimal scalars $\{\gamma_{im}\}$ and $\{\beta_{in}\}$ are obtained by substituting (1.24) into (1.23), and solving $$\min_{\substack{\tilde{C} \in R^{M \times P} \\ \tilde{B} \in R^{N \times P}}} \frac{1}{2} \left\| (Z - K_x \tilde{C} \tilde{B}^T K_y^T) \odot W \right\|_F^2 + \quad (1.25)$$

$$\frac{\mu}{2} \left[ \operatorname{trace}(\tilde{C}^T K_x \tilde{C}) + \operatorname{trace}(\tilde{B}^T K_y \tilde{B}) \right]$$

where matrix $\tilde{C}(\tilde{B})$ is formed with entries $\gamma_{mi}(\beta_{ni})$.

A Bayesian approach to kernel-based matrix completion is given next, followed by an algorithm to solve for $\tilde{B}$ and $\tilde{C}$.

Bayesian Low-Rank Imputation and Prediction

To recast (1.23) in a Bayesian framework, suppose that the available entries of Z obey the additive white Gaussian noise (AWGN) model $Z = A + E$, with E having entries independent identically distributed (i.i.d.) according to the zero-mean Gaussian distribution $N(0, \sigma^2)$.

Matrix A is factorized as $A=CB^T$ without loss of generality (w.l.o.g.). Then, a Gaussian prior is assumed for each of the columns $b_i$ and $c_i$ of B and C, respectively, $$b_i \sim N(0, R_B),\ c_i \sim N(0, R_C) \quad (1.26)$$

independent across i, and with $\text{trace}(R_B) = \text{trace}(R_C)$. Invariance across i is justifiable, since columns are a priori interchangeable, while $\text{trace}(R_B) = \text{trace}(R_C)$ is introduced w.l.o.g. to remove the scalar ambiguity in $A = CB^T$.

Under the AWGN model, and with priors (1.26), the maximum a posteriori (MAP) estimator of A given Z at the entries indexed by W takes the form [cf. (1.25)]

$$\min_{\substack{C \in \mathbb{R}^{M \times P} \\ B \in \mathbb{R}^{N \times P}}} \frac{1}{2} \|(Z - CB^T) \odot W\|_F^2 + \frac{\sigma^2}{2} [\text{trace}\ (C^T R_C^{-1} C) + \text{trace}\ (B^T R_B^{-1} B)]. \quad (1.27)$$

With $R_C = K_X$ and $R_B = K_y$, and substituting $B := \tilde{K}_y B$ and $C := \tilde{K}_X C$, the MAP estimator that solves (1.24) coincides with the estimator solving (1.25) for the coefficients of kernel-based matrix completion, provided that covariance and Gram matrices coincide. From this Bayesian perspective, the KBL matrix completion method (1.23) provides a generalization of (1.20), which can accommodate a priori knowledge in the form of correlation across rows and columns of the incomplete Z.

With prescribed correlation matrices $R_B$ and $R_C$, (1.23) can even perform smoothing and prediction. Indeed, if a column (or row) of Z is completely missing, (1.23) can still find an estimate $\hat{Z}$ relying on the covariance between the missing and available columns. This feature is not available with (1.20), since the latter relies only on rank-induced colinearities, so it cannot reconstruct a missing column. The prediction capability is useful for instance in collaborative filtering [3], where a group of users rates a collection of items, to enable inference of new-user preferences or items entering the system. Additionally, the Bayesian reformulation (1.27) provides an explicit interpretation for the regularization parameter $\mu = \sigma^2$ as the variance of the model error, which can thus be obtained from training data. The kernel-based matrix completion method (1.27) is summarized in Algorithm 1, which solves (1.27) upon identifying $R_C = K_X$, $R_B = K_y$, and $\sigma^2 = \mu$, and solves (1.25) after changing variables $B := \tilde{K}_y B$ and $C := \tilde{K}_X C$ (compare (1.25) with lines 13-14 in Algorithm 1).

Detailed derivations of the updates in Algorithm 1 are provided in the Appendix. For a high-level description, the columns of B and C are updated cyclically, solving (1.27) via BCD iterations. This procedure converges to a stationary point of (1.27), which in principle does not guarantee global optimality. Opportunely, it can be established that local minima of (1.27) are global minima, by transforming (1.27) into a convex problem through the same change of variables proposed in [22] for the analysis of (1.22). This observation implies that Algorithm 1 yields the global optimum of (1.25), and thus (1.23).

Kernel-Based Dictionary Learning

Figure 12:
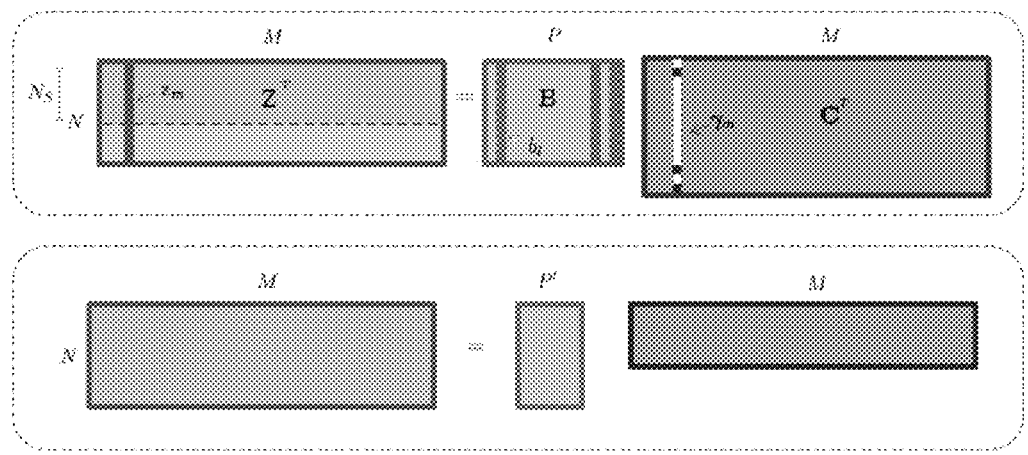
FIG. 12 is a block diagram illustrating a comparison between KDL and NBP; (top) dictionary B and sparse coefficients $\gamma_m$ for KDL, where $MN_s$ equations are sufficient to recover C; (bottom) low-rank structure $A=CB^T$ presumed in KMC.

Basis pursuit approaches advocate an overcomplete set of bases to cope with model uncertainty, thus learning from data the most concise subset of bases that represents the signal of interest. But the extensive set of candidate bases (a.k.a. dictionary) still needs to be prescribed. The next step towards model-agnostic KBL is to learn the dictionary from data, along with the sparse regression coefficients. Under the sparse linear model $$z_m = B\gamma_m + e_m,\ m=1,\ldots,M \quad (1.28)$$

with dictionary of bases $B \in \mathbb{R}^{N \times P}$, and vector of coefficients $\gamma_m \in \mathbb{R}^P$, the goal of dictionary learning is to obtain B and $C := [\gamma_1, \ldots, \gamma_M]^T$ from data $Z := [z_1, \ldots, z_M]^T$. A swift count of equations and unknowns yields NP+MP scalar variables to be learned from MN data (see FIG. 12). This goal is not plausible for an overcomplete design (P>N) unless sparsity of $\{\gamma_m\}_{m=1}^M$ is exploited. Under proper conditions, it is possible to recover a sparse $\gamma_m$ containing at most S nonzero entries from a reduced number $N_s := \Theta S \log P \leq N$ of equations, where $\Theta$ is a proportionality constant. Hence, the number of equations needed to specify C reduces to $MN_s$, as represented by the darkened region of $Z^T$ in FIG. 1. With $N_s < N$, it is then possible and crucial to collect a sufficiently large number M of data vectors in order to ensure that $MN \geq NP + MN_s$, thus accommodating the additional NP equations needed to determine B, and enable learning of the dictionary.

Having collected sufficient training data, one possible approach to find B and C is to fit the data via the LS cost $|Z - CB^T|_F^2$ regularized by the $l_1$-norm of C in order to effect sparsity in the coefficients. This dictionary leaning approach can be recast into the form of blind NBP (1.23) by introducing the additional regularizing term $$\lambda \sum_{i=1}^P |c_i|_1,$$

with $$|c_i|_1 := \sum_{m=1}^M |c_i(m)|.$$

The new regularizer on functions $c_i : X \to \mathbb{R}$ depends on their values at the measurement points m only, and can be absorbed in the loss part of (1.3). Thus, the optimal $\{c_i\}$ and $\{b_i\}$ conserve their finite expansion representations dictated by the Representer Theorem. Coefficients $\{\gamma_{mp}, \beta_{np}\}$ must be adapted according to the new cost, and (1.27) becomes $$\min_{\substack{C \in \mathbb{R}^{M \times P} \\ B \in \mathbb{R}^{N \times P}}} \frac{1}{2} \|(Z - CB^T) \odot W\|_F^2 + \lambda \|C\|_1 + \frac{\sigma^2}{2} [\text{trace}\ (B^T R_B^{-1} B) + \text{trace}\ (C^T R_C^{-1} C)]. \quad (1.29)$$

Remark 4. Kernel-based dictionary learning (KDL) via (1.29) inherits two attractive properties of kernel matrix completion (KMC), that is blind NBP, namely its flexibility to introduce a priori information through $R_B$ and $R_C$, as well as the capability to cope with missing data. While both KDL and KMC estimate bases $\{b_i\}$ and coefficients $\{c_i\}$ jointly, their difference lies in the size of the dictionary. As in principal component analysis, KMC presumes a low-rank model for the approximant $A = CB^T$, compressing signals $\{z_m\}$ with P'<M components (FIG. 12 (bottom)). Low rank of A is not required by the dictionary learning approach, where signals $\{z_m\}$ are spanned by P≥M dictionary atoms $\{b_i\}$ (FIG. 12 (top)), provided that each $z_m$ is composed by a few atoms only.

Algorithm 1 can be modified to solve (1.29) by replacing the update for column $c_i$ in line 7 with the Lasso estimate $$c_i := \operatorname{argmin}_{c \in R^M} \frac{1}{2} c^T H_i c + c^T (W \odot Z_i) B e_i + \lambda |c|_1. \tag{1.33}$$

Example Application—Spectrum Cartography via NBP and MKL

Figure 13:
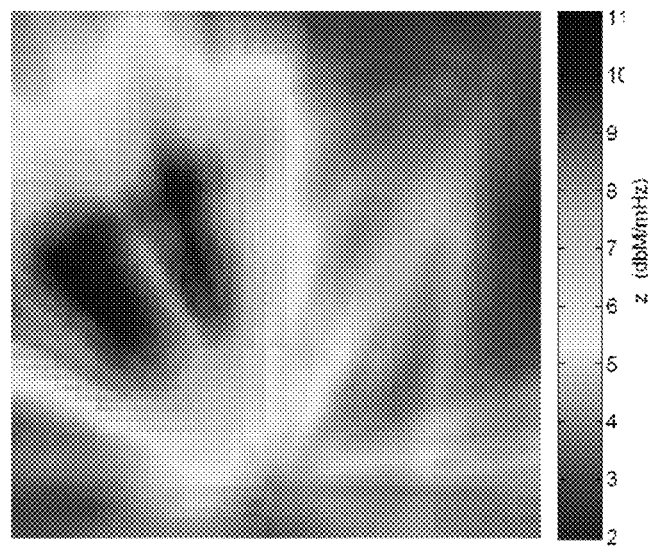
FIG. 13 is a graph illustrating aggregate power distribution across space.
Figure 14:
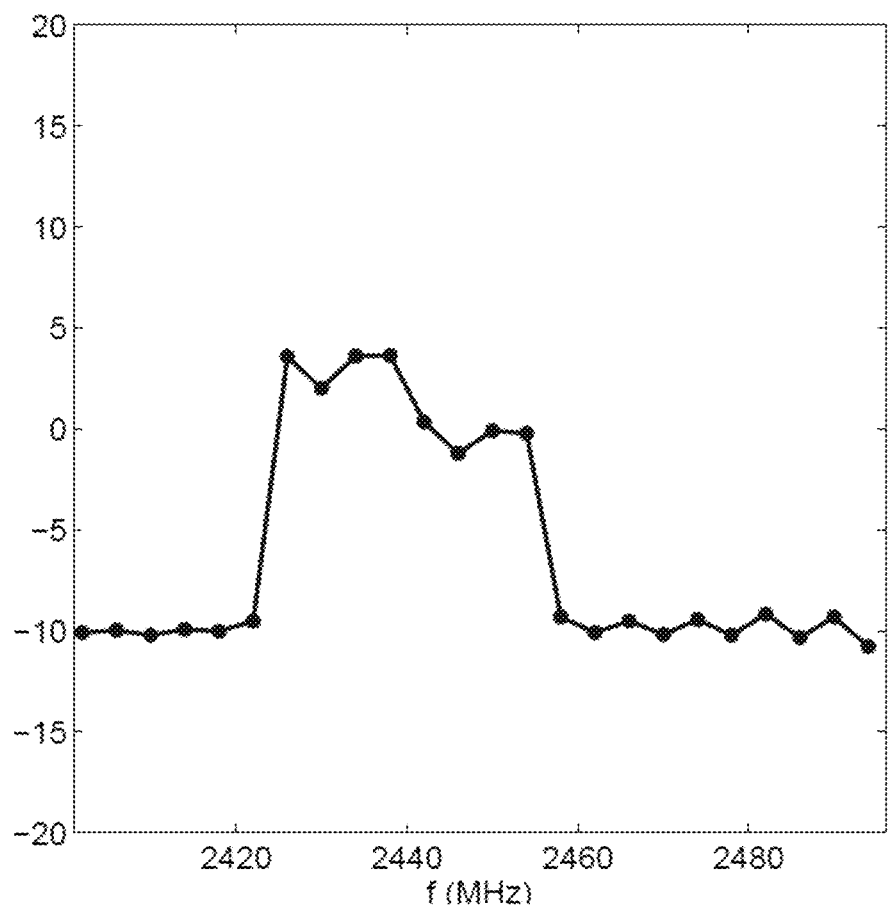
FIG. 14 is a graph illustrating PSD measurements at a representative location

Consider a setup with $N_c=100$ radios distributed over an area X of 100×100 m² to measure the ambient RF power spectral density (PSD) at $N_f=24$ frequencies equally spaced in the band from 2,400 MHz to 2,496 MHz, as specified by IEEE 802.11 wireless LAN standard. The radios collaborate by sharing their $N=N_c N_f$ measurements with the goal of obtaining a map of the PSD across space and frequency, while specifying at the same time which of the P=14 frequency sub-bands are occupied. The wireless propagation is simulated according to a pathloss model affected by shadowing, with parameters $n_p=3$, $\Delta_0=60$ m, $\delta=25$ m, $\sigma_x^2=25$ dB, and with AWGN variance $\sigma_n^2=-10$ dB. FIG. 13 depicts the distribution of power across space generated by two sources transmitting over bands i=5 and i=8 with center frequencies 2,432 MHz and 2,447 MHz, respectively. FIG. 14 shows the PSD as seen by a representative radio located at the center of X.

Model (1.15) is adopted for collaborative PSD sensing, with x and y representing the spatial and frequency variables, respectively. Bases $\{b_i\}$ are prescribed as Hann-windowed pulses, and the distribution of power across space per sub-band is given by $\{c_i(x)\}$ after interpolating the measurements obtained by the radios via (1.17). Two exponential kernels $k_r(x,x')=\exp(-|x-x'|^2/\Theta_r^2)$, r=1,2 with $\Theta_1=10$ m and $\Theta_2=20$ m are selected, and convex combinations of the two are considered as candidate interpolators $k(x,x')$. This MKL strategy is intended for capturing two different levels of resolution as produced by pathloss and shadowing. Correspondingly, each $c_i(x)$ is decomposed into two functions $c_{i1}(x)$ and $c_{i2}(x)$ which are regularized separately in (1.17).

Figure 15:
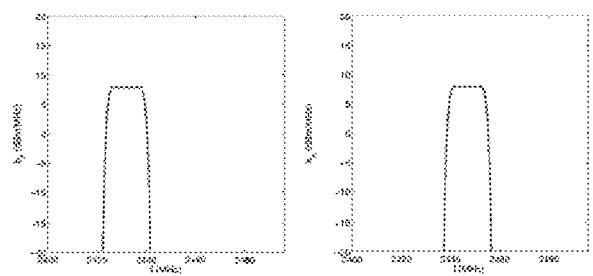
FIG. 15 is a graph illustrating NBP for spectrum cartography using MKL.
Figure 15:
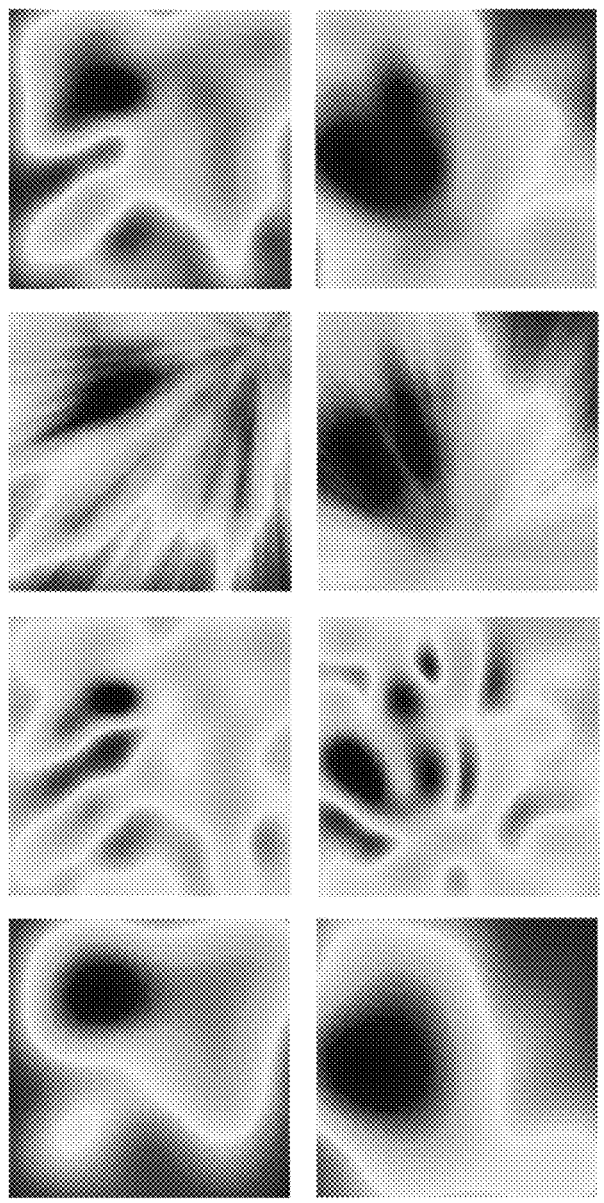

Solving (1.17) generates the PSD maps of FIG. 15. Only $\gamma_5$ and $\gamma_8$ in the solution to (1.18) take nonzero values (more precisely $\gamma_{5,r}$ and $\gamma_{8,r}$, r=1,2 in the MKL adaptation of (1.18)), which correctly reveals which frequency bands are occupied as shown in FIG. 15(a). The estimated PSD across space is depicted in FIG. 15(b) (first row) for each band respectively, and compared to the ground truth depicted in FIG. 15(b) (second row). The multi-resolution components $c_{5,r}(x)$ and $c_{8,r}(x)$ are depicted in FIG. 15(b) (last two rows), demonstrating how kernel $k_1$ captures the coarse pathloss distribution, while $k_2$ refines the map by revealing locations affected by shadowing.

These results demonstrate the usefulness of model (1.15) for collaborative spectrum sensing, with bases and multi-resolution kernels. The sparse nonparametric estimator (1.17) serves the purpose of revealing the occupied frequency bands, and capturing the PSD map across space per source. Compared to a spline-based approach, the MKL adaptation of (1.17) here provides the appropriate multi-resolution capability to capture pathloss and shadowing effects when interpolating the data across space.

Figure 16:
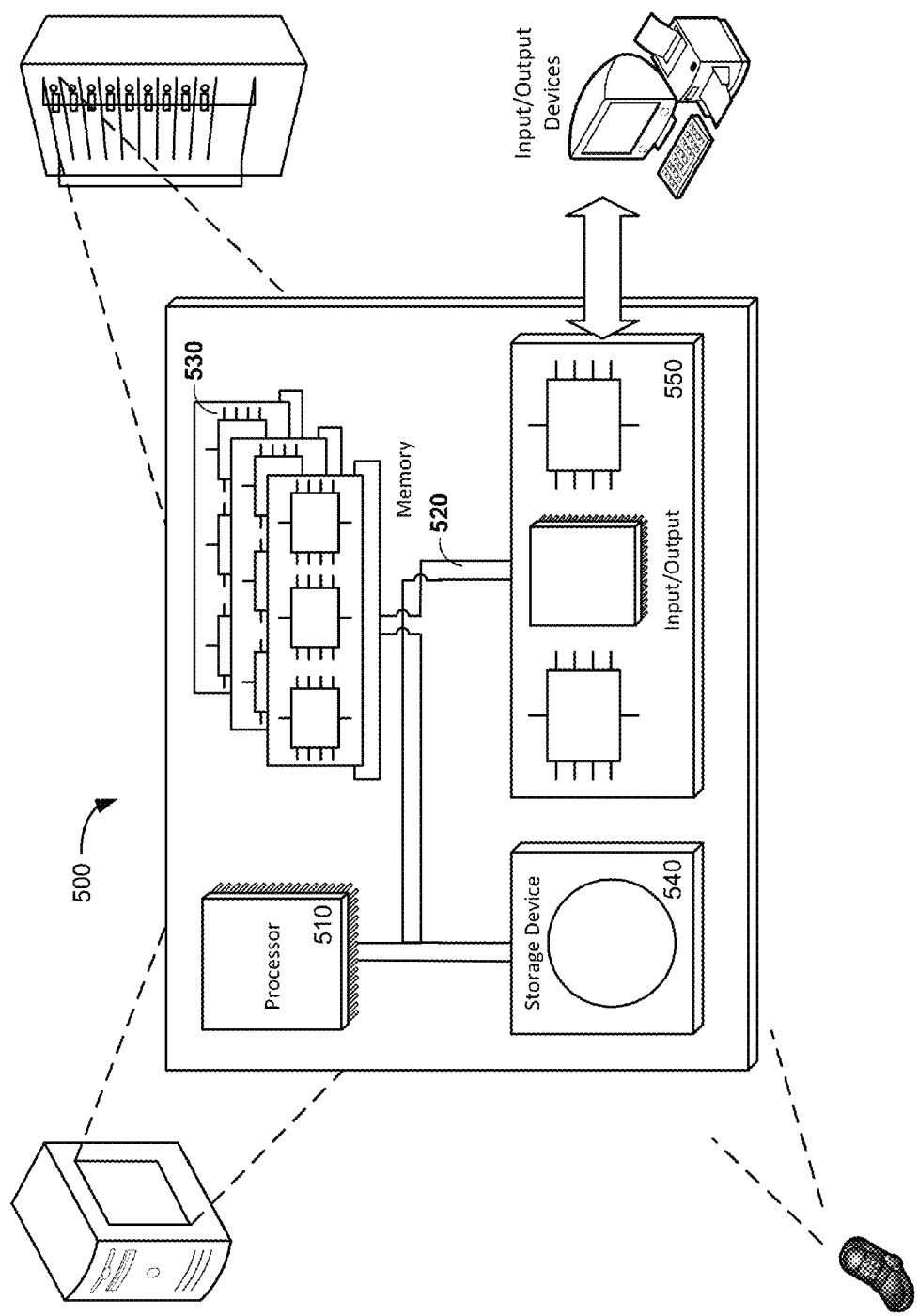
FIG. 16 shows a detailed example of various devices that may be configured to execute program code to practice some embodiments in accordance with the current disclosure.

FIG. 16 shows a detailed example of various devices that may be configured to execute program code to practice some embodiments in accordance with the current disclosure. For example, device 500 may be a CR 12, a FC 16, a workstation, a computing center, a cluster of servers or other example embodiments of a computing environment, centrally located or distributed, capable of executing the techniques described herein.

In this example, a computer 500 includes a processor 510 that is operable to execute program instructions or software, causing the computer to perform various methods or tasks. Processor 510 is coupled via bus 520 to a memory 530, which is used to store information such as program instructions and other data while the computer is in operation. A storage device 540, such as a hard disk drive, nonvolatile memory, or other non-transient storage device stores information such as program instructions, data files of the multidimensional data and the reduced data set, and other information. The computer also includes various input-output elements 550, including parallel or serial ports, USB, Firewire or IEEE 1394, Ethernet, and other such ports to connect the computer to external device such a printer, video camera, surveillance equipment or the like. Other input-output elements include wireless communication interfaces such as Bluetooth, Wi-Fi, and cellular data networks.

The computer itself may be a traditional personal computer, a rack-mount or business computer or server as shown in FIG. 6, or any other type of computerized system such as a power grid management system. The computer in a further example may include fewer than all elements listed above, such as a thin client or mobile device having only some of the shown elements. In another example, the computer is distributed among multiple computer systems, such as a distributed server that has many computers working together to provide various functions.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer readable data storage medium comprising instructions that, when executed, cause one or more processors to perform one or more of the methods described above. For example, the computer-readable data storage medium may store such instructions for execution by a processor. Any combination of one or more computer-readable medium(s) may be utilized.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), flash memory, magnetic or optical data storage media, and the like. In general, a computer-readable storage medium may be any tangible medium that can contain or store a program for use by or in connection with an instruction execution system, apparatus, or device. Additional examples of computer readable medium include computer-readable storage devices, computer-readable memory, and tangible computer-readable medium. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other processing circuitry suitable for implementation of the techniques described herein. In addition, in some aspects, functionality described in this disclosure may be provided within software modules or hardware modules.

Further exemplary details are described in Bazerque, "Basis Pursuite For Spectrum Cartography," Proceedings of the IEEE International Conference on Acoustics, Speech, and Signal Processing, ICASSP 2011, May 22-27, 2011, directly included herein as an Appendix and incorporated herein by reference.

Figure 17:
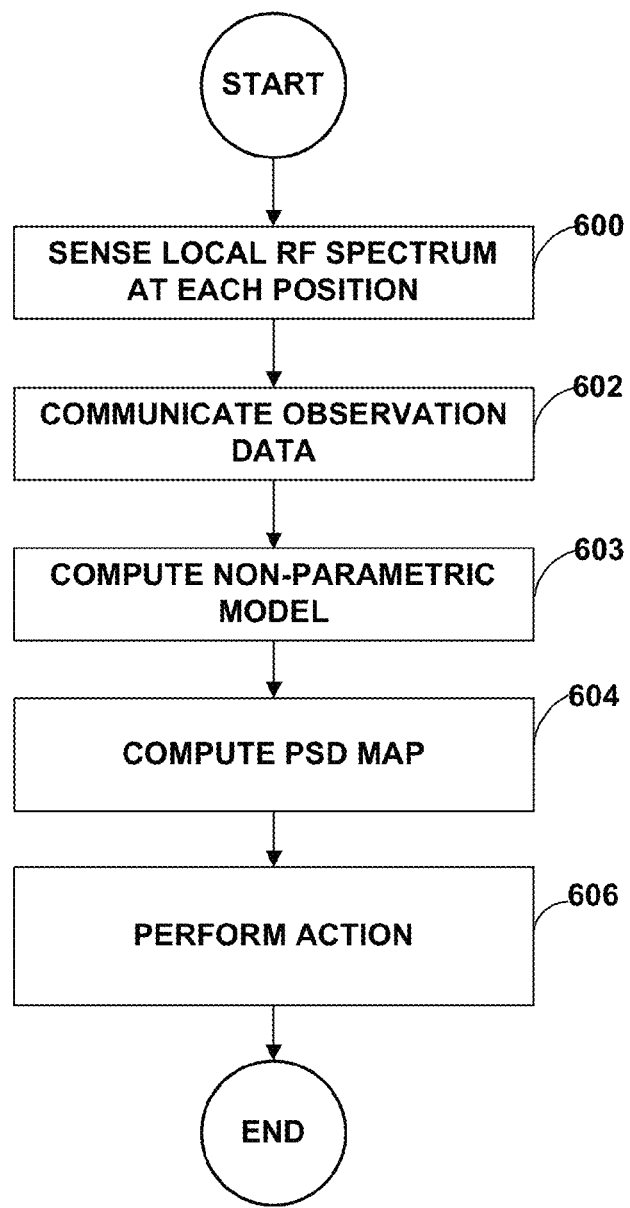
FIG. 17 is a flowchart illustrating an example process in accordance with the techniques described herein.

FIG. 17 is a flowchart illustrating an example process in accordance with the techniques of this disclosure. As shown in FIG. 17, initially a plurality of sensors (e.g., radios, mobile devices, fixed sensors) sense the local RF interference spectrum at each of a plurality of locations within a geographic region (600). The sensors communicate observation data indicative of the sensed RF interference, such as by exchanging the observation data or by communicating the observation data to one or more centralized processors (602). A computing device, such as a processor of a centralized computing device or one or more processors associated with the sensors, computes a non-parametric basis expansion model from the sensed RF interference spectrum (603). The non-parametric basis expansion model is computed as a set of reference basis functions that represent a frequency distribution of the RF power at the plurality of positions and a set of kernel-based interpolating functions that represent the RF power distribution across the geographic region, wherein the kernel-based interpolating functions operate as bases weighting functions that are coefficient functions to the reference basis function in the non-parametric basis expansion model. In accordance with the non-parametric basis expansion model, one or more power spectral density (PSD) maps may be constructed and output, e.g., displayed, where the PSD MAPs are representative of a distribution of RF power throughout the geographic region as a function of frequency and location (604). Moreover, one or more actions may be triggered in response to the computed model and/or maps, such as identifying locations within the geographic region where one or more frequencies are unoccupied. For example, a mobile device may identify an idle frequency band and dynamically use the identified idle frequency band.

Various embodiments of the invention have been described. These and other embodiments are within the scope of the following claims.

The invention claimed is:
1. A method comprising:
sensing a local radio-frequency (RF) interference spectrum at each of a plurality of sensors positioned at a plurality of locations within a geographic region;
computing a non-parametric basis expansion model from the sensed RF interference spectrum, wherein the non-parametric basis expansion model comprises a set of reference basis functions that represent a frequency distribution of the RF power and a set of kernel-based interpolating functions that represent a physical distribution of the RF power throughout the geographic region, and wherein the kernel-based interpolating functions are computed in the non-parametric basis expansion model as coefficients to the reference basis functions and operate as bases weighting functions in the non-parametric basis expansion model; and
constructing, in accordance with the non-parametric basis expansion model, a power spectral density (PSD) map representative of a distribution of RF power throughout the geographic region as a function of frequency and location.

2. The method of claim 1, wherein the bases weighting functions are computed to represent the aggregate distribution of the RF power across the geographic region corresponding to frequencies spanned by the bases.

3. The method of claim 2, wherein computing the model further comprises:
computing estimates for the RF power at locations within the geographic region; and
computing the kernel-based interpolating functions as thin-plate splines that span the estimates.

4. The method of claim 3, wherein the coefficients for the non-parametric basis expansion model are computed by applying a group-Lasso estimator to compute the estimates.

5. The method of claim 1, further comprising applying discard factors to the set of bases weighting functions of the non-parametric basis expansion model to discard a plurality of the weighting functions to produce a sparse description of the RF power throughout the geographic region.

6. The method of claim 5, further comprising selectively discarding a number of the bases weighting functions based on a tuning parameter that reduces or increases the set of retained vases weighting functions.

7. The method of claim 1, wherein computing a non-parametric basis expansion model comprises performing a most parsimonious sparse signal expansion using an overcomplete set of reference basis functions.

8. The method of claim 1, further comprising:
communicating observation data indicative of the sensed RF interference spectrum from each of the sensors to a centralized computer; and
computing, with the centralized computer based on the observation data, the non- parametric basis expansion model to construct the PSD map.

9. The method of claim 1, further comprising:
exchanging, between the sensors, observation data indicative of the sensed RF interference spectrum; and
computing, with the sensors based on the observation data, the non-parametric basis expansion model to construct the PSD map.

10. The method of claim 1, further comprising executing a PSD tracker to adapt to time-varying radio-frequency (RF) interference spectrum throughout the geographic region and reconstruct the PSD map.

11. The method of claim 1, further comprising:
processing the PSD map to identify a location within the geographic region where at least one frequency is unoccupied.

12. The method of claim 1, wherein computing a non-parametric basis expansion model comprises applying a spline, Kriging, or Gaussian process to compute the coefficients for the basis expansion model as the bases weighting functions to represent the RF signals transmitted by RF-enabled devices within the geographic region.

13. The method of claim 1, further comprising identifying at least one idle frequency band based on the PSD map and dynamically using, with at least one mobile device, the identified idle frequency band.

14. The method of claim 1, wherein computing a non-parametric basis expansion model comprises applying a plurality of different types of kernel-based interpolation functions to represent a physical distribution of the RF power throughout the geographic region.

15. The method of claim 14, further comprising applying the plurality of different types of kernel-based interpolation functions to represent fading and shadowing of the RF power.

16. A system comprising:
    a plurality of sensors to sense a local radio-frequency (RF) interference spectrum at each of a plurality of locations within a geographic region; and
    a processor that computes a non-parametric basis expansion model from the sensed RF interference spectrum at each of the sensors to construct a power spectral density (PSD) map representative of a distribution of RF power throughout the geographic region as a function of frequency and location,
    wherein the processor computes the non-parametric basis expansion model to include comprises a set of reference basis functions that represent a frequency distribution of the RF power and a set of kernel-based interpolating functions that represent a physical distribution of the RF power throughout the geographic region, and
    wherein the processor applies the kernel-based interpolating functions as coefficient functions for the non-parametric basis expansion model.

17. The system of claim 16, wherein the processor applies the kernel-based interpolating functions to interpolate the RF power across the geographic region.

18. The system of claim 16, wherein the processor computes the bases weighting functions to represent the aggregate distribution of RF power across the geographic region corresponding to frequencies spanned by the bases.

19. The system of claim 16, wherein the processor computes the coefficients for the non-parametric basis expansion model as bases weighting functions by:
    computing estimates for the RF power at locations within the geographic region; and
    computing the kernel-based interpolating functions as thin-plate splines that span the estimates.

20. The system of claim 19, wherein the processor applies a group-Lasso estimator to compute the estimates.

21. The system of claim 16, wherein the computing device receives, from each of the sensors, observation data indicative of the sensed RF interference spectrum at the respective sensors and computes, based on the observation data, the non-parametric basis expansion model to construct the PSD map.

22. The system of claim 16,
    wherein the sensors exchange observation data indicative of the sensed RF interference spectrum, and
    wherein the computing device comprises one of plurality of computing devices located at the sensors to compute the non-parametric basis expansion model and construct the PSD map based on the observation data.

23. The system of claim 16, wherein the processor applies a plurality of different types of kernel-based interpolation functions to represent a physical distribution of the RF power throughout the geographic region.

24. A mobile device comprising:
    a sensor to sense a local radio-frequency (RF) interference spectrum at a locations within a geographic region; and
    a computing device to receive observation data from a plurality of other devices positioned at a plurality of locations within the geographic region,
    wherein the observation data indicates an RF interference spectrum local to each of the plurality of other mobile devices,
    wherein the computing device computes, based on the sensed RF interference spectrum local to each of the mobile devices, a non-parametric basis expansion model having a set of reference basis functions that represent a frequency distribution of the RF power and a set of kernel-based interpolating functions that represent a physical distribution of the RF power throughout the geographic region, the kernel-based interpolating functions being coefficients to the reference basis functions as bases weighting functions in the non-parametric basis expansion model, and
    wherein the computing device constructs a power spectral density (PSD) map representative of a distribution of RF power throughout the geographic region as a function of frequency and location.

* * * * *